(12) United States Patent
Yoshimura et al.

(10) Patent No.: US 12,484,033 B2
(45) Date of Patent: Nov. 25, 2025

(54) COMMUNICATIONS NETWORK AND METHODS WITH SIGNALING OF SELECTIVE RECEPTIVITY

(71) Applicant: SHARP Kabushiki Kaisha, Sakai (JP)

(72) Inventors: Tomoki Yoshimura, Camas, WA (US); Zhanping Yin, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 637 days.

(21) Appl. No.: 17/818,709

(22) Filed: Aug. 9, 2022

(65) Prior Publication Data

US 2024/0064717 A1    Feb. 22, 2024

(51) Int. Cl.
*H04W 72/0453* (2023.01)

(52) U.S. Cl.
CPC .................. *H04W 72/0453* (2013.01)

(58) Field of Classification Search
CPC .... H04W 72/0453; H04W 72/20; H04W 8/24
See application file for complete search history.

(56) References Cited

U.S. PATENT DOCUMENTS

| | | | | |
|---|---|---|---|---|
| 11,671,229 | B2 * | 6/2023 | You | H04L 5/0053 370/329 |
| 2018/0278386 | A1 * | 9/2018 | Shim | H04L 5/0053 |
| 2018/0359068 | A1 * | 12/2018 | Kim | H04L 1/0072 |
| 2020/0344030 | A1 | 10/2020 | Cheng et al. | |
| 2021/0298029 | A1 | 9/2021 | Liu et al. | |
| 2024/0064717 | A1 * | 2/2024 | Yoshimura | H04W 8/24 |

FOREIGN PATENT DOCUMENTS

| | | |
|---|---|---|
| JP | 2020-022033 | 2/2020 |
| JP | 2021-503762 | 2/2021 |

OTHER PUBLICATIONS

RP-213591, New SI: Study on evolution of NR duplex operation, Electronic Meeting, Dec. 6-17, 2021.
3GPP TS38.214, v16.10.0, 3rd Generation Partnership Project; Technical Specification Group Radio Access Network; NR; Physical layer procedures for data, Jun. 2022.
3GPP TS38.331, v17.1.0, 3rd Generation Partnership Project; Technical Specification Group Radio Access Network; NR; Radio Resource Control (RRC); Protocol specification, Jun. 2022.
3GPP TS38.304, v17.1.0, 3rd Generation Partnership Project; Technical Specification Group Radio Access Network;NR; User Equipment (UE) procedures in Idle mode and RRC Inactive state, Jun. 2022.

* cited by examiner

*Primary Examiner* — Julio R Perez
(74) *Attorney, Agent, or Firm* — NIXON & VANDERHYE P.C.

(57) ABSTRACT

A wireless terminal comprises receiver circuitry, processor circuitry, and transmitter circuitry. The receiver circuitry is configured to receive radio transmissions in one or more subbands in a serving cell. The processor circuitry is configured to generate wireless terminal selective receptivity information. The wireless terminal selective receptivity information indicates whether the wireless terminal has a capability to configure the receiver circuitry for controlling in which of the subbands the receiver circuitry receives transmissions. The transmitter circuitry is configured to transmit the wireless terminal selective receptivity information to the serving cell.

13 Claims, 36 Drawing Sheets

---

MAKING A DETERMINATION WHETHER ONE OR MORE DEFAULT MAPPING SCHEMES WOULD MAP THE VIRTUAL RESOURCE BLOCK OF THE PHYSICAL DOWNLINK CHANNEL, TO A PHYSICAL RESOURCE BLOCK WHICH IS UNAVAILABLE FOR THE PHYSICAL DOWNLINK CHANNEL          10A-1

IN A CASE THAT THE DETERMINATION IS POSITIVE, NOT OBTAINING THE VIRTUAL RESOURCE BLOCK OF THE PHYSICAL DOWNLINK CHANNEL FROM THE PHYSICAL RESOURCE BLOCK THAT IS UNAVAILABLE FOR THE PHYSICAL DOWNLINK CHANNEL          10A-2

```
┌─────────────────────────────────────────────┐
│ MAKING A DETERMINATION WHETHER ONE OR MORE  │
│ DEFAULT MAPPING SCHEMES, FOR MAPPING VIRTUAL│─ 9A-1
│ RESOURCE BLOCKS TO PHYSICAL RESOURCE BLOCKS,│
│ WOULD MAP A VIRTUAL RESOURCE BLOCK OF A     │
│ DOWNLINK CHANNEL TO A PHYSICAL RESOURCE     │
│ BLOCK WHICH IS UNAVAILABLE FOR SUCH DOWNLINK│
│ CHANNEL.                                    │
└─────────────────────────────────────────────┘
                       │
                       ▼
┌─────────────────────────────────────────────┐
│ IN A CASE THAT THE DETERMINATION IS POSITIVE,│─ 9A-2
│ PRECLUDING MAPPING OF THE VIRTUAL RESOURCE  │
│ BLOCK OF THE DOWNLINK CHANNEL TO A PHYSICAL │
│ RESOURCE BLOCK THAT IS UNAVAILABLE FOR THE  │
│ DOWNLINK CHANNEL                            │
└─────────────────────────────────────────────┘
```

*Fig. 9A*

```
┌─────────────────────────────────────────────┐
│ MAKING A DETERMINATION WHETHER ONE OR MORE  │
│ DEFAULT MAPPING SCHEMES WOULD MAP THE       │
│ VIRTUAL RESOURCE BLOCK OF THE PHYSICAL      │─ 10A-1
│ DOWNLINK CHANNEL, TO A PHYSICAL RESOURCE    │
│ BLOCK WHICH IS UNAVAILABLE FOR THE PHYSICAL │
│ DOWNLINK CHANNEL                            │
└─────────────────────────────────────────────┘
                       │
                       ▼
┌─────────────────────────────────────────────┐
│ IN A CASE THAT THE DETERMINATION IS POSITIVE, NOT│─ 10A-2
│ OBTAINING THE VIRTUAL RESOURCE BLOCK OF THE │
│ PHYSICAL DOWNLINK CHANNEL FROM THE PHYSICAL │
│ RESOURCE BLOCK THAT IS UNAVAILABLE FOR THE  │
│ PHYSICAL DOWNLINK CHANNEL                   │
└─────────────────────────────────────────────┘
```

*Fig. 10A*

```
┌─────────────────────────────────────────────────────┐
│ MAKING A DETERMINATION THAT THE ONE OR MORE         │
│ DEFAULT MAPPING SCHEMES WOULD MAP THE VIRTUAL       │
│ RESOURCE BLOCKS OF THE PHYSICAL DOWNLINK            │
│ CHANNEL TO A RANGE OF PHYSICAL RESOURCE BLOCKS,     │── 9B-1
│ AND WHEREIN A FIRST SUBSET OF THE PHYSICAL          │
│ RESOURCE BLOCKS IN THE RANGE IS UNAVAILABLE FOR     │
│ THE PHYSICAL DOWNLINK CHANNEL AND A SECOND          │
│ SUBSET OF THE PHYSICAL RESOURCE BLOCKS IN THE       │
│ RANGE IS AVAILABLE FOR THE PHYSICAL DOWNLINK        │
│ CHANNEL                                             │
└─────────────────────────────────────────────────────┘
                          ▼
┌─────────────────────────────────────────────────────┐
│ ADJUSTING A RECEPTION RATE OF THE PHYSICAL          │── 9B-2
│ DOWNLINK CHANNEL SO THAT THE PHYSICAL DOWNLINK      │
│ CHANNEL CAN BE RECEIVED IN THE SECOND SUBSET OF     │
│ THE RANGE                                           │
└─────────────────────────────────────────────────────┘
                          ▼
┌─────────────────────────────────────────────────────┐
│ USING THE ALTERNATE RESOURCE ALLOCATION             │── 9B-3
│ TECHNIQUE TO ALLOCATE THE VIRTUAL RESOURCE          │
│ BLOCKS FOR THE PHYSICAL DOWNLINK CHANNEL TO THE     │
│ PHYSICAL RESOURCE BLOCKS OF THE SECOND SUBSET       │
└─────────────────────────────────────────────────────┘
```

*Fig. 9B*

```
┌─────────────────────────────────────────────────────┐
│ SAME AS ACT 9B-1                                    │── 10B-1
└─────────────────────────────────────────────────────┘
                          ▼
┌─────────────────────────────────────────────────────┐
│ RECEIVING ALTERNATE RESOURCE ALLOCATION             │── 10B-2
│ TECHNIQUE                                           │
└─────────────────────────────────────────────────────┘
                          ▼
┌─────────────────────────────────────────────────────┐
│ ADJUSTING A RECEPTION RATE OF THE PHYSICAL          │── 10B-3
│ DOWNLINK CHANNEL SO THAT THE PHYSICAL DOWNLINK      │
│ CHANNEL CAN BE RECEIVED IN THE SECOND SUBSET OF     │
│ THE RANGE                                           │
└─────────────────────────────────────────────────────┘
                          ▼
┌─────────────────────────────────────────────────────┐
│ USING THE ALTERNATE RESOURCE ALLOCATION             │── 10B-4
│ TECHNIQUE TO OBTAIN THE PHYSICAL DOWNLINK           │
│ CHANNEL FROM THE PHYSICAL RESOURCE BLOCKS OF        │
│ THE SECOND SUBSET                                   │
└─────────────────────────────────────────────────────┘
```

*Fig. 10B*

```
┌─────────────────────────────────────────────────────────┐
│ MAKING A DETERMINATION WHETHER ONE OR MORE              │ 9C-1
│ DEFAULT MAPPING SCHEMES, FOR MAPPING VIRTUAL            │
│ RESOURCE BLOCKS TO PHYSICAL RESOURCE BLOCKS,            │
│ WOULD MAP A VIRTUAL RESOURCE BLOCK OF A                 │
│ DOWNLINK CHANNEL TO A PHYSICAL RESOURCE BLOCK           │
│ WHICH IS UNAVAILABLE FOR SUCH DOWNLINK CHANNEL.         │
└─────────────────────────────────────────────────────────┘
                            ↓
┌─────────────────────────────────────────────────────────┐
│ SENDING INFORMATION REGARDING THE ALTERNATE             │ 9C-2
│ RESOURCE ALLOCATION TECHNIQUE TO WIRELESS               │
│ TERMINAL                                                │
└─────────────────────────────────────────────────────────┘
                            ↓
┌─────────────────────────────────────────────────────────┐
│ USING THE ALTERNATE RESOURCE ALLOCATION                 │
│ TECHNIQUE SO THAT THE VIRTUAL RESOURCE BLOCKS           │
│ FOR THE PHYSICAL DOWNLINK CHANNEL ARE NOT               │ 9C-3
│ MAPPED TO ANY PHYSICAL RESOURCE BLOCK WHICH IS          │
│ UNAVAILABLE FOR THE PHYSICAL DOWNLINK CHANNEL,          │
│ BUT ARE INSTEAD MAPPED TO PHYSICAL RESOURCE             │
│ BLOCKS WHICH ARE AVAILABLE FOR THE PHYSICAL             │
│ DOWNLINK CHANNEL.                                       │
└─────────────────────────────────────────────────────────┘
```

*Fig. 9C*

```
┌─────────────────────────────────────────────────────────┐
│ SAME AS ACT 9C-1                                        │ 10C-1
└─────────────────────────────────────────────────────────┘
                            ↓
┌─────────────────────────────────────────────────────────┐
│ RECEIVING ALTERNATE RESOURCE ALLOCATION                 │ 10C-2
│ TECHNIQUE                                               │
└─────────────────────────────────────────────────────────┘
                            ↓
┌─────────────────────────────────────────────────────────┐
│ USING THE ALTERNATE RESOURCE ALLOCATION                 │
│ TECHNIQUE SO THAT THE VIRTUAL RESOURCE BLOCKS           │
│ FOR THE PHYSICAL DOWNLINK CHANNEL ARE NOT               │ 10C-3
│ MAPPED TO AND THUS NOT RECEIVED IN ANY PHYSICAL         │
│ RESOURCE BLOCK WHICH IS UNAVAILABLE FOR THE             │
│ PHYSICAL DOWNLINK CHANNEL, BUT ARE INSTEAD              │
│ MAPPED TO AND RECEIVED IN PHYSICAL RESOURCE             │
│ BLOCKS WHICH ARE AVAILABLE FOR THE PHYSICAL             │
│ DOWNLINK CHANNEL.                                       │
└─────────────────────────────────────────────────────────┘
```

*Fig. 10C*

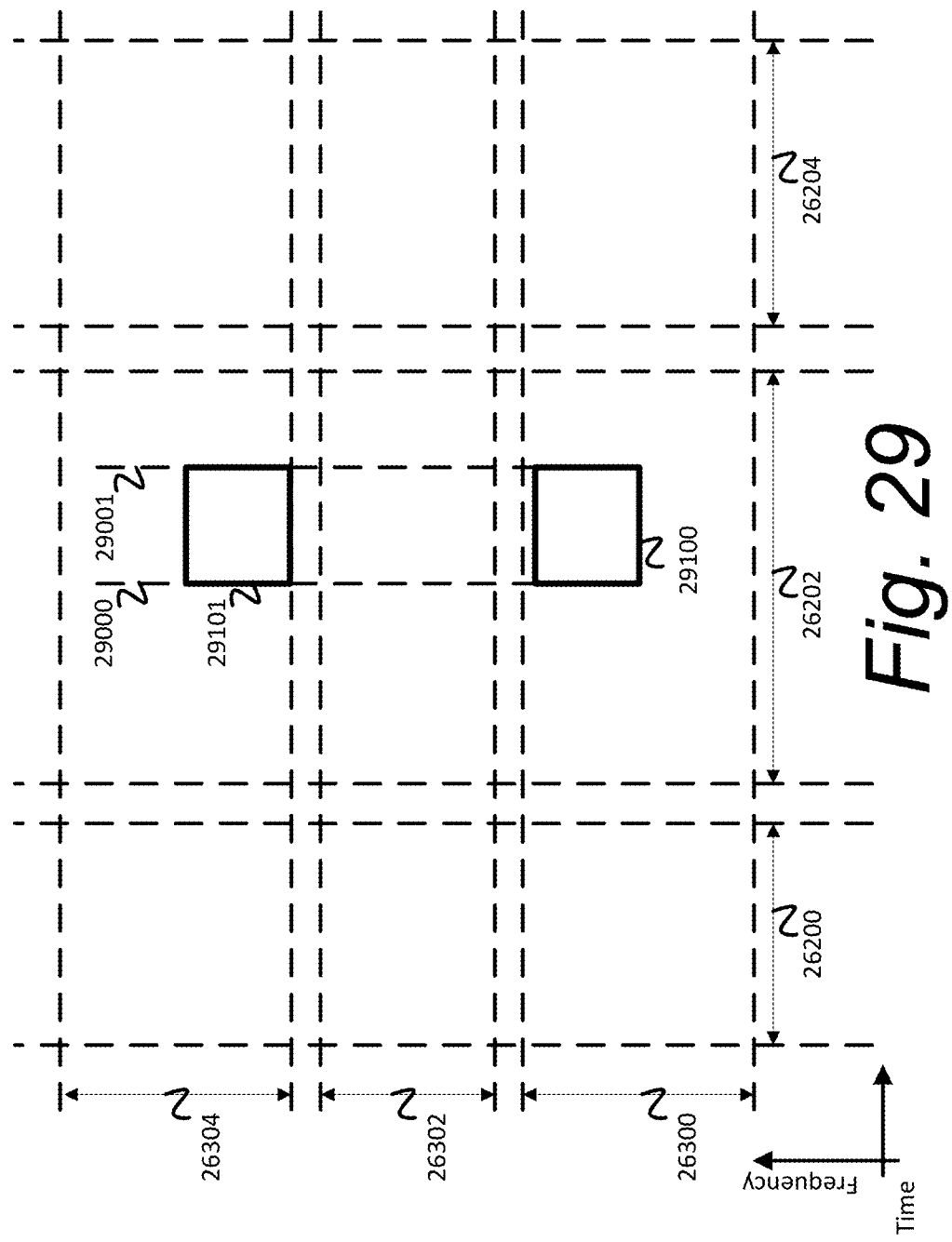

GENERATING WIRELESS TERMINAL SELECTIVE RECEPTIVITY INFORMATION, THE WIRELESS TERMINAL SELECTIVE RECEPTIVITY INFORMATION INDICATING WHETHER THE WIRELESS TERMINAL HAS A CAPABILITY TO CONFIGURE THE RECEIVER CIRCUITRY FOR CONTROLLING IN WHICH OF ONE OR MORE SUBBANDS THE RECEIVER CIRCUITRY RECEIVES TRANSMISSIONS — 30-1

TRANSMITTING THE WIRELESS TERMINAL SELECTIVE RECEPTIVITY INFORMATION TO THE SERVING CELL. — 30-2

*Fig. 30*

RECEIVING, FROM THE WIRELESS TERMINAL, WIRELESS TERMINAL SELECTIVE RECEPTIVITY INFORMATION — 31-1

CONTROLLING, IN DEPENDENCE UPON THE WIRELESS TERMINAL SELECTIVE RECEPTIVITY INFORMATION, IN WHICH SUBBAND(S) THE ACCESS NODE TRANSMITS TRANSMISSIONS TO THE WIRELESS TERMINAL — 31-2

*Fig. 31*

COMMUNICATIONS NETWORK AND METHODS WITH SIGNALING OF SELECTIVE RECEPTIVITY

TECHNICAL FIELD

The technology relates to wireless communications, and particularly to wireless terminals and operations thereof including operations to avoid, reduce or mitigate interference, e.g., cross link interference.

BACKGROUND

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG RAN, Next Generation Radio Access Network, and 5GC, 5G Core Network. As shown, NGRAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE and is connected via the NG interface to the 5GC. The 5G NR, New Radio, gNB is connected to Access and Mobility Management Function, AMF, and User Plane Function, UPF, in the 5G Core Network, 5GC.

Wireless transmissions from a base station in a direction toward a wireless terminal is referred to as being on the "downlink", DL, transmissions from the wireless terminal in a direction toward the base station is referred to as being on the "uplink", UL. As described in more detail herein, the transmissions may occur in a frame or sub-frame structure which may be conceptualized as a two-dimensional grid. The grid may be structured to have time slots in a first dimension and frequencies or sub-carriers in a second dimension. Time division duplex, TDD, operation occurs when information of the frame or sub-frame is split on a time basis between uplink and downlink. In TDD operation there may be a mapping or assignment, referred to as a TDD pattern, of time slots to uplink and downlink transmissions. Frequency division duplex, FDD, operation occurs when information of the frame or sub-frame is split on a frequency or sub-carrier basis between uplink and downlink.

Uplink coverage is a significant factor for a radio access network. In time division duplex, TDD, operation, uplink coverage is limited by the TDD pattern since the TDD pattern determines the maximum allowable transmission power for the wireless terminal. For example, when the TDD pattern is DL heavy, e.g., when a significant number of time slots are utilized for downlink transmission, the UE has less maximum allowable transmission power. As a result, uplink coverage is limited. Conversely, if the network is deployed with a UL heavy TDD pattern, e.g., when a significant number of time slots are utilized for uplink transmission, the network cannot serve enough DL traffic. Therefore, 3GPP takes into consideration operation with simultaneous transmission/reception for base station nodes within frequency resource(s).

Uplink coverage is a significant factor for cellular network. In time division duplex, TDD, operation, uplink coverage is limited by a ratio $R_{UL/DL}$ of uplink resource and downlink resource. The more the amount of resource usable for uplink, the larger the uplink power, and thus the bigger the uplink coverage. Dynamic TDD operation, e.g., operation in which there may be a frequent change of the ratio $R_{UL/DL}$, depending on traffic demand, is a candidate for uplink coverage enhancement. For example, the system may increase the amount of uplink resource.

What is needed are methods, apparatus, and/or techniques to deal with allocation and/or selection of radio resources for uplink channels.

SUMMARY

In some of its example aspects the technology disclosed herein concerns a wireless terminal which communicates over a radio interface with an access node of a radio access network. In a basic example embodiment and mode the wireless terminal comprises receiver circuitry, processor circuitry, and transmitter circuitry. The receiver circuitry is configured to receive radio transmissions in one or more subbands in a serving cell. The processor circuitry is configured to generate wireless terminal selective receptivity information. The wireless terminal selective receptivity information indicates whether the wireless terminal has a capability to configure the receiver circuitry for controlling in which of the subbands the receiver circuitry receives transmissions. The transmitter circuitry is configured to transmit the wireless terminal selective receptivity information to the serving cell. Methods of operating such wireless terminals are also disclosed.

In another of its example aspects the technology disclosed herein concerns a radio access node which communicates over a radio interface with a wireless terminal. In a basic example embodiment and mode the access node comprises receiver circuitry and processor circuitry. The receiver circuitry is configured to receive, from the wireless terminal, wireless terminal selective receptivity information. The wireless terminal selective receptivity information indicates whether the wireless terminal has a capability to configure receiver circuitry of the wireless terminal for controlling in which of the subbands the receiver circuitry receives transmissions over the radio interface. The processor circuitry is configured to control, in dependence upon the wireless terminal selective receptivity information, in which subband(s) the access node transmits transmissions to the wireless terminal. Methods of operating such access nodes are also provided.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 9A-FIG. 9D are flowcharts showing example, representative, acts or steps performed by the access nodes of the example embodiments and modes of FIG. 8A-FIG. 8D, respectively.

FIG. 10A-FIG. 10D are flowcharts showing example, representative, acts or steps performed by the wireless terminals of the example embodiments and modes of FIG. 8A-FIG. 8D, respectively.

FIG. 29 is a diagrammatic view of an example of resource mapping on the SBFD resource grid according to an example embodiment and mode.

FIG. 30 is a flowchart showing example, representative, acts or steps performed by the wireless terminal of the example embodiment and mode of FIG. 25.

FIG. 31 is a flowchart showing example, representative, acts or steps performed by the access node of the example embodiment and mode of FIG. 25.

DETAILED DESCRIPTION

Figure 1:
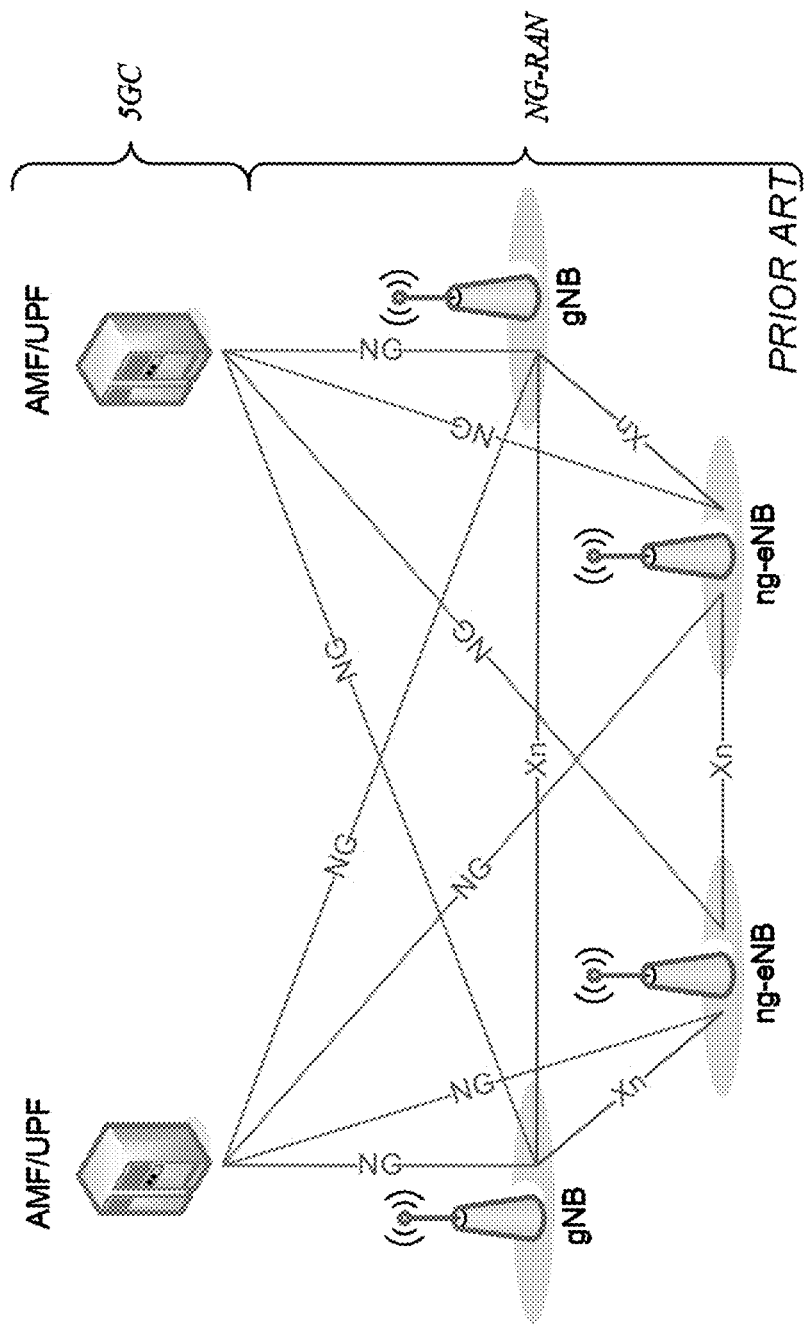
FIG. 1 is a diagrammatic view of overall architecture for a 5G New Radio system.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel. All or a subset of the cell may be adopted by 3GPP as licensed bands, e.g., frequency band, to be used for communication between a base station, such as a Node B, and a UE terminal. A cellular network using frequency bands can include configured cells. Configured cells can include cells of which a UE terminal is aware and in which it is allowed by a base station to transmit or receive information. Examples of cellular radio access networks include E-UTRAN or New Radio, NR, and any successors thereof, e.g., NUTRAN.

A core network, CN, may comprise numerous servers, routers, and other equipment. As used herein, the term "core network" can refer to a device, group of devices, or subsystem in a telecommunication network that provides services to users of the telecommunications network. Examples of services provided by a core network include aggregation, authentication, call switching, service invocation, gateways to other networks, etc. For example, a core network (CN) may comprise one or more management entities, which may be an Access and Mobility Management Function, AMF.

As used herein, for a UE in IDLE Mode, a "serving cell" is a cell on which the wireless terminal in idle mode is camped. See, e.g., 3GPP TS 38.304. For a UE in RRC_CONNECTED not configured with carrier aggregation, CA/dual connectivity, DC, there is only one serving cell comprising the primary cell. For a UE in RRC_CONNECTED configured with CA/DC the term 'serving cells' is used to denote the set of cells comprising of the Special Cell(s) and all secondary cells. See, e.g., 3GPP TS 38.331.

Figure 2:
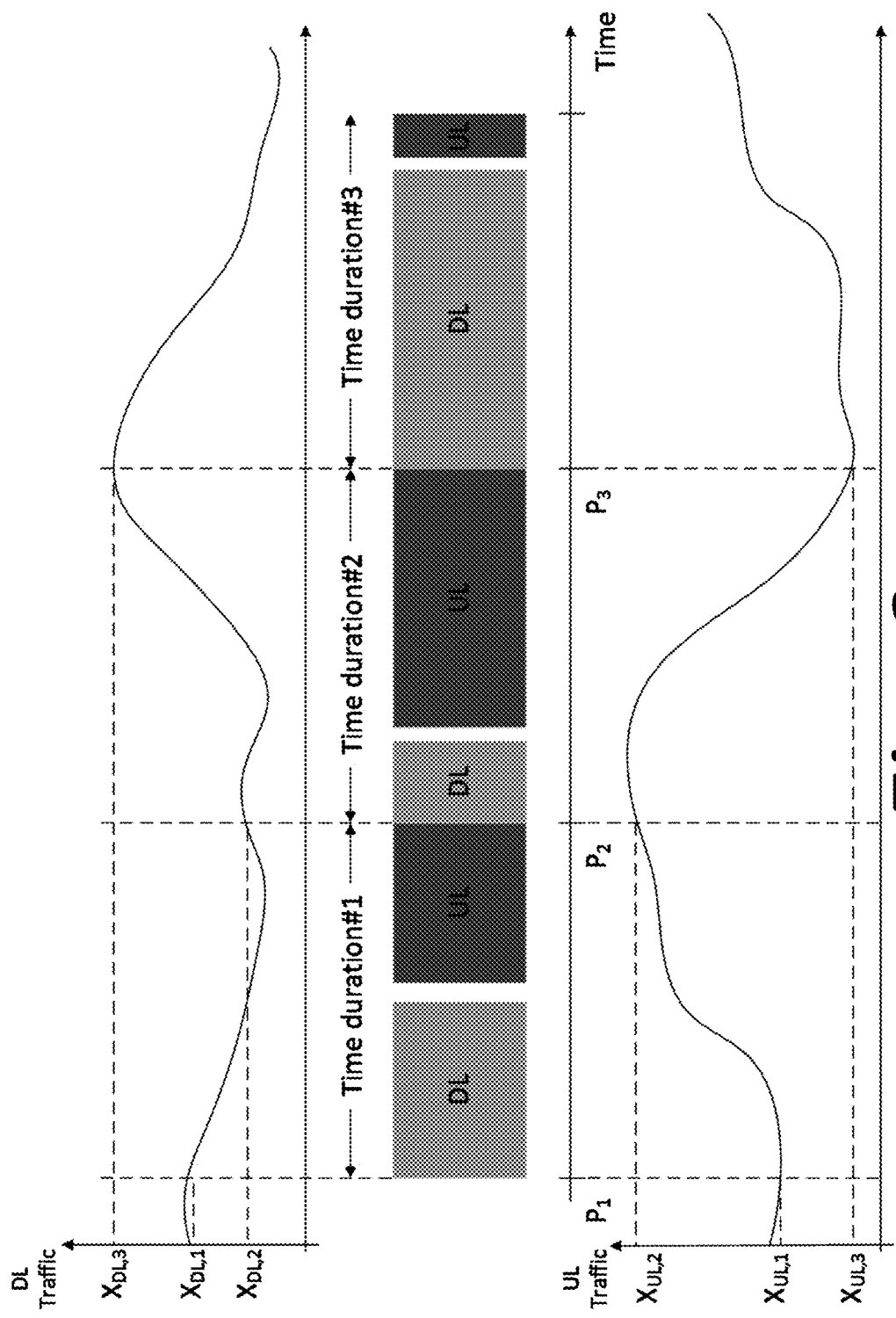
FIG. 2 is a diagrammatic view showing an allocation of radio resources between uplink and downlink traffic in accordance with an example dynamic time division duplex mode.

FIG. 2 shows an example of dynamic time division duplex, TDD, operation where the horizontal domain represents time domain. In FIG. 2, each time duration comprises a downlink, DL, portion; a gap; and, an uplink, UL, portion. Each time duration may have the same or a different length. As used herein, a TDD pattern is a pattern comprised of some or all of a DL portion, a gap, and an UL portion. In FIG. 2, a base station determines the TDD pattern for each time duration, depending on the amount of traffic. For example, the base station may determine a first TDD pattern for the time duration #1 with almost equal length of DL portion and UL portion, because the amount of DL traffic $X_{DL,1}$ is similar with the amount of UL traffic $X_{UL,1}$ at P1. In the scenario of FIG. 2, the amount of UL traffic rapidly increases in the time duration #1. Therefore, the base station allocates a UL-dominant TDD pattern at P2, to handle the increase in the UL traffic. Next, the amount of DL traffic rapidly increases in the time duration #2. Therefore, the base station allocates DL-dominant TDD pattern at P3, to handle the increase in the DL traffic.

Figure 3:
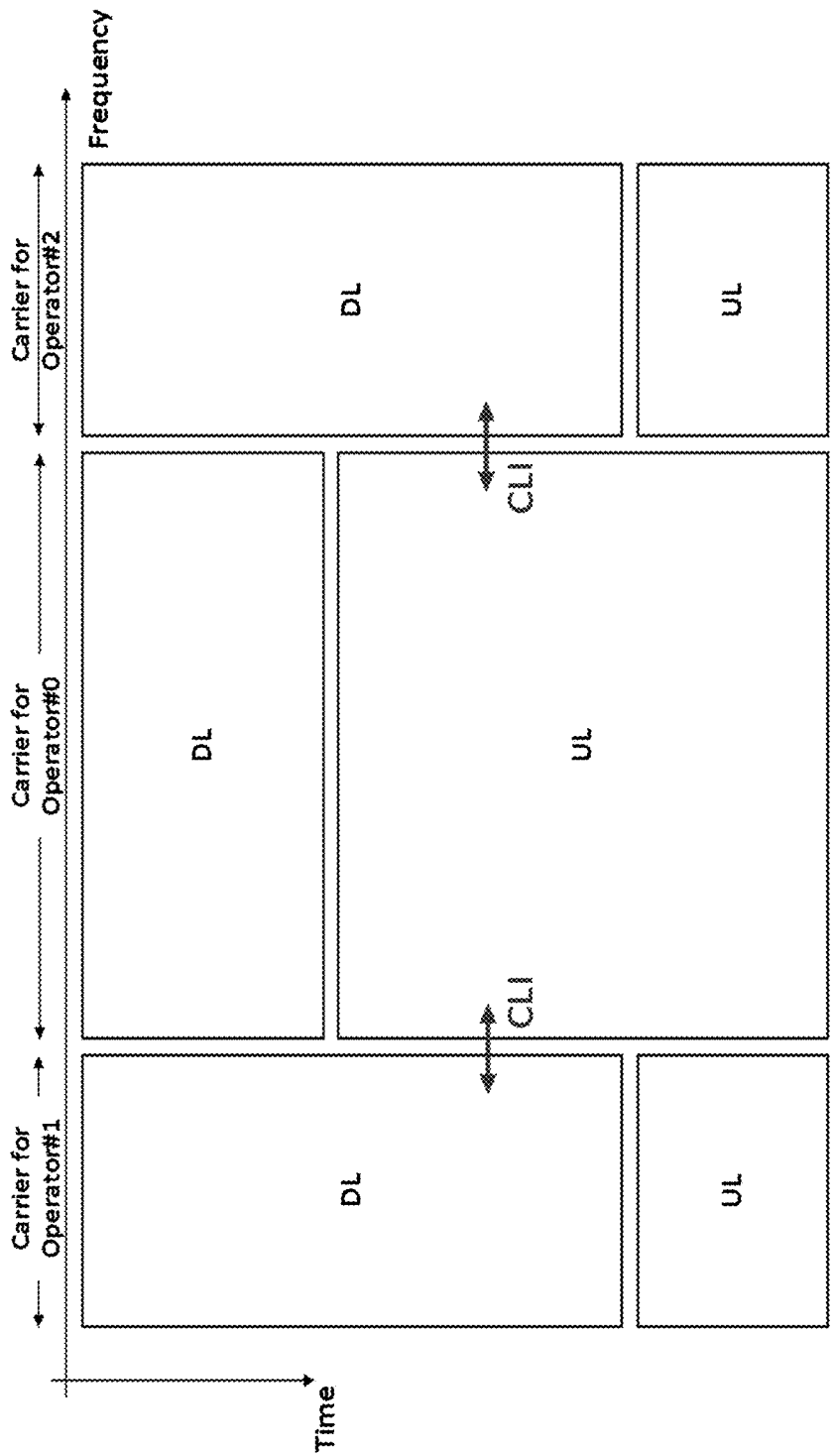
FIG. 3 is a diagrammatic view showing inter-operator interference in an example dynamic time division duplex mode, wherein the horizontal domain represents frequency domain and the vertical domain represents time domain.

However, dynamic TDD has a problem of inter-operator interference. FIG. 3 shows a concept of inter-operator interference where the horizontal domain represents frequency domain and the vertical domain represents time domain. In FIG. 3, three carriers for Operator #1, Operator #2, and Operator #3 are respectively deployed adjacently. In general, if carriers with different operators are deployed adjacently, it is safer to align the TDD patterns for each carrier. This is because no Cross Link Interference, CLI, issue occurs when the TDD patterns are aligned. However, when dynamic TDD is operated, the dynamic nature of the allocation makes CLI likely if not inevitable among carriers. Since CLI affects performance of the system in adjacent operators, CLI causes co-existence issue.

Figure 4:
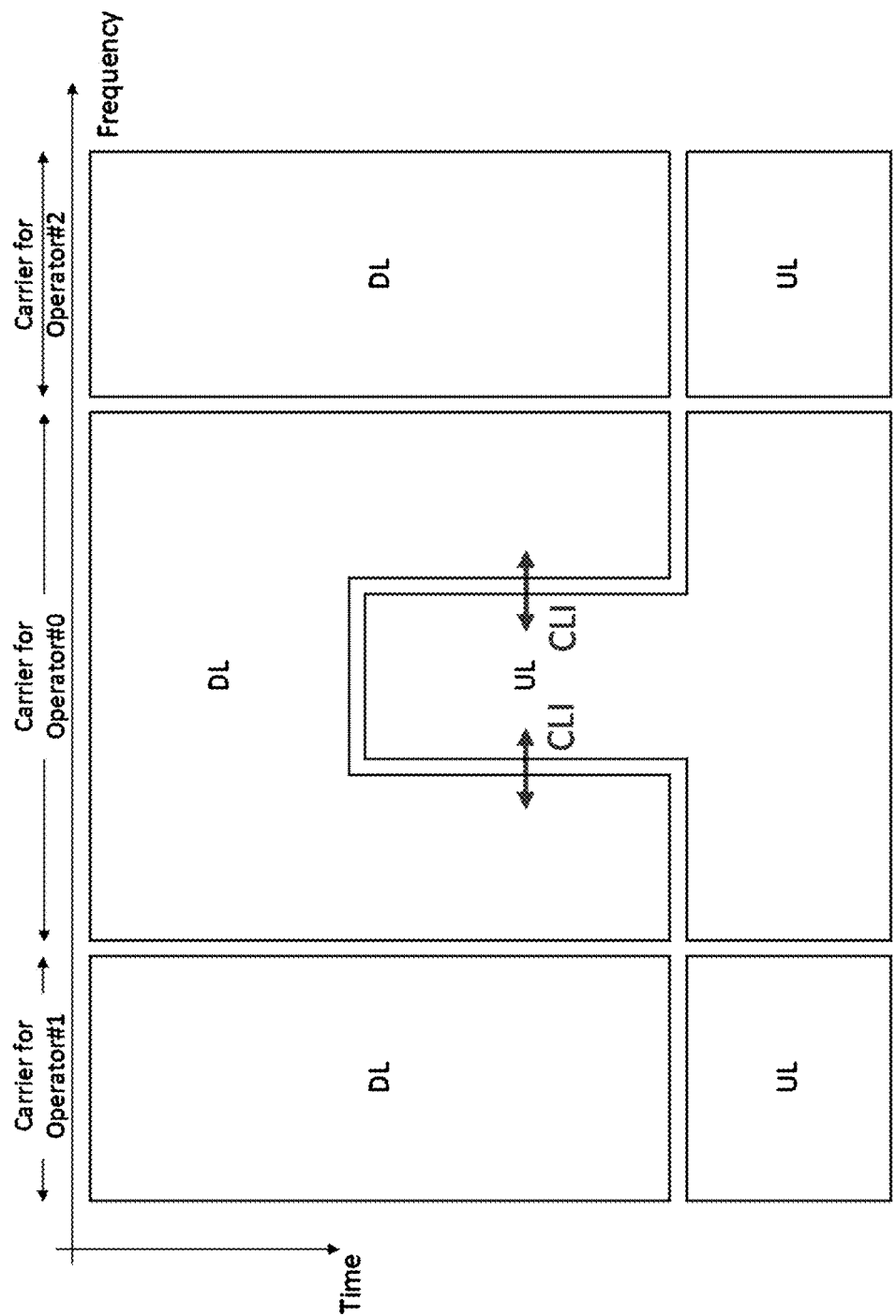
FIG. 4 is a diagrammatic view an example of SubBand Full Duplex, SBFD, operation.

FIG. 4 shows an example of SubBand Full Duplex, SBFD, operation. When SBFD is operated by Operator #0, the inter-operator CLI issue is solved. Therefore, an operator can configure TDD pattern flexibly depending on the amount of traffic, and thus, uplink coverage is enhanced. As explained below, in operating with SBFD the base station should avoid assigning a frequency resource(s) for a PDSCH on an UL resource.

According to conventional technology, a wireless terminal typically determines on what resources to send a physical downlink shared channel, PDSCH, according to a procedure that involves the following steps:

1) Detecting a downlink control information, DCI, format which schedules a PDSCH.
2) Determining allocated virtual resource blocks based on a value such as a Resource Indication Value, RIV, indicated by a frequency domain resource assignment field in the DCI form.
3) Determining allocated physical resource blocks for transmission of the PDSCH based on virtual resource block-to-physical resource block mapping, i.e., a VRB-to-PRB mapping.

As step 1) above, the wireless terminal firstly detects a DCI format which schedules a PDSCH. Then, as step 2), the wireless terminal determines allocated virtual resource blocks based on a Resource Indication Value, RIV, indicated by a frequency domain resource assignment field in the DCI format. Next, the wireless terminal determines a starting virtual resource block index $RB_{start}$ for the PDSCH and a length $L_{RBs}$ in terms of resource blocks for the PDSCH. The starting virtual resource block index $RB_{start}$ and the length $L_{RBs}$ are jointly encoded into the RIV. Thus, the wireless terminal can determine the $L_{RBs}$ allocated virtual resource blocks starting at the virtual resource block index $RB_{start}$. An example of joint encoding of RIV is shown below (excerpted from Clause 5.1.2.2.2 of TS38.214, incorporated herein by reference). As shown below and otherwise herein, the downlink type 1 resource allocation field corresponds to frequency domain resource assignment field; $N^{size}_{BWP}$ is the length in terms of resource blocks.

A downlink type 1 resource allocation field consists of a resource indication value (RIV) corresponding to a starting virtual resource block ($RB_{start}$) and a length in terms of contiguously allocated resource blocks $L_{RBs}$. The resource indication value is defined by:

if $(L_{RBs}-1) \le \lfloor N^{size}_{BWP}/2 \rfloor$ then $$RIV = N^{size}_{BWP}(L_{RBs}-1) + RB_{start}$$

else $$RIV = N^{size}_{BWP}(N^{size}_{BWP} - L_{RBs} + 1) + (N^{size}_{BWP} - 1 - RB_{start})$$

where $L_{RBs} \ge 1$ and shall not exceed $N^{size}_{BWP} - RB_{start}$

Next, as step 3), the allocated virtual resource blocks are mapped to physical resource blocks with a VRB-to-PRB (Virtual Resource Block to Physical Resource Block) mapping scheme.

Concerning mapping schemes, the simplest VRB-to-PRB mapping scheme is mapping virtual resource block with index n to physical resource block index with index n. Another VRB-to-PRB mapping scheme is mapping virtual resource block with index n to physical resource block index with index $n+N^{CORESET}_{start}$, where $N^{CORESET}_{start}$ indicates the starting physical resource block index for a control resource set in which a PDCCH with the DCI format is received. Details of VRB-to-PRB mapping is described in answers to Q12.

As used herein:
virtual resource block, VRB, is a virtual domain representation of resource blocks, which does not have a direct relation with physical resources, i.e., frequency resources.
Physical resource block, PRB, is physical domain representation of resource blocks, which does have direct relation with physical resources.

In the conventional technology, the wireless terminal performs rate-matching around resources. If the base station appropriately configures the resources to fit into the UL resources, the wireless terminal correctly performs rate-matching around the UL resource. But otherwise there may be problems, as described below.

Figure 5:
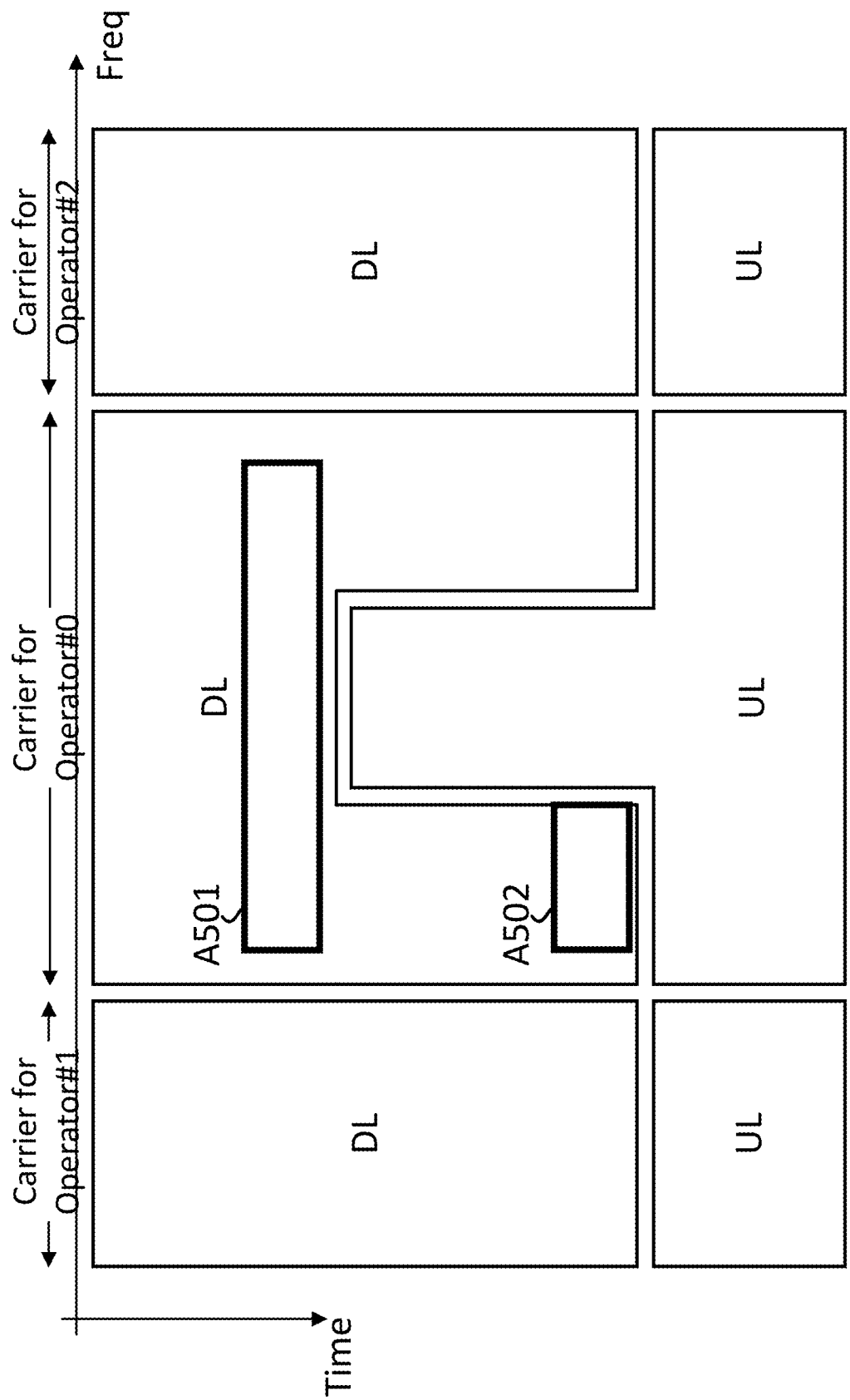
FIG. 5 is a diagrammatic view of an example of frequency resource assignment wherein a set frequency resource corresponding to allocated PRBs for a PDSCH overlap UL resources.

For example, FIG. 5 is an example of frequency resource assignment by Resource Indication Value, RIV. FIG. 5 shows as A501 is a set of frequency resource corresponding to allocated PRBs for a PDSCH. The base station allocates A501 for the PDSCH, encodes the RIV, and transmits a PDCCH with a DCI format which includes a frequency domain resource assignment field with bits set according to the value of the RIV. The wireless terminal receives the PDCCH, and determines A501 by the value of the RIV conveyed via the frequency domain resource assignment field. As shown in FIG. 5, the set of frequency resources A501 corresponding to allocated PRBs for a PDSCH, which is a downlink channel, problematically overlaps UL resources.

Figure 6:
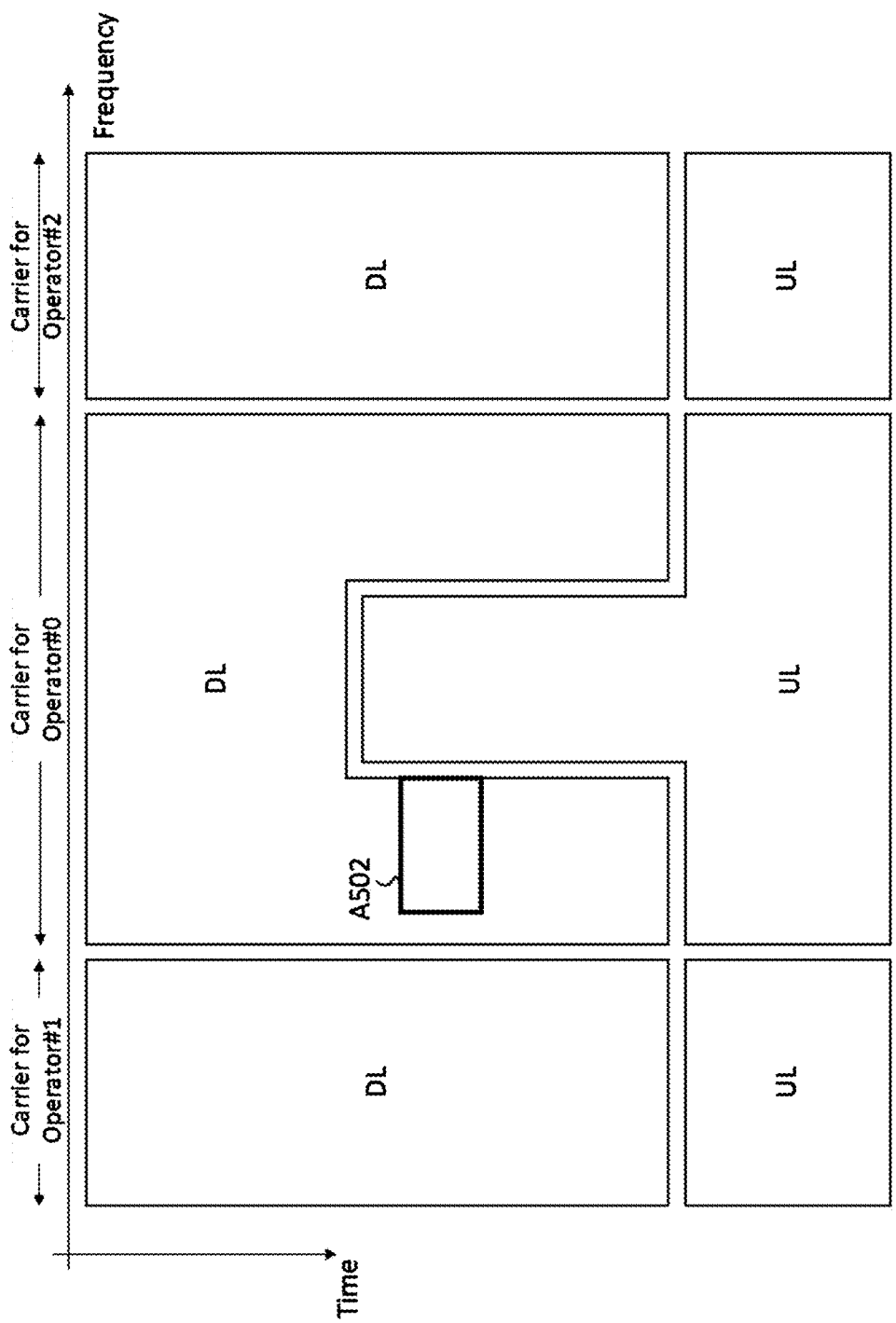
FIG. 6 is a diagrammatic view of an example of frequency resource assignment wherein a set frequency resource corresponding to allocated PRBs for a PDSCH avoids overlap UL resources.

Therefore, in the conventional technology, the base station should assign frequency resources for a PDSCH by avoiding the UL resources. An example of avoiding the overlap of resources for a PDSCH with uplink resources is illustrated by assigning a set of frequency resources A502 as shown in FIG. 6. Otherwise, the overlap of frequency resource assignment leads to less efficiency for PDSCH transmission. For example, frequency domain diversity cannot be exploited for a PDSCH.

Figure 7:
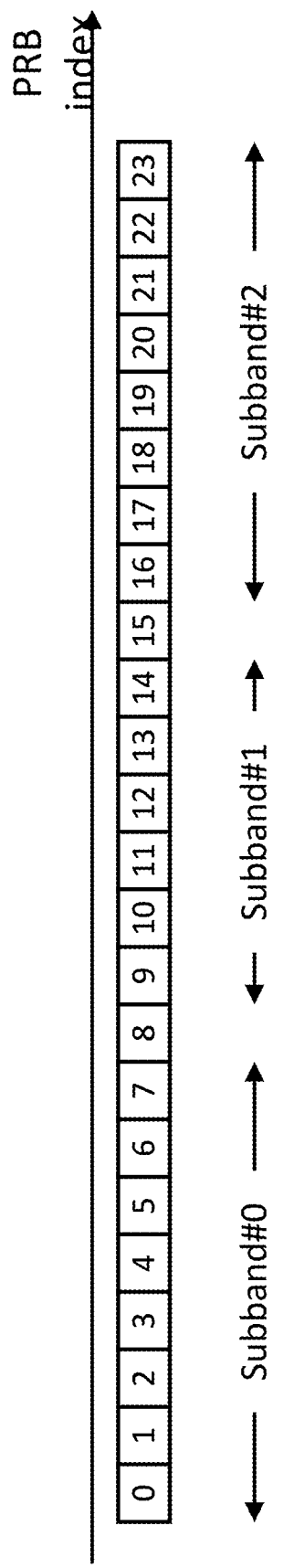
FIG. 7 is a diagrammatic view showing an example of subband configuration for physical resource blocks.

FIG. 7 shows an example of subband configuration for physical resource blocks. In FIG. 7 Subband #0 starting at the resource block with index $N^{start}_{sb0}=0$ with eight resource blocks configured; subband #1 starts at the resource block with index $N^{start}_{sb1}=9$ with 6 resource blocks configured; and subband #2 starts at the resource block with index $N^{start}_{sb2}=16$, with 8 resource blocks configured. PRB with index 8 is considered as a gap in frequency domain. Likewise, PRB with index 15 is also considered as a gap in frequency domain. However, the technology disclosed herein is not limited to the case where a gap is configured within consecutive subbands. The technology disclosed herein is also applicable to the case where no gap is configured within consecutive subbands.

Therefore, as described herein, an efficient downlink resource allocation mechanism is provided by example embodiments and modes of the technology disclosed herein, which is particularly but not exclusively beneficial for SBFD.

A. Generic Embodiment and Mode

In accordance with one of its aspects, the technology disclosed herein concerns access nodes of a cellular telecommunications system which communicate over a radio interface with at least one wireless terminal. The access nodes comprise processor circuitry and transmitter circuitry. The processor circuitry is configured to make a determination whether one or more default mapping schemes, for mapping virtual resource blocks to physical resource blocks, would map a virtual resource block of a physical downlink channel, PDSCH, such as a Physical Downlink Shared Channel, PDSCH, to a physical resource block which is unavailable for the physical downlink channel. As used herein, a "default" mapping scheme comprises any mapping scheme that would map a virtual resource block of a physical downlink channel to a physical resource block which is unavailable for the physical downlink channel, regardless of when the default mapping scheme may be installed and regardless of the manner or order in which it is invoked. Examples of default mapping schemes are provided as a further consideration in section E hereof. In a case that the determination is positive, the processor circuitry is configured to preclude mapping of the virtual resource block of the physical downlink channel to a physical resource block that is unavailable for the physical downlink channel. Various alternative implementations of such access nodes are described herein, as well as wireless terminals which receive the physical downlink channel, transmitted by such access nodes.

In various example embodiments and modes described herein, the physical downlink channel is a Physical Downlink Shared Channel, PDSCH. However in other implementations the physical downlink channel may be any other physical downlink channel, such as a physical downlink control channel, a physical broadcast channel, for example. Therefore, the technology and scope described herein is not limited to the physical downlink channel being a Physical Downlink Shared Channel, PDSCH.

A.1 Generic Architecture and Operation

Figure 8A:
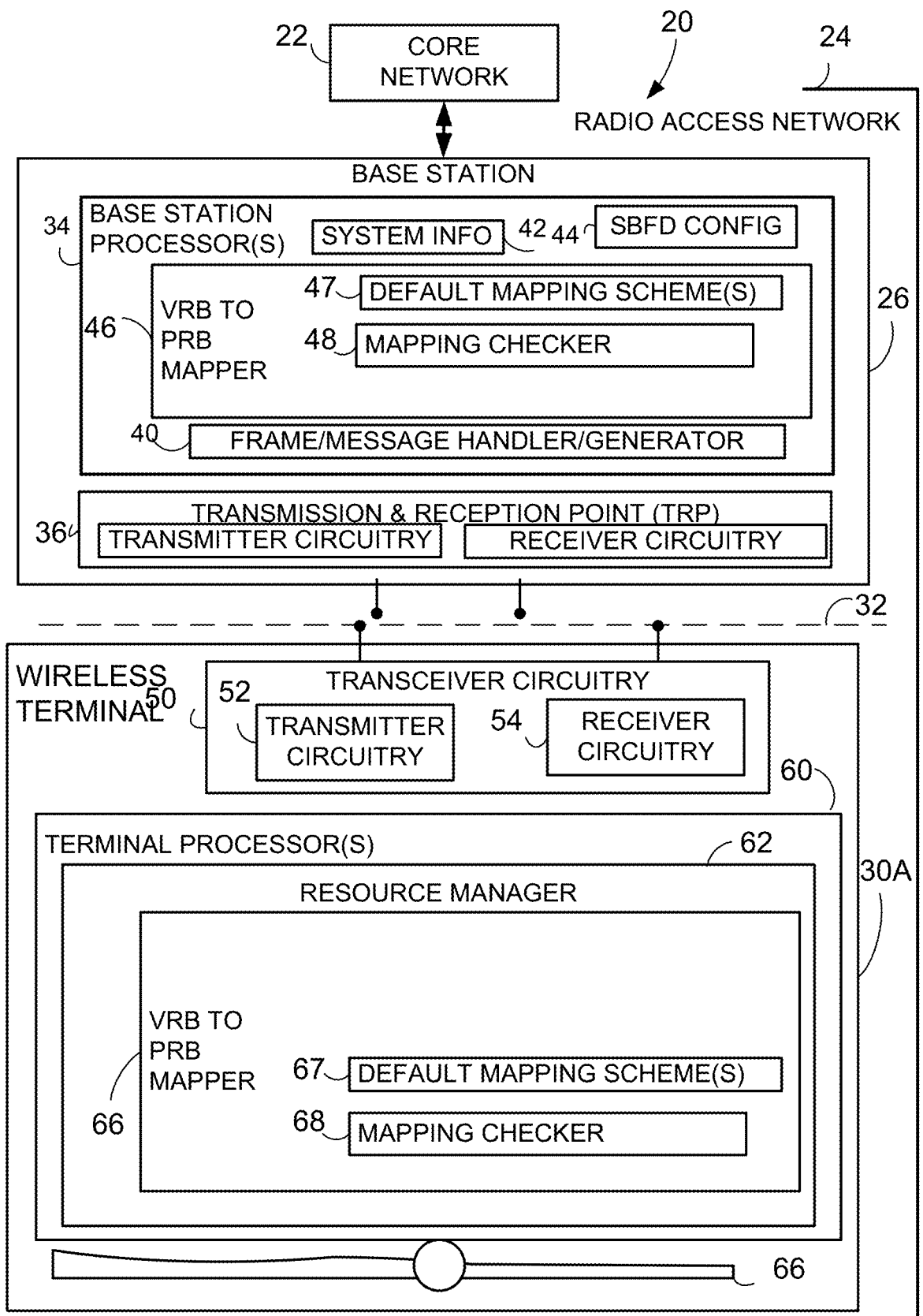
FIG. 8A-FIG. 8D are schematic views of a communications system showing a core network, a radio access network, with the radio access network including a wireless terminal and an access node configured to preclude mapping of a virtual resource block of a downlink channel to a physical resource block that is unavailable for the physical downlink channel, FIG. 8A showing a generic example embodiment and mode and FIG. 8B-FIG. 8D showing example embodiment and modes with different approaches.

FIG. 8A shows, in generic manner, a communications network in which an access node is configured to preclude mapping of a virtual resource block of a downlink channel to a physical resource block that is unavailable for the physical downlink channel. The example embodiment and mode of FIG. 8A is generic to other example embodiments and modes described herein, including the example embodiments and modes of FIG. 8B, FIG. 8C, and FIG. 8D. For the example embodiments and modes of FIG. 8B-FIG. 8D, the downlink channel is a such as the physical downlink channel. The features and aspects of the example embodiments and modes of FIG. 8B-FIG. 8D may be utilized individually, or in combination.

The network 20 of FIG. 8A, which may be a 5G network, for example, comprises core network 22 connected to at least one radio access network 24. The radio access network 24 in turn comprises one or more radio access network (RAN) nodes, such as example base station node 26 which is shown as being connected to the core network 22 by wireline(s) 28. The base station node 26 serves at least one cell.

The radio access network, RAN, 24 typically comprises plural access nodes, one example access nodes 26 being illustrated as a base station node in FIG. 8A. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), a relay node, a mobile relay node, or some other similar terminology.

FIG. 8A shows the radio access network 24, and base station node 26 through its cell in particular communicating with wireless terminal 30A across a radio or air interface 32. The base station node 26 may, and usually does, communicate with plural wireless terminals across the air interface 32. Only one wireless terminal 30A is shown for sake of simplicity, it being understood that other wireless terminals may be provided and may operate in similar manner as the wireless terminal 30A herein illustrated.

FIG. 8A shows base station node 26 as comprising base station processor circuitry which may comprise one or more base station processors 34, as well as base station transceiver circuitry 36. As illustrated in FIG. 8A, the base station transceiver circuitry 36 may be a transmission and reception point (TRP). The transmission and reception point (TRP) 36 may further comprise transmitter circuitry and receiver circuitry.

The base station processors 34 may comprise frame/message handler/generator 40 which prepares and generates information including user data and messages, e.g., signaling, for transmission over the radio interface 32, as which also processes information received over the radio interface 32. The base station processors 34 may also comprise system information block, SIB, generator 42 which serves to generate or at least store system information which is broadcast over the radio interface 32. The base station processors 34 may also comprise SBFD configuration memory 44, which stores the configuration of the Sub-Band Full Duplex, SBFD, region. In some example embodiments and modes or scenarios, the SBFD configuration information may be included in the system information generated by system information block, SIB, generator 42. In other example embodiments and modes or scenarios, the SBFD configuration information may be included in radio resource control, RRC, signaling generated by a radio resource control unit which comprises base station processors 34 and which is included in a RRC message generated by frame/message handler/generator 40.

As used herein, SBFD configuration is comprised of information for configuring the wireless terminal. SBFD configuration may include information for configuring some or all of UL subband, DL subband, and SBFD region. For example, SBFD configuration may include information indicating SBFD region. For example, SBFD configuration may include information indicating TDD pattern. For example, SBFD configuration may include information indicating size and/or location of subbands.

The base station processors 34 may further comprise virtual resource block to physical resource block mapper 46. The virtual resource block to physical resource block mapper 46 has access to and generally uses one or more default mapping schemes, which may be stored in default mapping scheme memory 47. In addition, the base station processors 34 comprise node mapping checker 48. The node mapping checker 48 makes a determination whether one or more of default mapping schemes 47 would map a virtual resource block of a downlink channel, such as the Physical Downlink Shared Channel, PDSCH, to a physical resource block which is unavailable for the downlink channel, and which, in a case that the determination is positive, precludes mapping of the virtual resource block of the downlink channel to a physical resource block that is unavailable for the downlink channel. For example, such downlink channel may be a Physical Downlink Shared Channel, PDSCH.

Communication between radio access network (RAN) 22 and wireless terminal over the radio interface 32 may occur on various layers. Layer 1 includes radio layer 1 or the physical layer. Higher layers, e.g., layers higher than Layer 1 may include radio layer 2 and radio resource control layer 3. The layer 1 communication may occur by utilization of "resources". Reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource may occur in the context of a "frame" of information that is typically formatted and prepared, e.g., by a node. A frame, which may have both downlink portion(s) and uplink portion(s), is communicated between the base station and the wireless terminal. Each frame may comprise plural subframes. For example, in the time domain, a 10-millisecond frame consists of ten one millisecond subframes. A subframe is divided into one or more slots (so that there are thus a multiple of 10 slots in a frame). The transmitted signal in each slot is described by a resource grid comprised of resource elements (RE). Each column of the two-dimensional grid represents a symbol (e.g., an OFDM symbol) from node to wireless terminal. Each row of the grid represents a subcarrier. A resource element, RE, is the smallest time-frequency unit for transmission in the subframe. That is, one symbol on one sub-carrier in the sub-frame comprises a resource element (RE) which is uniquely defined by an index pair (k, l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The—frequency resource supported by the standard today is a set of plural subcarriers in one OFDM symbols (e.g., plural resource elements (RE)) and is called a resource block (RB).

A resource block may comprise, for example, 12 resource elements, i.e., 12 subcarriers and 7 symbols.

In 5G New Radio ("NR"), a frame consists of 10 millisecond, milli-second, duration. A frame consists of 10 subframes with each having 1 ms duration like LTE. Each subframe consists of 2 slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. A mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

As used herein, "serving cell frequency resource" refers to a plurality of radio resources which may radio resources comprising layer 1 communications between base station node 26 and wireless terminal 30. As such, "serving cell frequency resource" encompasses and includes a frame, having examples described above, or a resource grid, or plural carriers, for example. The serving cell frequency resource typically includes a control region. In New Radio, the control region can be placed in any region in time/frequency domain, whereas in some earlier LTE versions the control region should be preferably located in the beginning of a subframe. The control region may include scheduling information. An example of scheduling information is a PDCCH with a downlink control information, DCI format. The scheduling information may describe or reference other portions of the serving cell frequency resource. The other portion of serving cell frequency resource that may be described or referenced by the scheduling information may be one or more physical channels. An example physical channel is the physical downlink shared channel, PDSCH.

The base station node 26 may be structured essentially as shown in FIG. 8A or may be a node having architecture such as split architecture comprising a central unit and one or more distributed units that comprise mobile termination (MT). The base station processor(s) may include one or more TRPs.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

FIG. 8A also shows various example constituent components and functionalities of wireless terminal 30A. For example, FIG. 8A shows wireless terminal 30A as comprising terminal transceiver circuitry 50. The transceiver circuitry 50 in turn may comprise terminal transmitter circuitry 52 and terminal receiver circuitry 54. The terminal transceiver circuitry 50 may include antenna(e) for the wireless transmission. Terminal transmitter circuitry 52 may include, e.g., amplifier(s), modulation circuitry and other conventional transmission equipment. Terminal receiver circuitry 54 may comprise, e.g., amplifiers, demodulation circuitry, and other conventional receiver equipment.

The terminal receiver circuitry 54 is, in the generic example embodiment and mode of FIG. 8A, configured to receive, over the radio interface, e.g., information concerning scheduling of a virtual resource block for a downlink channel such as the Physical Downlink Shared Channel, PDSCH. In some example embodiments and modes terminal receiver circuitry 54 may also receive information concerning an alternate resource allocation technique and a physical resource block corresponding to the virtual resource block of the downlink channel.

FIG. 8A further shows wireless terminal 30A also comprising wireless terminal processor circuitry, e.g., one or more wireless terminal processor(s) 60. The wireless terminal 30A, e.g., wireless terminal processor(s) 60, may comprise resource manager 62. The resource manager 62 may also be referred to or function as a frame/message generator/handler. The wireless terminal processor(s) 60 may comprise virtual resource block to physical resource block mapper 66. In a simple implementation of the example embodiment and mode of FIG. 8A and other example embodiments and modes described herein or encompassed hereby, the wireless terminal processor(s) 60 may simply receive information from base station node 26 that will enable wireless terminal 30 to know the location of the physical downlink channel of interest. For example, the wireless terminal 30 may receive, in a message or signal, an indication of the location of the physical downlink channel in the frame after the base station node 26 has performed its check and possibly overridden the mapping of the default mapping scheme. Alternatively, the base station node 26 may send to wireless terminal 30 information about the alternate resource allocation technique that the base station node 26 employed for its virtual resource block to physical resource block mapping. In such simply implementation(s), the receiver circuitry may be configured to receive, over the radio interface, information regarding an alternate resource allocation technique utilized by the access node in a case that the access node made a determination that one or more default mapping schemes would map the virtual resource block of the physical downlink channel, to a physical resource block which is unavailable for the physical downlink channel, and the processor circuitry may be configured to utilize the information regarding the alternate resource allocation technique to obtain the physical downlink channel. Such communications may occur by any appropriate method, such as RRC signaling, for example.

In other implementations such as shown in FIG. 8A, the wireless terminal 30 may at least initially attempt to determine on what resources the physical downlink channel is to be received according to conventional practice, but have its own ability to make a similar determination/check as did the base station node 26 and to adjust its operation, e.g., use an alternate resource allocation, accordingly. In these other implementations the virtual resource block to physical resource block mapper 66 may have access to and may use one or more default mapping schemes 67, which may be stored in memory and which are the same as default mapping schemes 47 known to the access node. In addition, the wireless terminal processor(s) 60 may optionally comprise terminal mapping checker 68. The terminal mapping checker 68 makes a determination whether one or more of default mapping schemes 47 would map a virtual resource block of a downlink channel, such as the Physical Downlink Shared Channel, PDSCH, to a physical resource block which is unavailable for the downlink channel.

FIG. 9A shows example acts or steps performed by the base station node 26 in a generic mode of FIG. 8A. Act 9A-1 comprises the base station node 26 making a determination whether one or more default mapping schemes, for mapping virtual resource blocks to physical resource blocks, would map a virtual resource block of a downlink channel, e.g., the Physical Downlink Shared Channel, PDSCH, to a physical resource block which is unavailable for such downlink channel. The determination of act 9A-1 may be made by node mapping checker 48, for example. Act 9A-2 comprises, in a case that the determination is positive, the base station node 26 precluding mapping of the virtual resource block of the downlink channel to a physical resource block that is unavailable for the downlink channel.

FIG. 10A shows example acts or steps which may optionally be performed by the wireless terminal 30 in a generic mode of FIG. 8A, particularly in the implementation in which the wireless terminal 30 has its own determination/mapping checking capability. Act 10A-1 comprises making a determination whether one or more default mapping schemes would map the virtual resource block of the physical downlink channel, to a physical resource block which is unavailable for the physical downlink channel. The determination of act 10A-1 may be made by terminal mapping checker 68, for example. Act 10A-2 comprises in a case that the determination is positive, not obtaining the virtual resource block of the physical downlink channel from the physical resource block that is unavailable for the physical downlink channel.

Figure 8B:
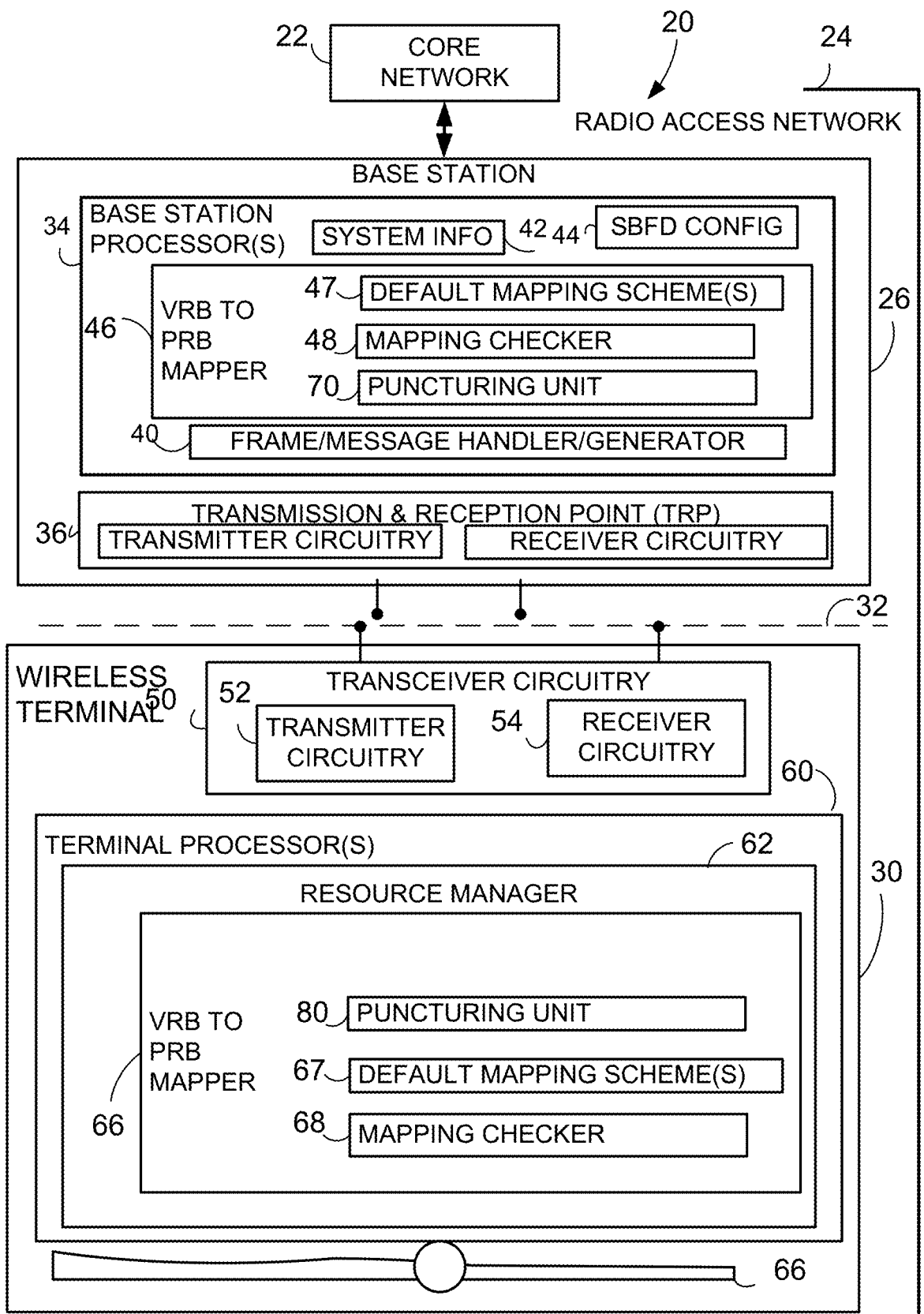
Figure 8C:
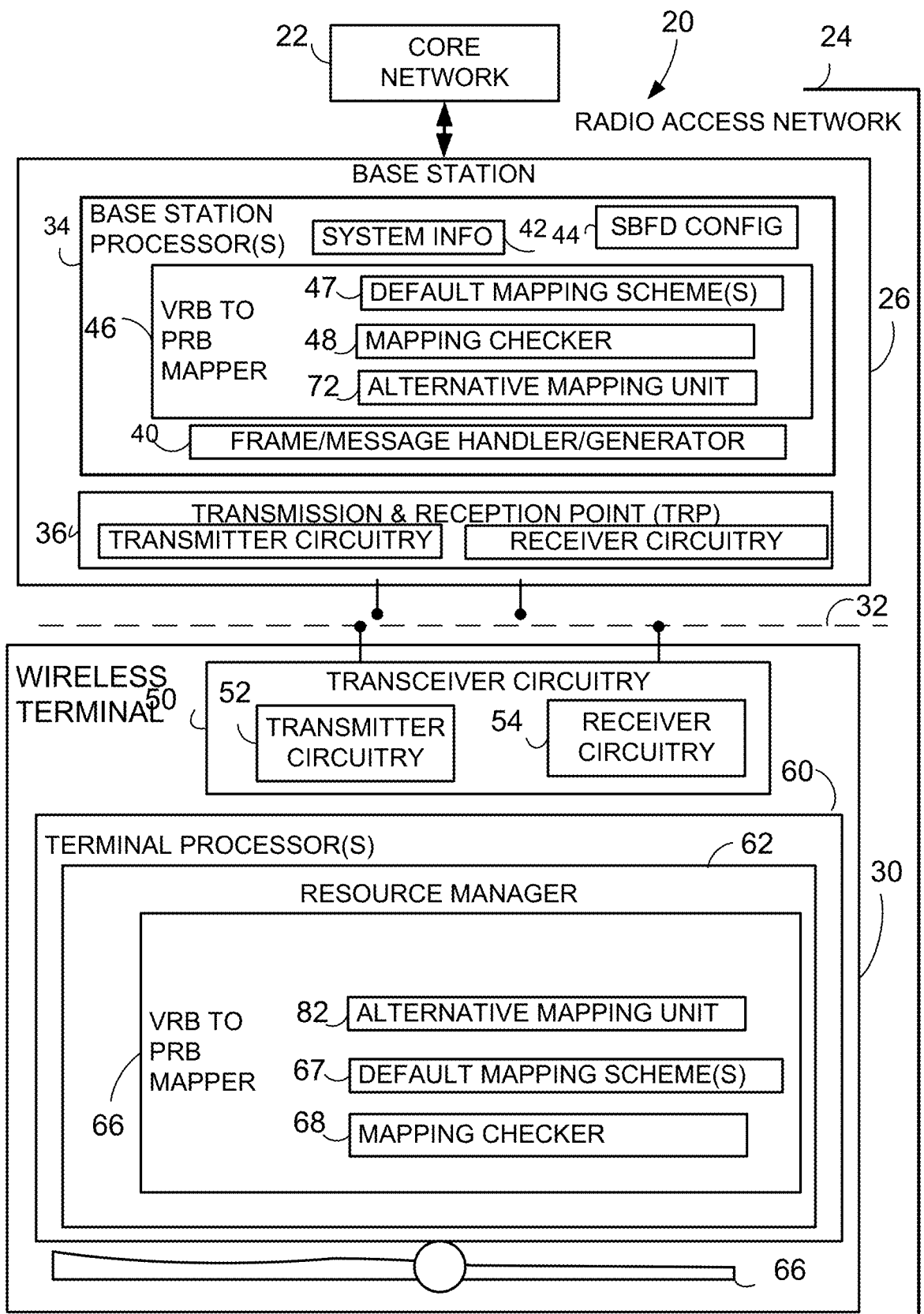
Figure 8D:
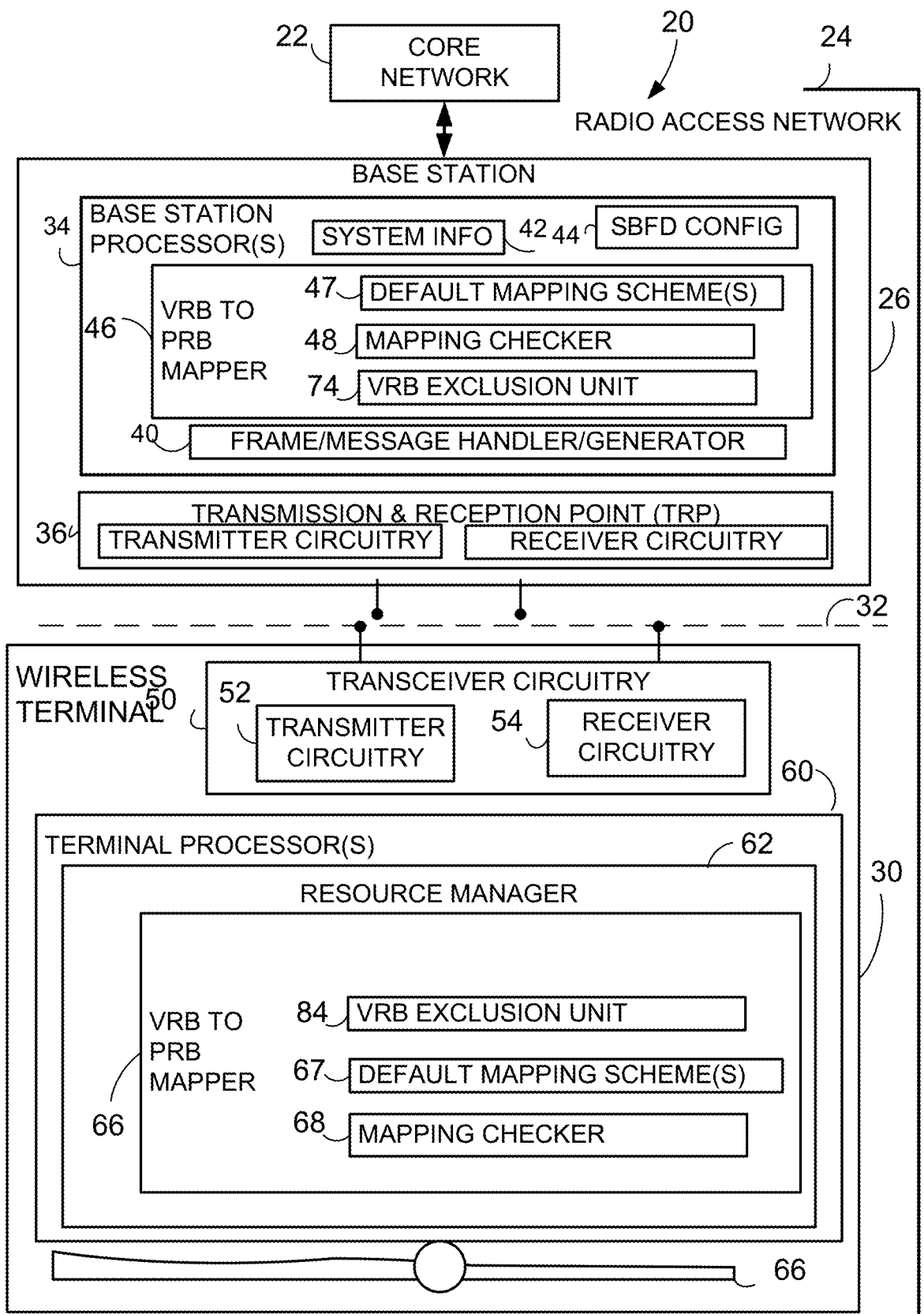

Section B, Section C, and Section D hereof respectively concern the example embodiments and modes of FIG. 8B, FIG. 8C, and FIG. 8D, with are also referred to respectively as Approach 1, Approach 2, and Approach 3. In some of these approach example embodiments and modes, in a case that the determination of act 9-1 is positive, base station node 26 uses an alternate resource allocation technique to allocate the virtual resource block to a physical resource block that is available for the physical downlink channel, and the transmitter circuitry of base station node 26 transmits to the wireless terminal both the physical downlink channel and information regarding the alternate resource allocation technique. An "alternative" resource technique or allocation is one that results in a different mapping than any of the mapping schemes that would map the virtual resource block of the physical downlink channel, to a physical resource block which is unavailable for the physical downlink channel. An "alternative" resource technique or allocation is one that avoids mapping the virtual resource block of the physical downlink channel to a physical resource block which is unavailable for the physical downlink channel. Conversely, at the wireless terminal 30, upon making the positive determination, the wireless terminal 30 uses the alternate resource allocation technique to obtain the physical resource block that corresponds to the virtual resource block in a physical resource block that is available for the physical downlink channel.

A.2 Generic Determination of Resource Availability

Referring back to FIG. 7, both base station node 26 and wireless terminal 30 may make a determination whether one or more default mapping schemes, for mapping virtual resource blocks to physical resource blocks, would map a virtual resource block of a downlink channel, e.g., Physical Downlink Shared Channel, PDSCH, to a physical resource block which is unavailable for the downlink channel. The base station node 26 and the wireless terminal 30 may determine subband-wise availability for the physical downlink channel reception. For example, at a time, subband #0 and subband #2 is available for physical downlink channel reception and subband #1 is not available for the physical downlink channel reception. Various examples or cases are described below for determining resource availability for the physical downlink channel. The downlink control information, DCI, format may vary among the cases. In the examples described below, the physical downlink channel is assumed to be the Physical Downlink Shared Channel, PDSCH, but only for the sake of example illustration. The example cases provided below are, unless otherwise indicated or apparent from the context, applicable to all example embodiments and modes described herein including the example embodiments and modes of Section B, C, D, and E hereof. For example, the technology disclosed herein with respect to one or more of Section A, Section B, Section C, and Section D may be combined with, e.g., utilized in conjunction with, with the technology of Section E.

For example case 1, a DCI format may include one or more bits to indicate the subband-wise availability. For example, the subband-wise availability may be determined by a subband-level bitmap in the DCI format. For example, the bitmap comprises of 3 bits, and each bit in the bitmap indicates whether the corresponding subband is available or not.

For example, as in FIG. 7, in case 1, DCI format 1_1 includes a bitmap of 3 bits for indicating subband-wise availability. The $1^{st}$ bit in the bitmap indicates subband-wise availability of subband #0. The $2^{nd}$ bit in the bitmap indicates subband-wise availability of subband #1. The $3^{rd}$ bit in the bitmap indicates subband-wise availability of subband #2. Based on the indicated availability, the wireless terminal may determine which PRBs are punctured.

For example, even in case 1, the DCI format 1_0 monitored in a user security setting, USS, set may not include the bitmap. For example, wireless terminal may determine that all subbands are available for a physical downlink channel scheduled by the DCI format 1_0. For example, wireless terminal may determine that a predetermined subband is not available for the physical downlink channel. For example, the predetermined subband may be provided via RRC signaling.

For example, even in case 1, DCI format 1_0 monitored in a common search space, CSS, may not include the bitmap. For example, wireless terminal may determine that all subbands are available for a physical downlink channel scheduled by the DCI format 1_0.

For example case 2, the subband-wise availability may be determined by 1 bit in the DCI format, and the 1 bit indicates whether a predetermined subband is available or not. For example, the predetermined subband may be configured via RRC signaling.

For example, as in FIG. 7, in case 2, DCI format 1_1 includes 1 bit, and subband #1 is configured as the predetermined subband. Then, wireless terminal determines availability of subband #1 by the 1 bit in the DCI format 1_1.

Even in case 2, the DCI format 1_0 monitored in a USS set may not include the 1 bit. For example, wireless terminal may determine all subbands are available for a physical downlink channel scheduled by the DCI format 1_0. For example, wireless terminal may determine the predetermined subband is not available for the physical downlink channel.

Even in case 2, the DCI format 1_0 monitored in a CSS set may not include the 1 bit. For example, wireless terminal may determine all subbands are available for a physical downlink channel scheduled by the DCI format 1_0.

For example case 3, the subband-wise availability may be determined by 1 bit in the DCI format, and the 1 bit indicates whether a set of predetermined subbands is available or not. For example, the set may be configured via RRC signaling.

For example, as in FIG. 7, in case 3, DCI format 1_1 includes 1 bit, and subband #1 and #2 is configured as the set. Then, wireless terminal determines availability of subband #1 and #2 by the 1 bit in the DCI format 1_1.

Even in case 3, the DCI format 1_0 monitored in a USS set may not include the 1 bit. For example, wireless terminal may determine all subbands are available for a PDSCH scheduled by the DCI format 1_0. For example, wireless terminal may determine subbands in the set are not available for the physical downlink channel.

Even in case 3, the DCI format 1_0 monitored in a CSS set may not include the 1 bit. For example, wireless terminal may determine all subbands are available for a physical downlink channel scheduled by the DCI format 1_0.

For example case 4, the subband-wise availability may be determined by a bitmap with X bits in the DCI format, and each bit indicates whether a corresponding subband is available or not. Up to X subbands may be configured via RRC signaling.

For example, as in FIG. 7, in case 4, DCI format 11 may include X bits. For example, subband #1 and #2 are configured as the up to X subbands. That is, X is 2. In that case, the $1^{st}$ bit in the X bits indicates subband-wise availability of subband #1 and the $2^{nd}$ bit in the X bits indicates subband-wise availability of subband #2.

Even in case 4, the DCI format 1_0 monitored in a USS set may not include the X bits. For example, wireless terminal may determine all subbands are available for a PDSCH scheduled by the DCI format 1_0. For example, wireless terminal may determine subbands in the up to X subbands are not available for the physical downlink channel.

Even in case 4, the DCI format 1_0 monitored in a CSS set may not include the X bits. For example, wireless terminal may determine all subbands are available for a physical downlink channel scheduled by the DCI format 1_0.

For example, in case 5, the subband-wise availability information for each subband may be provided by RRC signaling. For example, a TDD pattern for each subband may be provided by RRC signaling. Here, subband-wise availability information is information indicating subband availability.

For example, as in FIG. 7, in case 5, a first TDD pattern for subband #0 is DDDSU, a second TDD pattern for subband #1 is DSUUU, and a third TDD pattern for subband #2 is DDDSU. In this notation, "D" indicates "downlink" "U" indicates "uplink" and "S" indicates "special". For example, downlink symbols are available for a physical downlink channel reception and flexible symbols and uplink symbols are not available for a physical downlink channel reception. For example, downlink symbols and flexible symbols are available for a physical downlink channel reception and uplink symbols are not available for a physical downlink channel reception.

For example case 6, a first TDD pattern for a serving cell and a second TDD pattern for a predetermined subband may be configured via RRC signaling. For example, the first TDD pattern may be a TDD pattern configured by common RRC signaling. For example, the second TDD pattern may be configured by UE-specific RRC signaling. For example, the predetermined subband may be configured by UE-specific RRC signaling. For example, the UE-specific RRC signaling may provide index of subband.

For example, as in FIG. 7, in case 6, the predetermined subband is subband #2.

Further, for example, a DCI format 1_1 scheduling a physical downlink channel may indicate whether the second TDD pattern is applied to the predetermined subband or not. For example, if the DCI format 1_1 indicates that the second TDD pattern is applied to the predetermined subband, wireless terminal applies the second TDD pattern to the predetermined subband. Also, if the DCI format 1_1 does not indicate that the second TDD pattern is applied to the predetermined subband, wireless terminal applies the first TDD pattern to the predetermined subband.

For example, even in case 6, DCI format 1_0 monitored in a USS set may not indicate whether the second TDD pattern is applied to the predetermined subband or not. For example, wireless terminal may determine all subbands are available for a physical downlink channel scheduled by the DCI format 1_0. For example, wireless terminal may determine the predetermined subband is not available for the physical downlink channel.

For example, even in case 6, DCI format 1_0 monitored in a CSS set may not indicate whether the second TDD pattern is applied to the predetermined subband or not. For example, wireless terminal may determine all subbands are available for a physical downlink channel scheduled by the DCI format 1_0.

Additionally, or alternatively, the wireless terminal may determine scheduling type for a PDSCH for determining subband-wise availability for PDSCH reception. For example, scheduling types may include one or more of dynamic scheduling and semi-persistent scheduling. For example, in a case that the wireless terminal determines that the scheduling type for the PDSCH is the semi-persistent scheduling, the wireless terminal may determine the subband-wise availability according to the case 5. For example, in a case that the wireless terminal determines that the scheduling type for the PDSCH is the dynamic scheduling, the wireless terminal may determine all subbands are available for the PDSCH.

Additionally, or alternatively, the wireless terminal may determine the number of repetitions for a PDSCH for determining subband-wise availability for PDSCH reception. For example, in a case that the number of repetitions is 1, i.e., no repetitions, the wireless terminal may determine all subbands are available for the PDSCH. For example, in a case that the number of repetitions is larger than 1 (i.e., with repetitions), the wireless terminal may determine the subband-wise availability according to one of the case 1 to the case 6. The number of repetitions may be provided by the base station via RRC signaling or DCI format.

Additionally, or alternatively, as described below for example in Section B below, the wireless terminal may determine the size of a transport block based on the number of punctured resources.

B. First Approach: Subband-Based Puncturing

A first example implementation or approach to the generic example embodiment and mode, herein called "Approach 1", involves "puncturing" of a resource of a physical downlink channel if the frequency resource assignment for the physical downlink channel overlaps with resources that are unavailable for the physical downlink channel, i.e., overlaps with uplink, UL, resources. The example embodiment and mode of Section B hereof is illustrated below with the Physical Downlink Shared Channel, PDSCH being the representative physical downlink channel, although again it should be illustrated that the Physical Downlink Shared Channel, PDSCH is just one example of a physical downlink channel for which the technology may be employed.

In approach 1, from the vantage point of a wireless terminal, the wireless terminal punctures resource of a PDSCH if the allocated PRBs overlaps with resource(s) not available for the PDSCH. For example, with the assumption of FIG. 7, if subband #1 is not available for the PDSCH and subband #0 and #2 are available for the PDSCH, the wireless terminal punctures the resource blocks with indices 9 to 14. In that case, the wireless terminal may also puncture the gaps adjacent to the subband #1, i.e., PRBs with index 8 and index 15. On the other hand, if all subbands are available for the PDSCH, wireless terminal need not and therefore may not puncture any PRBs in the allocated PRBs.

Additionally, or alternatively, the size of the transport block in a PDSCH may be determined based on calculating the number of punctured resources in a case that approach 1 is applied to the PDSCH. For example, before determining the size of the transport block, the wireless terminal may determine the number of punctured resource blocks $n^{punctured}_{PRB}$ according to the subband-wise availability. Further, the wireless terminal may determine that the size of the transport block based on the number $n_{PRB} - n^{Punctured}_{PRB}$ in replace of $n_{PRB}$ where $n_{PRB}$ is the number of resource blocks for a PDSCH indicated by a DCI format.

Thus Approach 1 of Section B hereof encompasses subband-based puncturing, where subbands are defined within a serving cell. Subbands may be considered to be similar to component carriers, but differ from carrier aggregation in that the subbands are configured within the serving cell.

FIG. 8B shows a network 20 which implements the first approach and which is similar to the network of generic example embodiment and mode of FIG. 8A. The elements, units, and functionalities shown in FIG. 8B which have the same reference numbers as those in FIG. 8A are understood to have essentially the same structure and operation unless otherwise noted herein or plain from the context. In the example embodiment and mode of FIG. 8B, the base station processors 34 additionally comprise node puncturing unit 70. The node puncturing unit 70 uses an alternate resource allocation technique to puncture the resources in the case that one or more default mapping schemes would map a virtual resource block of a physical downlink channel to a physical resource block which is unavailable for the physical downlink channel. Correspondingly, the wireless terminal processor(s) 60 comprise terminal puncturing unit 80. In all example embodiments and modes described herein, the base station node 26 may send to wireless terminal 30 information about the alternate resource allocation technique that the base station node 26 employed for its operation, e.g., for the actual virtual resource block to physical resource block mapping utilized by base station node 26. Such communications may occur by any appropriate method, such as RRC signaling, for example.

Figure 11:
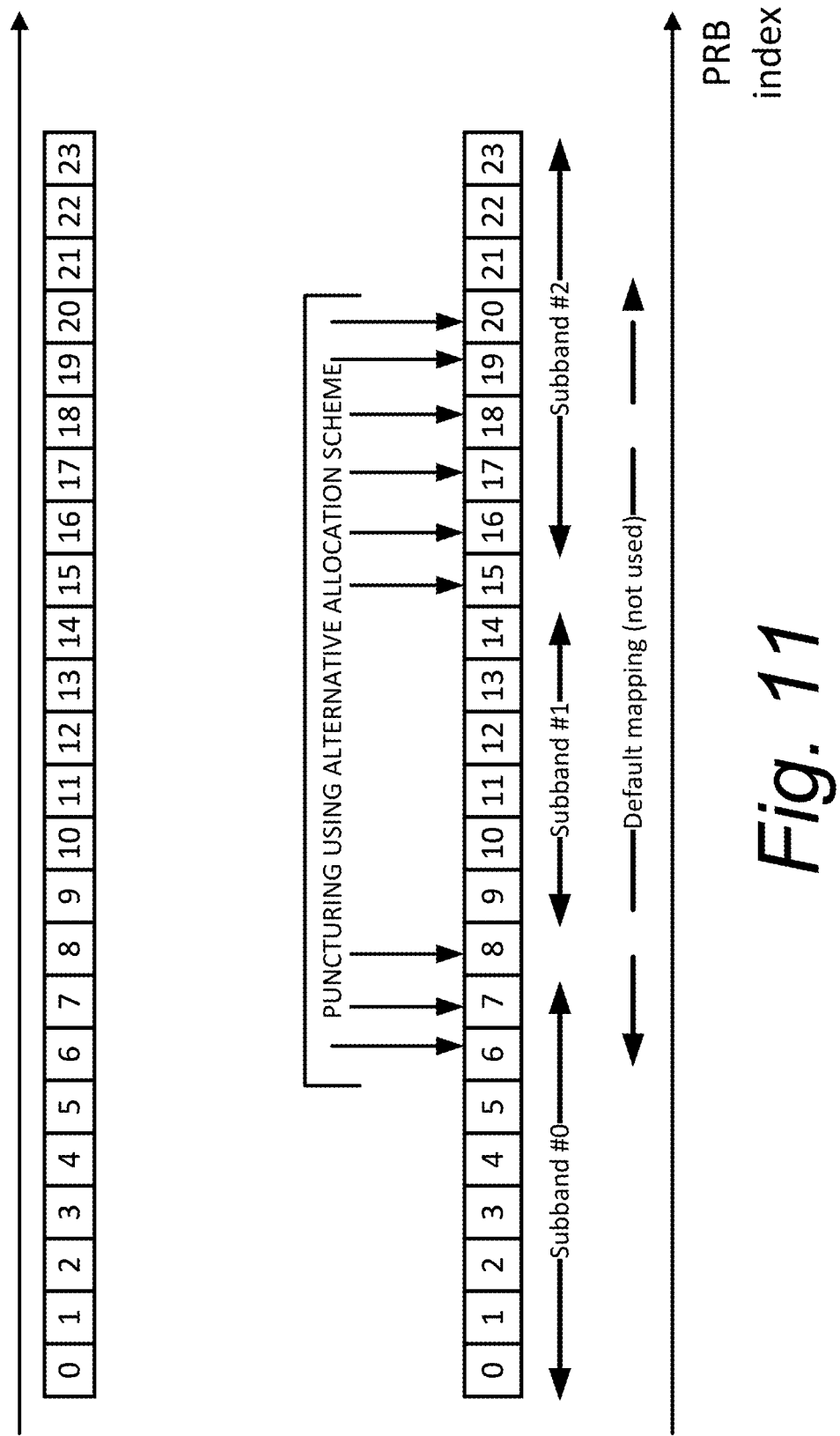
FIG. 11 is a diagrammatic view showing an example of a puncturing operation that may be performed in accordance with the example embodiment and mode of FIG. 8B.

FIG. 11 illustrates an example puncturing operation that may be performed by node puncturing unit 70 and terminal puncturing unit 80 in the case that one or more default mapping schemes would map a virtual resource block of a physical downlink channel to a physical resource block which is unavailable for the physical downlink channel. The resources of FIG. 11 are essentially similar to those of FIG. 7, showing three subbands including subband #0, subband #1, and subband #2. FIG. 11 shows, as an example, that the default mapping scheme 47/67, acting on the virtual resource block indices indicated by a problematic RIV, would map the virtual resource block indices which are associated with or belonging to a physical downlink channel, such as a Physical Downlink Shared Channel, PDSCH, to a set of physical resource blocks that belong to more than one subband. In particular, FIG. 11 shows that the base station, when provided with a problematic RIV by when using a default VRB-to-PRB mapping scheme would attempt to map the virtual resource blocks to PRBs 6 to 20, i.e., to PRBs shown at locations 6 through and including 20. But using the default mapping scheme with the problematic RIV means that the resulting allocated PRBs overlaps with PRBs that are unavailable. In particular, RPBs at locations 8 to 15 may be unavailable by reason of being uplink resources rather than downlink resources, and therefore are not available for a mapping of a physical downlink channel. Therefore, since PRBs with index 8 to 15 are actually not available for the PDSCH, e.g., because those physical resource blocks are used for UL transmission, in accordance with the puncturing technique of Section B hereof the base station node 26 only transmits the PDSCH using PRBs 6, 7, 16, 17, 18, 19, and 20. In this sense, the resources of PRBs 8 to 15 are said to be "puncture", or "cancelled" with respect to the physical downlink channel.

The alternative allocation scheme or "puncturing" of Approach 1 may result in less physical resource blocks being used for the physical downlink channel than would be the case for the default mapping scheme. But the reduction in number of physical resource blocks utilized can essentially be compensated by adjusting the transmission rate of these physical resource blocks at base station node 26, and the reception rate at wireless terminal 30.

FIG. 11 thus illustrates a scenario in which the one or more default mapping schemes would map the virtual resource blocks of the physical downlink channel to a range of physical resource blocks, e.g., to physical resource blocks 6 through and including 20. As explained above, a first subset of the physical resource blocks of the range, i.e., physical resource blocks 9 through and including 14, is unavailable for the physical downlink channel. The first subset of physical resource blocks 9-14 is unavailable by reason of being in a different subband, and in particular a subband which is uplink. But in FIG. 11 a second subset of the physical resource blocks in the range, i.e., physical resource blocks 6-8 and 16-20 is available for the physical downlink channel. It therefore turns out that five fewer physical resource blocks are used to carry the physical downlink channel. However, by adjusting the rate of the physical resource blocks included in the second subset, i.e., in physical resource blocks 6-8 and 16-20, the content of the physical downlink channel can be transmitted to and received by wireless terminal 30.

In the above regard, transmission quality of a PDSCH is given by effective coding rate $R_{eff} = N_{TBS}/N_{REs}$ where $N_{TBS}$ is the number of information bits (i.e., TBS (Transport Block Size)) transmitted by the PDSCH and $N_{REs}$ is the resource amount (e.g., the number of resource elements). $N_{TBS}$ can be controlled by the base station via MCS (Modulation and Coding Scheme) field in a DCI format which is used for scheduling of the PDSCH. Therefore, since, before transmitting the DCI format, the base station knows that only PRBs 6, 7, 16, 17, 18, 19, and 20 are actually allocated for the PDSCH, the base station can lower the number $N_{TBS}$ such that certain transmission quality is maintained.

For example, for a given communication link, let's assume $R_{eff} = 0.5$ provides the best transmission quality for a PDSCH, 100 REs per PRB is available for a PDSCH, and 1 bit is transmitted per resource element. In that case, if PRBs 6 to 20 are available for a PDSCH, $N_{TBS}=R_{eff}*N_{REs}=0.5*100*15=750$ bits should be the best choice for the PDSCH. On the other hand, if only PRBs 6, 7, 16, 17, 18, 19, and 20 are usable for the PDSCH, the base station can signal $N_{TBS}=R_{eff}*N_{REs}=0.5*100*7=350$ bits instead of 750 bits. Therefore, even when almost half of resource elements have been punctured due to collision with UL subband (or UL resource), the base station can maintain the best transmission quality via DCI format.

FIG. 9B shows example acts or steps which may be performed by the base station node 26 of FIG. 8B. Act 9B-1 comprises making a determination that the one or more default mapping schemes would map the virtual resource blocks of the physical downlink channel to a range of physical resource blocks, and wherein a first subset of the physical resource blocks in the range is unavailable for the physical downlink channel and a second subset of the physical resource blocks in the range is available for the physical downlink channel. Act 9B-2 and act 9B-3 are performed if the determination of act 9B-1 is positive. Act 9B-2 comprises adjusting a reception rate of the physical downlink channel so that the physical downlink channel can be received in the second subset of the range. Act 9B-3 comprises using the alternate resource allocation technique to allocate the virtual resource blocks for the physical downlink channel to the physical resource blocks of the second subset.

FIG. 10B shows example acts or steps which may be performed by the wireless terminal 30 of FIG. 8B. Act 10B-1, which is the same as act 9B-1 of FIG. 9B, comprises making a determination that the one or more default mapping schemes would map the virtual resource blocks of the physical downlink channel to a range of physical resource blocks, and wherein a first subset of the physical resource blocks in the range is unavailable for the physical downlink channel and a second subset of the physical resource blocks in the range is available for the physical downlink channel. Act 10B-1 thus presumes that wireless terminal 30 has received from base station node 26 information concerning scheduling of a virtual resource block for a physical downlink channel. Act 10B-2 comprises receiving, e.g., from base station node 26 over the radio interface 32, information concerning an alternate resource allocation technique, e.g., how the base station node 26 performs it puncturing. Act 10B-3 and act 10B-4 are performed if the determination of act 10B-1 is positive. Act 10B-3 comprises adjusting a reception rate of the physical downlink channel so that the physical downlink channel can be received in the second subset of the range. Act 10B-4 comprises using the alternate resource allocation technique to obtain the physical downlink channel from the physical resource blocks of the second subset.

Therefore, Approach 1 encompasses a wireless terminal communicating with a base station in a serving cell with multiple subbands. The wireless terminal 30 comprises terminal processors 60 which are configured to determine a set of PRBs in more than one subband among the multiple subbands for a PDSCH based on a Resource Indication Value (RIV) and a VRB-to-PRB mapping. The receiver circuitry 54 is configured to receive the PDSCH. The processors 60, e.g. terminal mapping checker 68 determines availability of each of the more than one subband, and the terminal puncturing unit 80 is configured to puncture a second set of PRBs among the set of PRBs which belongs to subbands determined as not available.

C. Second Approach: 1:1 Mapping

A second example implementation or approach to the generic example embodiment and mode, herein called "Approach 2", involves performance of "puncturing" of a 1:1 VRB-to-PRB mapping such that the allocated PRBs do not include any PRB not available for the physical downlink channel. For example, in the situation shown in FIG. 7, if subband #1 is not available for the physical downlink channel and subband #0 and #2 are available for the physical downlink channel, the wireless terminal determines that PRBs with indices 9 to index 14 are not available. In that case, the wireless terminal may also determine that the gaps adjacent to the subband #1 are not available. Various examples for the VRB-to-PRB mapping schemes are described below, assuming VRB with index 8 to VRB with index 13 are allocated for a physical downlink channel. A first example described in Section C.1 involves non-interleaved mapping; a second example described in Section C.2 involves inter-leaved mapping.

FIG. 8C shows a network 20 which implements the second approach and is similar to the network of generic example embodiment and mode of FIG. 8A. The elements, units, and functionalities shown in FIG. 8C which have the same reference numbers as those in FIG. 8A are understood to have essentially the same structure and operation unless otherwise noted herein or plain from the context. In the example embodiment and mode of FIG. 8C, the base station processors 34 additionally comprise node 1:1 alternative mapping unit 72. The node 1:1 alternative mapping unit 72 uses an alternate resource allocation technique to perform a 1:1 mapping of virtual resource block index to physical resource block, but instead of using the default mapping schemes, uses one or more of the alternative allocation techniques described in Section C. Correspondingly, wireless terminal processor(s) 60 comprise terminal 1:1 alternative mapping unit 82.

FIG. 9C shows example acts or steps which may be performed by the base station node 26 of FIG. 8C. Act 9C-1 comprises the base station node 26 making a determination whether one or more default mapping schemes, for mapping virtual resource blocks to physical resource blocks, would map a virtual resource block of a downlink channel, e.g., the Physical Downlink Shared Channel, PDSCH, to a physical resource block which is unavailable for such downlink channel. Act 9C-2 and act 9C-3 are performed if the determination of act 9C-1 is positive. Act 9C-2 comprises sending information regarding the alternate resource allocation technique to wireless terminal 30. Act 9C-3 comprises using the alternate resource allocation technique so that the virtual resource blocks for the physical downlink channel are not mapped to any physical resource block which is unavailable for the physical downlink channel, but are instead mapped to physical resource blocks which are available for the physical downlink channel. The act 9C-2 and act 9C-3 may be performed in any order.

FIG. 10C shows example acts or steps which may be performed by the wireless terminal 30 of FIG. 8C. Act 10C-1, which is the same as act 9C-1 of FIG. 9C, comprises making a determination whether one or more default mapping schemes, for mapping virtual resource blocks to physical resource blocks, would map a virtual resource block of a downlink channel to a physical resource block which is unavailable for such downlink channel. Act 10C-2 comprises receiving, e.g., from base station node 26 over the radio interface 32, information concerning an alternate resource allocation technique. Act 10B-3 is performed if the determination of act 10C-1 is positive. Act 10B-3 comprises using the alternate resource allocation technique so that the virtual resource blocks for the physical downlink channel are not mapped to and thus not received in any physical resource block which is unavailable for the physical downlink channel, but are instead mapped to and received in physical resource blocks which are available for the physical downlink channel.

C.1 Second Approach: 1:1 Non-Interleaved Mapping

Figure 12:
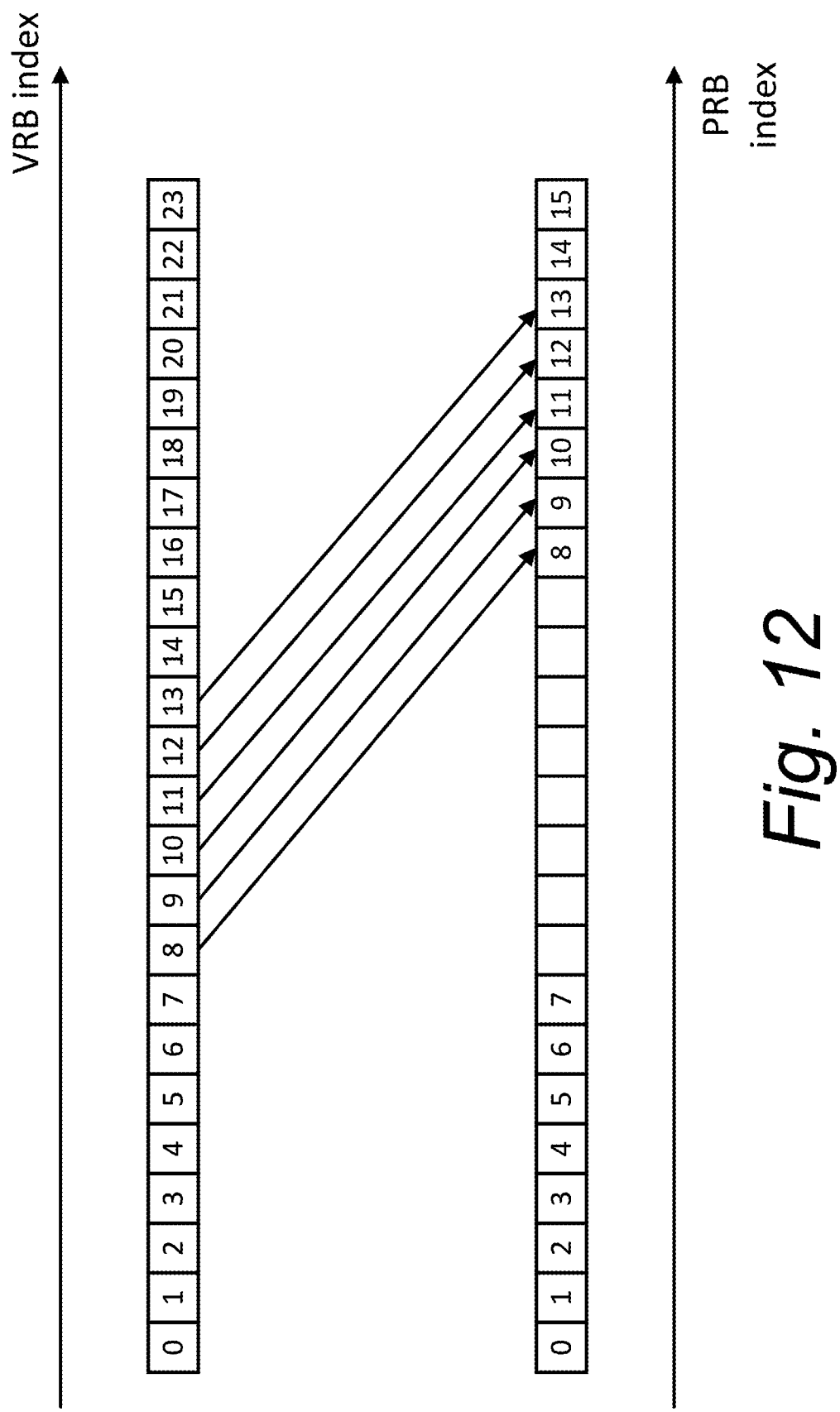
FIG. 12 is a diagrammatic view showing an example of a non-interleaved VRB-to-PRB mapping scheme for a PDSCH scheduled by a DCI format 1_1 with approach 2.

A first example implementation of Approach 2 involves a non-interleaved VRB-to-PRB mapping scheme for a physical downlink channel scheduled by a DCI format 1_1. FIG. 12 shows an example of non-interleaved VRB-to-PRB mapping scheme for a PDSCH scheduled by a DCI format 1_1 with approach 2. If VRB with index 8 to index 13 are available for the physical downlink channel, e.g., are allocated for the PDSCH, the wireless terminal determines that PRB with index 8 to index 13 are allocated PRBs which may be used to receive the physical downlink channel. On the other hand, in the approach 2, if the determination of act 10C-1 is positive, the PRB indices is mapped in ascending order of frequency excluding PRBs not available for PDSCH. Therefore, Indexes are not mapped to PRBs not available for PDSCH.

In other words, in the example embodiment and mode of FIG. 8C and Section C, the alternate resource allocation technique is used to map virtual resource blocks with consecutively increasing virtual resource block indices to physical resource blocks which are available for the physical downlink channel and which have with corresponding physical resource block indices, the physical resource blocks with corresponding physical resource block indices being increasingly and preferably consecutively ordered among one or more sets of the physical resource block.

C.2 Second Approach: 1:1 Interleaved Mapping

Figure 13:
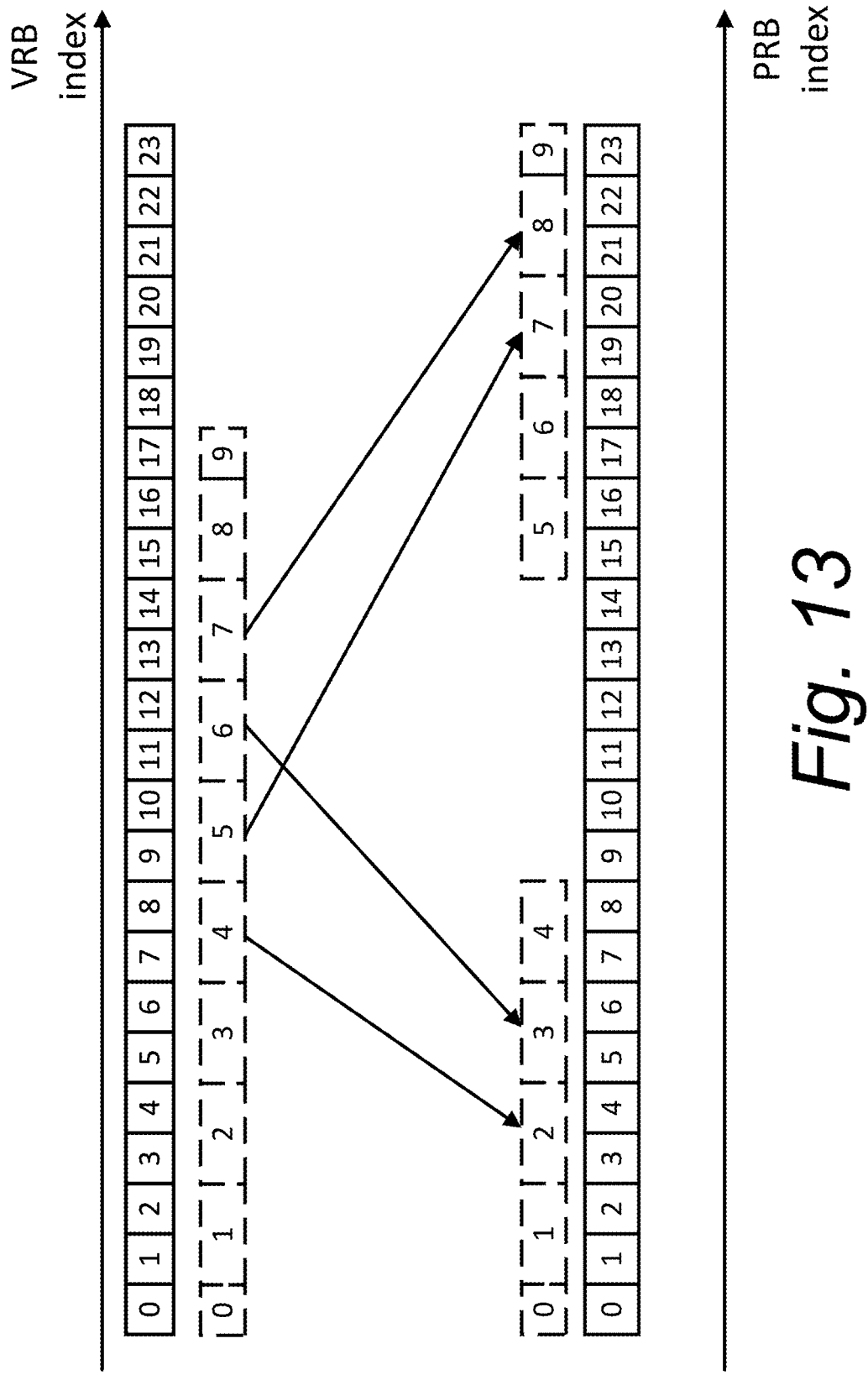
FIG. 13 is a diagrammatic view showing an example of an interleaved VRB-to-PRB mapping scheme for a physical downlink channel scheduled by a DCI format 1_1 with approach 2.

A first example implementation of Approach 2 involves an interleaved VRB-to-PRB mapping scheme for a physical downlink channel scheduled by a DCI format1_1. FIG. 13 shows an example of interleaved VRB-to-PRB mapping scheme for a physical downlink channel scheduled by a DCI format 1_1 with approach 2.

In the interleaving implementation of approach 2, the set of $N_{BWP}^{size} - N_{unave}$ resource blocks in the active BWP with starting position $N_{BWP}^{start}$ are divided into $N_{bundle} = \lceil (N_{BWP}^{size} - N_{unave} + \mathrm{mod}(N_{BWP}^{start} - N_{unave}, L))/L \rceil$ resource-block bundles in increasing order of the resource-block number where L is the bundle size for the active BWP. In detail, resource block bundle with index 0 comprises of $L - \mathrm{mod}(N_{BWP}^{start}, L)$ continuous resource blocks, resource block bundle with index $N_{bundle}-1$ comprises of $\mathrm{mod}(N_{BWP}^{start} + N_{BWP}^{size} - N_{unave}, L)$ resource blocks if mod $(N_{BWP}^{start} + N_{BWP}^{size} - N_{unave}, L)$ is larger than 0, and resource block bundle with index $N_{bundle}-1$ comprises of L resource blocks if $\mathrm{mod}(N_{BWP}^{start} + N_{BWP}^{size} - N_{unave}, L)$ is equal to 0. Other resource block bundles than resource block bundle with index 0 and resource block bundle with index $N_{bundle}-1$ comprises of L resource blocks. Here, $N_{unave}$ corresponds to the number of PRBs that is in resource block bundles only with PRBs not available for the PDSCH. In another example, $N_{unave}$ corresponds to the number of PRBs that is in resource block bundles at least including PRBs not available for the PDSCH. For example, $N_{unave}$ may be determined based on referring the PRBs not available for the PDSCH. In the example described in FIG. 9, $N_{unave}=6$ is assumed.

In FIG. 13, boxes with doted lines represents resource block bundles whereas boxes with solid lines represents resource blocks. Also, it is assumed that the value of $N_{BWP}^{start}$ is odd, and L is 2 in the example of FIG. 13. Therefore, the resource block bundle with index 0 is comprised of $L - \mathrm{mod}(N_{BWP}^{start}, L)=1$ resource block. Also, the resource block bundle with index $N_{bundle}-1 = \lceil N_{BWP}^{size} - N_{unave} + \mathrm{mod}(N_{BWP}^{start}, L))/L \rceil - 1 = 9$ comprises of mod $(N_{BWP}^{start} + N_{BWP}^{size} - N_{unave}, L)=1$ resource block where $N_{BWP}^{size}$ is 24.

For interleaved VRB-to-PRB mapping, the unit of VRB-to-PRB mapping is resource block bundles. For example, resource block bundle j in virtual resource blocks is mapped to resource block bundle $f(j)=rC+c$ where $j=cR+r$, $r=0,1, \ldots, R-1$, $c=0,1, \ldots, C-1$, $R=2$, and $C=\lfloor N_{bundle}/R \rfloor$. Also, resource block bundle with index $N_{bundle}-1$ in VRB domain is mapped to resource block bundle with index $N_{bundle}-1$ in PRB domain. For example, in the case of FIG. 13, if VRB with index 8 to index 13 are allocated for the PDSCH, the wireless terminal determines VRB-to-PRB mapping for resource block bundles. In the example, resource block bundle with index 4 in VRB domain is mapped to resource block bundle with index 2 in PRB domain, resource block bundle with index 5 in VRB domain is mapped to resource block bundle with index 7 in PRB domain, resource block bundle with index 6 in VRB domain is mapped to resource block bundle with index 3 in PRB domain, and resource block bundle with index 7 in VRB domain is mapped to resource block bundle with index 8 in PRB domain. The VRB-to-PRB mapping results in resource blocks with index 4, 19, 20, 5, 6, and 21 as allocated PRBs.

D. Third Approach: Virtual Resource Block Exclusion

A third example implementation or approach to the generic example embodiment and mode, herein called "Approach 3", involves excluding VRBs corresponding to PRBs not available for a physical downlink channel. In approach 3, VRBs corresponding to PRBs not available for a PDSCH are excluded from frequency domain resource assignment. For example, in the scenario of resources shown in FIG. 7, if subband #1 is not available for the PDSCH and subband #0 and #2 are available for the PDSCH, the wireless terminal determines PRB with index 9 to index 14 are not available. In that case, the wireless terminal may also determine that the gaps adjacent to the subband #1 are not available. Various examples for the VRB-to-PRB mapping schemes are described assuming VRB with index 8 to VRB with index 13 are allocated for a physical downlink channel, such as PDSCH.

FIG. 8D shows a network 20 which implements the third approach and which is similar to the network of generic example embodiment and mode of FIG. 8D. The elements, units, and functionalities shown in FIG. 8D which have the same reference numbers as those in FIG. 8A are understood to have essentially the same structure and operation unless otherwise noted herein or plain from the context. In the example embodiment and mode of virtual resource block exclusion unit 84. The third approach may comprise or include various implementations shown in section D.1-D.2 below.

Figure 9D:
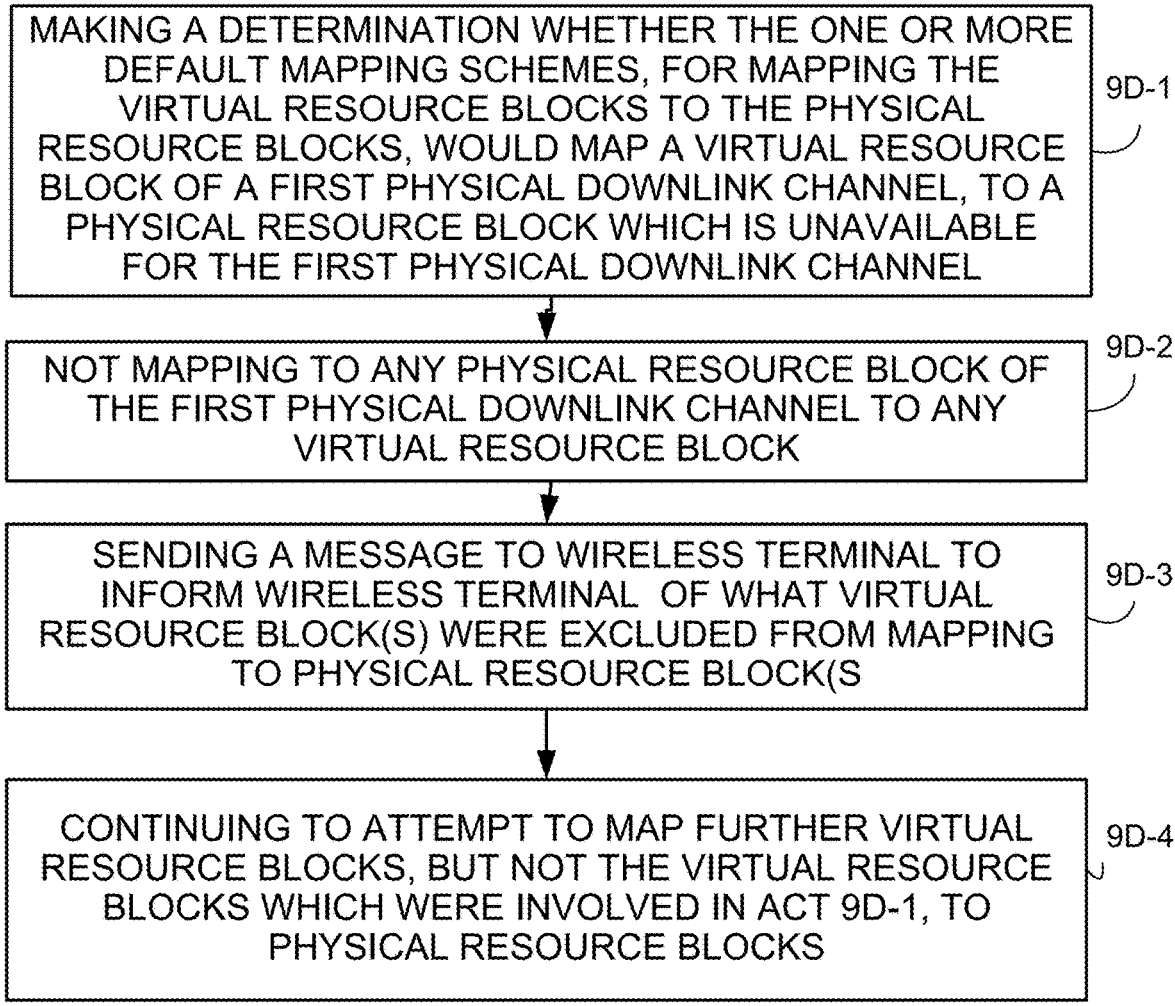

FIG. 9D shows example acts or steps which may be performed by the base station node 26 of FIG. 8D. Act 9D-1 comprises the base station node 26 making a determination whether the one or more default mapping schemes, for mapping the virtual resource blocks to the physical resource blocks, would map a virtual resource block of a first physical downlink channel, to a physical resource block which is unavailable for the first physical downlink channel. Act 9D-2 through act 9D-3 are performed in a case that the first determination of act 9D-1 is positive. Act 9D-2 comprises not mapping to any physical resource block of the first physical downlink channel to any virtual resource block. Act 9D-3 comprises the base station node 26 sending a message to wireless terminal 30 to inform wireless terminal 30 of what virtual resource block(s) were excluded from mapping to physical resource block(s). Act 9D-4 comprises the base station node 26 continuing to attempt to map further virtual resource blocks, but not the virtual resource blocks which were involved in act 9D-1, to physical resource blocks. The execution of act 9D-4 may involve a further determination act similar to act 9D-1, and depending on such further determination act the further virtual resource blocks may be mapped either according to the default mapping schemes or, if the further determination is positive, the further virtual resource blocks may be mapped according to one or more of the approaches 1, 2, and 3 as described in Sections B, C, and D, respectively. If approach 3 is invoked for the further virtual resource blocks, those further virtual resource blocks are also excluded from allocation to physical resource blocks.

Figure 10D:
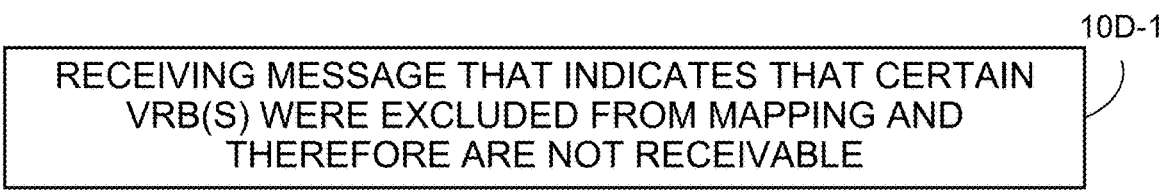

FIG. 10D shows example acts or steps which may be performed by the wireless terminal 30 of FIG. 8D. Act 10D-1 comprises the wireless terminal 30 receiving the message of act 9D-3 from the base station node 26, which informs wireless terminal 30 that certain virtual resource blocks were excluded from mapping. Therefore the wireless terminal 30 need not take any action with respect to attempting to receive physical resource blocks for such excluded virtual resource block(s).

D.1 Third Approach: Non-Interleaved Vrb Exclusion Mode

Figure 14:
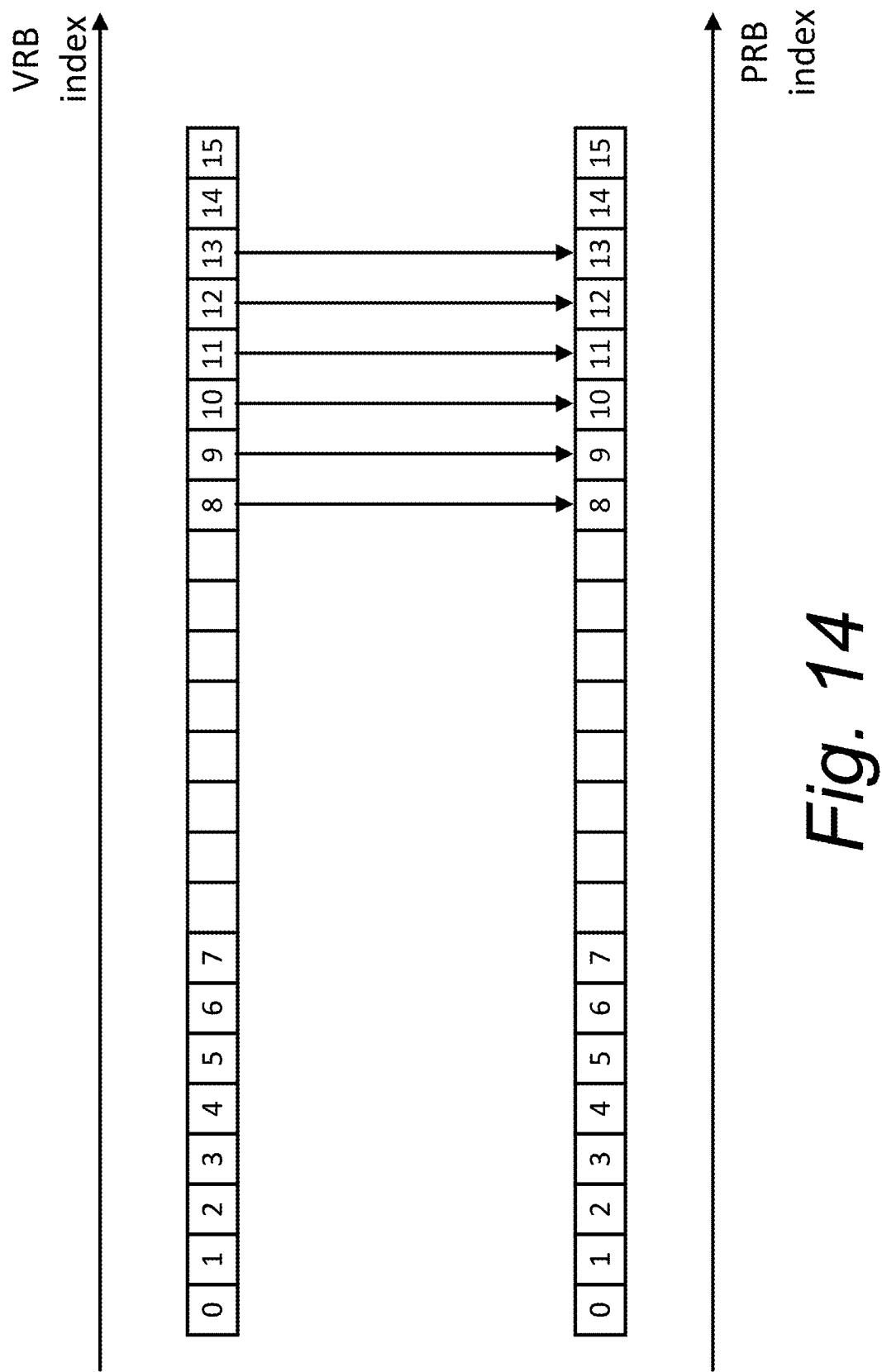
FIG. 14 is a diagrammatic view showing an example of a non-interleaved VRB-to-PRB mapping scheme in a situation in which virtual resource blocks may be excluded from mapping to physical resource blocks.

A first example implementation of Approach 3 involves a non-interleaved VRB-to-PRB mapping scheme for a physical downlink channel scheduled by a DCI format 1_1. FIG. 14 shows an example of non-interleaved VRB-to-PRB mapping scheme for a PDSCH scheduled by a DCI format 1_1 with approach 3. If VRB with index 8 to index 13 are available for the PDSCH, the wireless terminal determines that PRB with index 8 to index 13 are allocated PRBs. On the other hand, in approach 3, if the determination is positive, the VRB index is mapped in ascending order of frequency excluding VRBs corresponding to PRBs not available for PDSCH. Therefore, Indexes are not mapped to VRBs corresponding to PRBs not available for PDSCH.

In Approach 3, FIG. 14 shows that some VRBs, which correspond to VRB address 8 through 15 in FIG. 14, simply are not used at all, they are skipped. So instead of using VRB addresses 8-15 to describe PDSCH, the base station essentially subsequently attempts to map other VRB addresses, i.e., VRB address 16-21, to which the base station now assigns indices 8-13, and will map the content of those VRB addresses having indices 8-13 to PRB addresses 16-21, and therefore PRB address 16-21 have indices 8-13. So in this sense in Approach 3 the PRBs not available for PDSCH are not used, but neither are the VRBs that would have been mapped to them. So from the foregoing it is understood that VRBs being excluded" does not mean that "VRBs with index are excluded". Therefore, VRBs corresponding to PRBs not available for a PDSCH are excluded, but VRB index 8 to 15 remain. FIG. 14 thus shows that VRB indexing is enhanced such that the VRBs corresponding to PRBs not available for a PDSCH are excluded.

D.2 Third Approach: Interleaved Vrb Exclusion Mode

Figure 15:
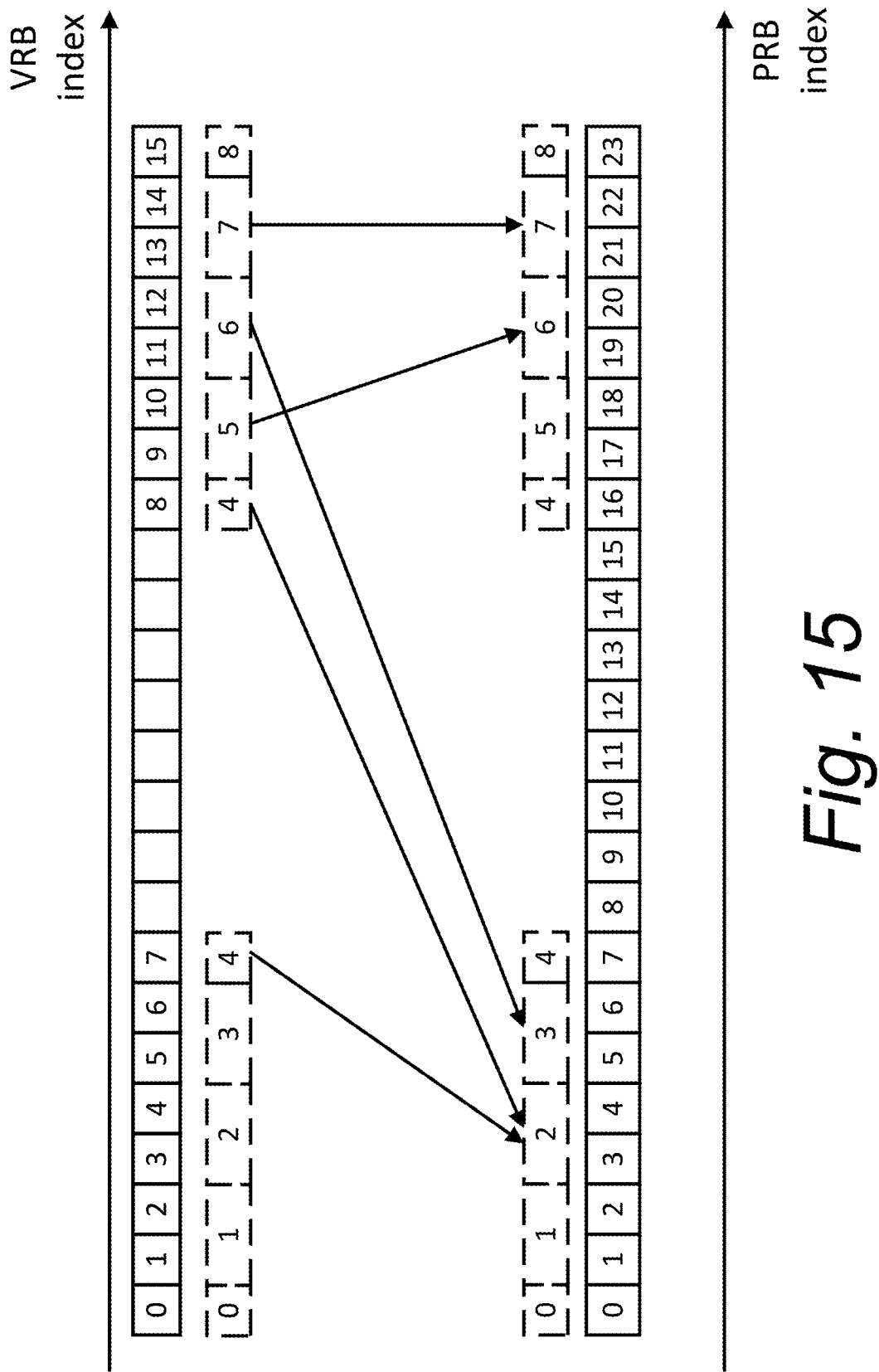
FIG. 15 is a diagrammatic view showing an example of a interleaved VRB-to-PRB mapping scheme in a situation in which virtual resource blocks may be excluded from mapping to physical resource blocks.

A second example implementation of Approach 3 involves an interleaved VRB-to-PRB mapping scheme for a physical downlink channel scheduled by a DCI format 1_1. FIG. 15 shows an example of interleaved VRB-to-PRB mapping scheme for a PDSCH scheduled by a DCI format 1_1 with approach 3. In approach 3, the set of $N_{BWP}^{size}-N_{unave}$ resource blocks in the active BWP with starting position $N_{BWP}^{start}$ are divided into $N_{bundle}=\lceil(N_{BWP}^{size}-N_{unave}+\mathrm{mod}(N_{BWP}^{start}-N_{unave}, L))/L\rceil$ resource-block bundles in increasing order of the resource-block number where L is the bundle size for the active BWP. In details, resource block bundle with index 0 comprises of L−mod$(N_{BWP}^{start}, L)$ continuous resource blocks, resource block bundle with index $N_{bundle}-1$ comprises of $\mathrm{mod}(N_{BWP}^{start}+N_{BWP}^{size}-N_{unave}, L)$ resource blocks if $\mathrm{mod}(N_{BWP}^{start}+N_{BWP}^{size}-N_{unave}, L)$ is larger than 0, and resource block bundle with index $N_{bundle}-1$ comprises of L resource blocks if $\mathrm{mod}(N_{BWP}^{start}+N_{BWP}^{size}-N_{unave}, L)$ is equal to 0. Other resource block bundles than resource block bundle with index 0 and resource block bundle with index $N_{bundle}-1$ comprises of L resource blocks. Here, $N_{unave}$ corresponds to the number of VRBs corresponding to PRBs not available for the PDSCH. For example, $N_{unave}$ may be determined based on referring the PRBs not available for the PDSCH. In the example described in FIG. 9, $N_{unave}=8$ is assumed.

In FIG. 15, boxes with doted lines represents resource block bundles whereas boxes with solid lines represents resource blocks. Also, it is assumed that the value of $N_{BWP}^{start}$ is odd, and L is 2 in the example of FIG. 15. Therefore, the resource block bundle with index 0 is comprised of L−mod$(N_{BWP}^{start}, L)=1$ resource block. Also, the resource block bundle with index $N_{bundle}-1=\lceil(N_{BWP}^{size}-N_{unave}+\mathrm{mod}(N_{BWP}^{start}, L))/L\rceil-1=8$ comprises of mod$(N_{BWP}^{start}+N_{BWP}^{size}-N_{unave}, L)=1$ resource block where $N_{BWP}^{size}$ is 24.

For interleaved VRB-to-PRB mapping, the unit of VRB-to-PRB mapping is in resource block bundles. For example, resource block bundle j in virtual resource blocks is mapped to resource block bundle f(j)=rC+c where j=cR+r, r=0,1, . . . , R−1, c=0,1, . . . , C−1, R=2, and C=$\lfloor N_{bundle}/R \rfloor$. Also, resource block bundle with index $N_{bundle}-1$ in VRB domain is mapped to resource block bundle with index $N_{bundle}-1$ in PRB domain. For example, in the case of FIG. 11, if VRB with index 8 to index 13 are allocated for the PDSCH, the wireless terminal determines VRB-to-PRB mapping for resource block bundles. In the example, resource block bundle with index 4 in VRB domain is mapped to resource block bundle with index 2 in PRB domain, resource block bundle with index 5 in VRB domain is mapped to resource block bundle with index 6 in PRB domain, resource block bundle with index 6 in VRB domain is mapped to resource block bundle with index 3 in PRB domain, and resource block bundle with index 7 in VRB domain is mapped to resource block bundle with index 7 in PRB domain. The VRB-to-PRB mapping results in resource blocks with index 4, 19, 20, 5, 6, and 21 as allocated PRBs.

E: Wireless Terminal Signaling Selective Reception Capability

Figure 25:
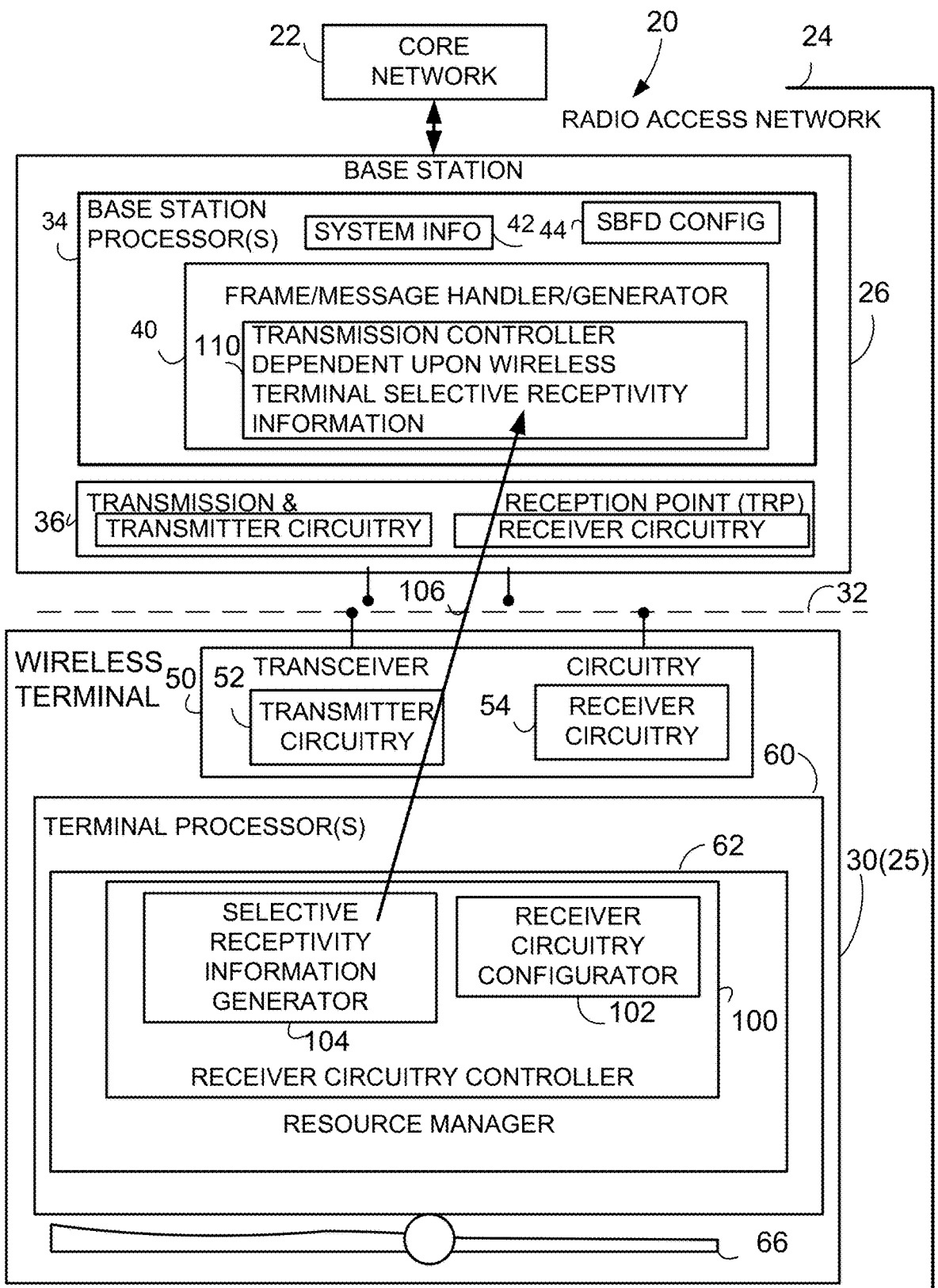
FIG. 25 is a schematic view of a communications system showing a core network, a radio access network, with the radio access network including a wireless terminal which is configured to signal selective receptivity of the wireless terminal to the radio access network

FIG. 25 shows, in generic manner, a communications system of Section E hereof. In the communications network of Section E, a wireless terminal is configured to signal a selective reception capability of the wireless terminal to the network, e.g., to send wireless terminal selective receptivity information to an access node. The wireless terminal selective receptivity information indicates to the access node whether the wireless terminal has the capability of configuring the receiver circuitry of the wireless terminal so that the wireless terminal is able to receive certain radio resources, such as certain subbands, and not receive other radio resources, e.g., other subbands. In so doing, the wireless terminal may be able to filter unwanted radio resources, e.g., unwanted subbands, from reception. Since not all wireless terminals may have such capability, the wireless terminal sends the wireless terminal selective receptivity information to inform the access node whether or not the wireless terminal in fact has such capability. Accordingly, a base station may take into consideration that some wireless terminals may not have capability to receive only wanted radio resources, e.g., wanted subbands in SBFD region, and particularly where the wanted subbands are non-continuous. In cases in which the wireless terminal informs the access node that the wireless terminal does not have the capability to configure the wireless terminal receiver circuitry, the access node may determine not to transmit to the wireless terminal on the radio resources, e.g., the subbands, that the wireless terminal does not want.

Figure 26:
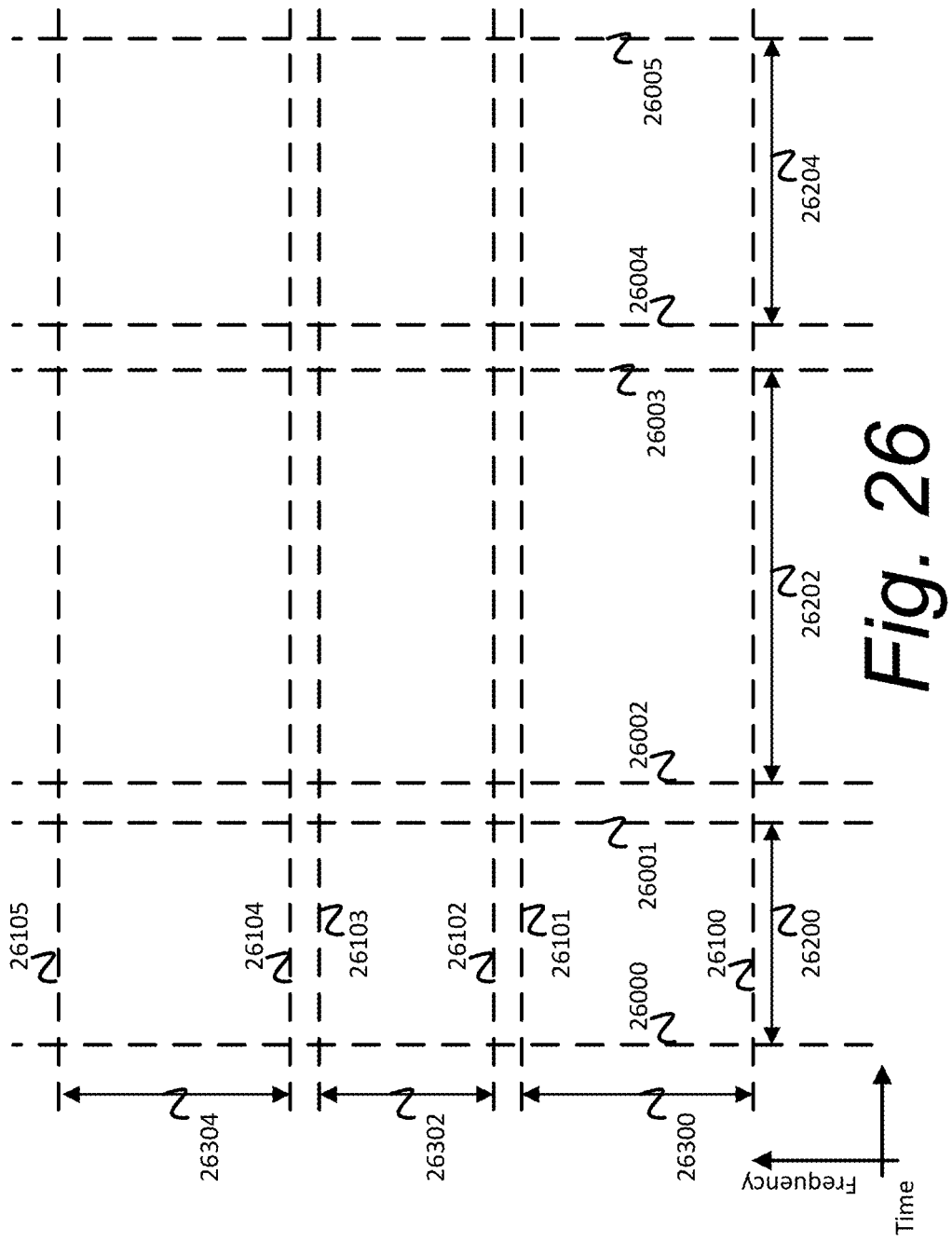
FIG. 26 is a diagrammatic view of an example of time-frequency resource grid for SBFD operation according to an example embodiment and mode.
Figure 27:
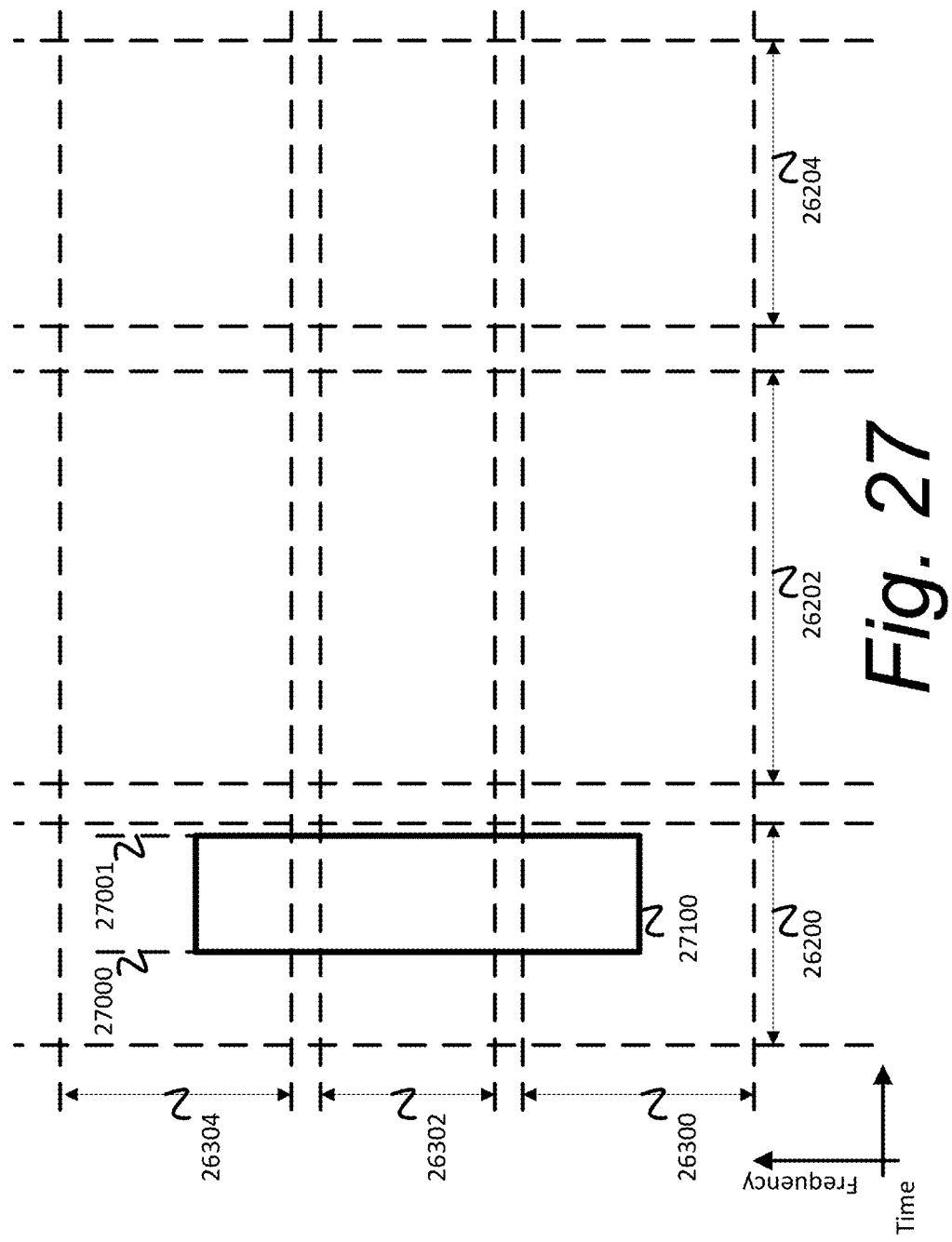
FIG. 27 is a diagrammatic view of an example of resource mapping on the SBFD resource grid according to an example embodiment and mode.
Figure 28:
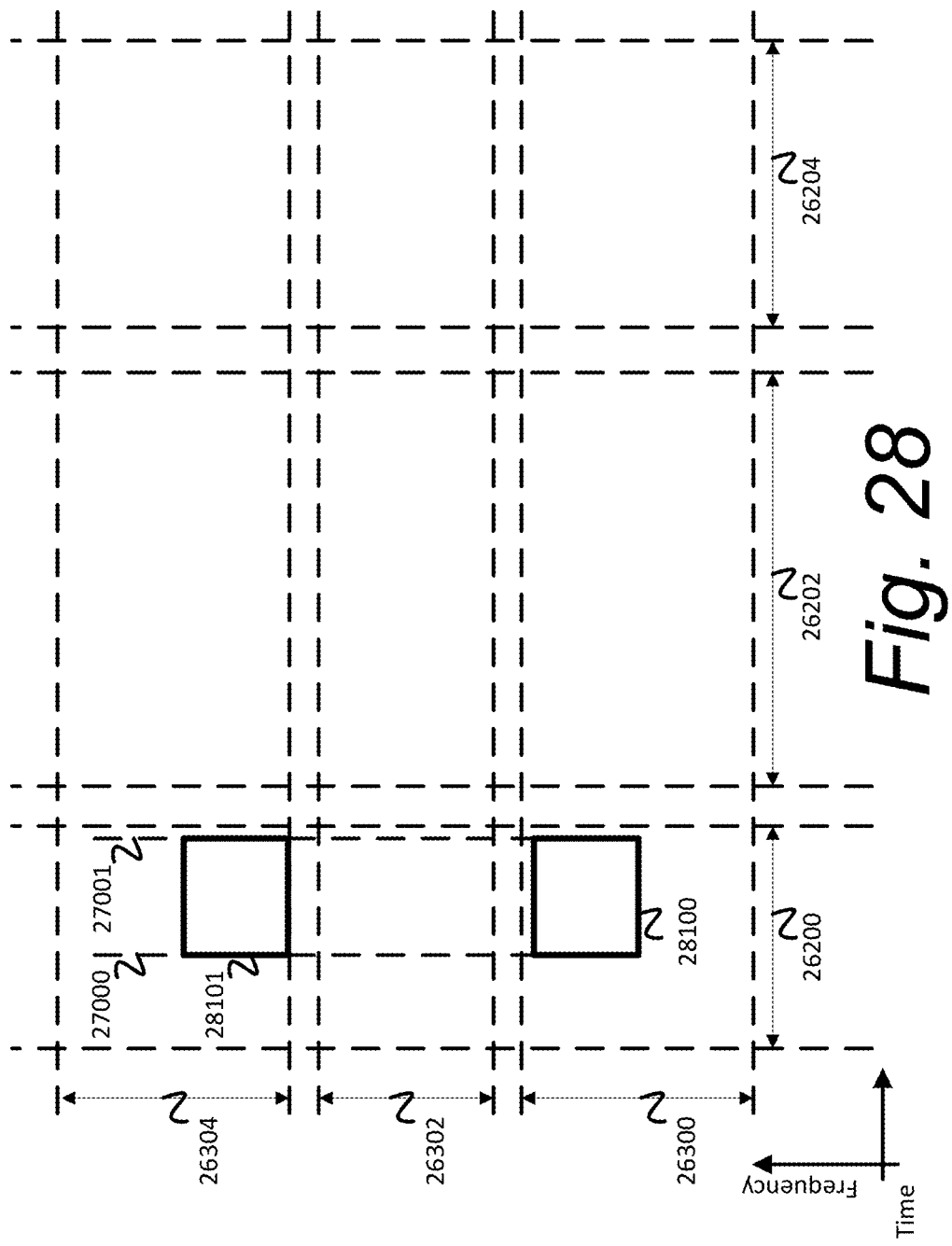
FIG. 28 is a diagrammatic view of an example of resource mapping on the SBFD resource grid according to an example embodiment and mode.

FIG. 26-FIG. 28 serve as introduction to provide a basis of understanding of the operation of the example technology of Section E. Thereafter the operation of the example technology of Section E is further described, e.g., with reference to FIG. 25 and FIG. 30-FIG. 31. In the ensuing discussion, comparably referenced units and functionalities of FIG. 25 are, unless otherwise stated or clear from the context, understood to have similar structure and operation as the generic system of FIG. 8A.

E.1: Architecture

The network 20 of FIG. 25, which may be a 5G network, for example, comprises core network 22 connected to at least one radio access network 24. The radio access network 24 in turn comprises one or more radio access network (RAN) nodes, such as example base station node 26 which is shown as being connected to the core network 22 by wireline(s) 28. The base station node 26 serves at least one cell.

The radio access network, RAN, 24 typically comprises plural access nodes, one example access nodes 26 being illustrated as a base station node in FIG. 25. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), a relay node, a mobile relay node, or some other similar terminology.

FIG. 25 shows the radio access network 24, and base station node 26 through its cell in particular communicating with wireless terminal 30A across a radio or air interface 32. The base station node 26 may, and usually does, communicate with plural wireless terminals across the air interface 32. Only one wireless terminal 30A is shown for sake of simplicity, it being understood that other wireless terminals may be provided and may operate in similar manner as the wireless terminal 30A herein illustrated.

FIG. 25 shows base station node 26 as comprising base station processor circuitry which may comprise one or more base station processors 34, as well as base station transceiver circuitry 36. As illustrated in FIG. 25, the base station transceiver circuitry 36 may be a transmission and reception point (TRP). The transmission and reception point (TRP) 36 may further comprise transmitter circuitry and receiver circuitry.

The base station processors 34 may comprise frame/message handler/generator 40 which prepares and generates information including user data and messages, e.g., signaling, for transmission over the radio interface 32, as which also processes information received over the radio interface 32. The base station processors 34 may also comprise system information block, SIB, generator 42 which serves to generate or at least store system information which is broadcast over the radio interface 32. The base station processors 34 may also comprise SBFD configuration memory 44, which stores the configuration of the Sub-Band Full Duplex, SBFD, region. In some example embodiments and modes or scenarios, the SBFD configuration information may be included in the system information generated by system information block, SIB, generator 42. In other example embodiments and modes or scenarios, the SBFD configuration information may be included in radio resource control, RRC, signaling generated by a radio resource control unit which comprises base station processors 34 and which is included in a RRC message generated by frame/message handler/generator 40.

As used herein, SBFD configuration is comprised of information for configuring the wireless terminal. SBFD configuration may include information for configuring some or all of UL subband, DL subband, and SBFD region. For example, SBFD configuration may include information indicating SBFD region. For example, SBFD configuration may include information indicating TDD pattern. For example, SBFD configuration may include information indicating size and/or location of subbands.

For example, the base station processer(s) 34 may optionally include virtual resource block to physical resource block mapper 46. For example, in a case that the base station processer(s) 34 includes virtual resource block to physical resource block mapper 46, the node mapping checker may make a determination whether one or more of default mapping schemes 47 would map a virtual resource block of a downlink channel, such as the Physical Downlink Shared Channel, PDSCH, to a physical resource block which is unavailable for the downlink channel assuming that resource blocks in the second subbands are unavailable for the downlink channel.

Communication between radio access network (RAN) 22 and wireless terminal over the radio interface 32 may occur on various layers. Layer 1 includes radio layer 1 or the physical layer. Higher layers, e.g., layers higher than Layer 1 may include radio layer 2 and radio resource control layer 3. The layer 1 communication may occur by utilization of "resources". Reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource may occur in the context of a "frame" of information that is typically formatted and prepared, e.g., by a node. The frame is understood with reference to preceding discussions thereof. As used herein, "serving cell frequency resource" refers to a plurality of radio resources which may radio resources comprising layer 1 communications between base station node 26 and wireless terminal 30. As such, "serving cell frequency resource" encompasses and includes a frame, having examples described above, or a resource grid, or plural carriers, for example. The serving cell frequency resource typically includes a control region. In New Radio, the control region can be placed in any region in time/frequency domain, whereas in some earlier LTE versions the control region should be preferably located in the beginning of a subframe. The control region may include scheduling information. An example of scheduling information is a PDCCH with a downlink control information, DCI format. The scheduling information may describe or reference other portions of the serving cell frequency resource. The other portion of serving cell frequency resource that may be described or referenced by the scheduling information may be one or more physical channels. An example physical channel is the physical downlink shared channel, PDSCH.

The base station node 26 may be structured essentially as shown in FIG. 25 or may be a node having architecture such as split architecture comprising a central unit and one or more distributed units that comprise mobile termination (MT). The base station processor(s) may include one or more TRPs.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

FIG. 25 also shows various example constituent components and functionalities of wireless terminal 30(25). For example, FIG. 25 shows wireless terminal 30(25) as comprising terminal transceiver circuitry 50. The transceiver circuitry 50 in turn may comprise terminal transmitter circuitry 52 and terminal receiver circuitry 54. The terminal transceiver circuitry 50 may include antenna(e) for the wireless transmission. Terminal transmitter circuitry 52 may include, e.g., amplifier(s), modulation circuitry and other conventional transmission equipment. Terminal receiver circuitry 54 may comprise, e.g., amplifiers, demodulation circuitry, and other conventional receiver equipment.

The terminal receiver circuitry 54 is, in the generic example embodiment and mode of FIG. 25, configured to receive, over the radio interface, e.g., radio transmissions in one or more subbands in a serving cell. Further, the terminal receiver circuitry 54 is configured to receive receiving the transmissions in first set of subbands.

FIG. 25 further shows wireless terminal 30(25) also comprising wireless terminal processor circuitry, e.g., one or more wireless terminal processor(s) 60. The wireless terminal 30(25), e.g., wireless terminal processor(s) 60, may comprise resource manager 62. The resource manager 62 may also be referred to or function as a frame/message generator/handler.

For example, the resource manager 62 may optionally include virtual resource block to physical resource block mapper 66. For example, in a case that the resource manager 62 includes virtual resource block to physical resource block mapper 66, the virtual resource block to physical resource block mapper 66 may assume that the resource blocks in the secondary subbands as unavailable for a physical downlink shared channel.

The wireless terminal processor(s) 60 may also comprise receiver circuitry controller 100, which controls or governs operation of, e.g., the terminal receiver circuitry 54. FIG. 25 shows receiver circuitry controller 100 as being hosted by resource manager 62, but the structure and operations performed by receiver circuitry controller 100 may be located or distributed elsewhere within wireless terminal 30(25). The receiver circuitry controller 100 further comprises receiver circuitry configurator 102 and selective receptivity information generator 104. The wireless terminal processor (s) 60 may also serve, at least in part, as RRC layer processing circuitry. If wireless terminal 30(25) has a capability of configuring terminal receiver circuitry 54, e.g., of determining what resources, e.g., in what subbands, the terminal receiver circuitry 54 can or is permitted to receive signals, the receiver circuitry configurator 102 provides such instruction or governance to terminal receiver circuitry 54. Moreover, regardless of whether or not the wireless terminal 30(25) has a capability of configuring terminal receiver circuitry 54, the selective receptivity information generator 104 serves to generate wireless terminal selective receptivity information which is indicative of such capability. That is, the wireless terminal selective receptivity information indicates whether or not the wireless terminal has the capability of configuring its terminal receiver circuitry 54 so that the terminal receiver circuitry 54 receives "wanted" radio resources, e.g., wanted subbands. Some subbands may be unwanted in the sense that the unwanted subbands may be prone to interference, e.g., with transmissions from other wireless terminals, particularly in SBFD regions. Thus, the wireless terminal processor(s) 60 are configured to generate wireless terminal selective receptivity information, the wireless terminal selective receptivity information indicating whether the wireless terminal has a capability to configure the receiver circuitry for controlling in which of the subbands the receiver circuitry receives transmissions. The terminal transmitter circuitry 52 serves to send transmissions across the radio interface, including the wireless terminal selective receptivity information. FIG. 25 shows the transmission of wireless terminal selective receptivity information from wireless terminal 30(25) to access node 26 by arrow 106.

In view of the wireless terminal 30(25) having the capability of generating and transmitting the wireless terminal selective receptivity information, the access node 26 comprises transmission controller 110. Transmission controller 110 serves, e.g., to govern transmissions from base station transceiver circuitry 36, and to do so dependent upon wireless terminal selective receptivity information 110. For example, and as mentioned before, n cases in which the wireless terminal selective receptivity information transmitted by the wireless terminal informs the access node that the wireless terminal does not have the capability to configure the wireless terminal receiver circuitry, the access node may determine not to transmit to the wireless terminal on the radio resources, e.g., the subbands, that the wireless terminal does not want.

E.2: Operation

As mentioned above, FIG. 26-FIG. 28 serve as introduction to provide a basis of understanding of the operation of the example technology of Section E. FIG. 26 shows an example of time-frequency resource grid for subband full duplex, SBFD operation, also referred to as SBFD resource grid. In FIG. 26, broken lines 26000 to 26005 represent or correspond to respective points in the time domain, i.e., respective time points. Region 26200 is defined or shown the region between points 26000 and 26001. The unlabeled region between 26001 and 26002 is a time domain gap. Region 26202 is defined or shown as the region between 26002 and 26003. The unillustrated region between 26003 and 26004 is a time domain gap. Region 26204 is defined or shown as the region between 26004 and 26005. In terms of the frequencies of the grid of FIG. 26, subband 26300 is defined or shown as the subband between broken lines 26100 and 26101. The unlabeled subband between 26101 and 26102 is a frequency domain gap. Subband 26302 is defined or shown as the subband between broken lines 26102 and 26103. The unlabeled subband between 26103 and 26104 is a frequency domain gap. Subband 26304 is defined or shown as the subband between broken lines 26104 and 26105.

As used herein, the time domain gaps may be a gap for downlink-uplink switching. Also, the frequency domain gaps may be referred to as guard bands. Further, the region between 26000 and 26005 may be referred to as a reference cycle. For example, a TDD pattern may be the reference cycle. Further, bandwidth between 26100 and 26105 may be referred to as serving cell frequency resource. For example, region 26200 may be a downlink region; region 26202 may be a SBFD region; and, region 26204 may be an uplink region.

FIG. 27 shows a first example of resource mapping on the SBFD resource grid. In FIG. 27, 27100 represents a set of resources. The start of the set of resources 27100 in the time domain is represented by broken line 27000, and the end of the set 27100 in the time domain is represented by broken line 27001. As shown in FIG. 27, the set of resources 27100 is spread over all subbands of FIG. 27 in the frequency domain.

The set of resources 27100 is monitored by the wireless terminal. For example, the set of resources 27100 may be for a PDSCH. As a more specific and non-limiting example, the set of resources 27100 may be configured as a control resource set.

A wireless terminal may process the set of resources 27100 shown in FIG. 27 by performing acts such as act 27-1 to act 27-3. Act 27-1 comprises configuring the terminal receiver circuitry 54 such that the terminal receiver circuitry 54 can receive signals in the serving cell frequency resource. Act 27-2 comprises buffering of the signals received between 27000 and 27001 into a memory of the wireless terminal. Act 27-3 comprises the wireless terminal at least attempting to and preferably decoding information in the set of resources 27100 after completion of buffering the signals at time 27001.

FIG. 28 shows another example of resource mapping on the SBFD resource grid. In FIG. 28, a set 28100 represents a set of resources. The start of the set of resources 38100 in the time domain is represented by broken line 27000, and the end of the set of resources in time domain is represented by broken line 27001. Also, set 28101 represents another set of resources, the start of the set of resources 28101 in the time domain is represented by broken line 27000, and the end of the set of resources 28101 in the time domain is represented by broken line 27001. As shown in FIG. 28, the set of resources 28100 is confined within the subband 26300, and the set of resources 28101 is confined within the set subband 26304.

The sets of resources 28100 and 28101 is to be monitored by the wireless terminal. For example, the sets of resources 28100 and 28101 may be for a PDSCH. As a more specific but non-limiting example, each set of resources 28100 and 28101 may be for a PDSCH. As yet further non-limiting examples, the sets of resources 28100 and 28101 may be configured as a control resource set, or may be configured as a control resource set.

The wireless terminal processes the sets of resources 28100 and 28101 by example, non-limiting, representative acts such as act 28-1 to act 28-3. Act 28-1 comprises configuring the terminal receiver circuitry 54 such that the terminal receiver circuitry 54 can receive signals in the serving cell frequency resource. Act 28-2 comprises the wireless terminal buffering the signals in between time 27000 and 27001. Act 28-3 comprises the wireless terminal at least attempting to and preferably decoding information in the sets of resources 28100 and 28101 after completion of buffering the signals at time 27001.

FIG. 29 shows yet another example of resource mapping on the SBFD resource grid. In FIG. 29, set 29100 represents a set of resources. The start of the set of resources 29100 in the time domain is represented by broken line 29000, and the end of the set of resources 29100 in the time domain is represented by broken line 29001. Also, set 29101 represents another set of resources of FIG. 29, the start of the set of resources 29101 in time domain is represented by broken line 29000, and the end of the set of resources 29101 in the time domain is represented by broken line 29001. As shown in FIG. 29, the set of resources 29100 is confined within the subband 26300, and the set of resources 29101 is confined within the set subband 26304.

The sets of resources 29100 and 29101 is to be monitored by the wireless terminal. The sets of resources 29100 and 29101 may be for different types of information or downlink channels. For example, the sets of resources 29100 and 29101 may be for a PDSCH. As an alternative example, each set of resources 29100 and 29101 is for a PDSCH. As more specific and non-limiting examples, the sets of resources 29100 and 29101 may be configured as a control resource set or may be configured as a control resource set.

The wireless terminal 30(25) is configured to generate and transmit information herein described broadly as wireless terminal selective receptivity capability information. For example, the wireless terminal 30(25) comprises selective receptivity information generator 104 which may generate the wireless terminal selective receptivity information. The wireless terminal selective receptivity information may comprise an indication of whether the wireless terminal has the capability to configure receiver circuitry of the terminal, e.g., terminal receiver circuitry, to receive selected resources of a resource grid such as the SBFD resource grid. If such capability exists, the configuration of the receiver circuitry may be accomplished, for example, by the receiver circuitry configurator 102 of FIG. 25. Examples of the SBFD resource grid have been described above. It is beneficial for the wireless terminal to generate and transmit the wireless terminal selective receptivity information to the radio access network, since some wireless terminals may have the capability to selective configure the terminal receiver circuitry but other wireless terminals may not. Receiving the wireless terminal selective receptivity information enables an access node to communicate with and serve the wireless terminal more effectively, e.g., for the transmission controller 110 of the access node 26 to determine on what resources, e.g., what subbands, the access node should transmit to wireless terminal 30(25) in view of the wireless terminal' capability or lack of capability.

Returning to FIG. 29, a wireless terminal that has the capability to configure its terminal receiver circuitry 54 processes the sets of resources 29100 and 29101 by acts such as of Act 29-1 to Act 29-3. Act 29-1 comprises configuring the terminal receiver circuitry 54 such that the terminal receiver circuitry 54 can receive signals in the subband 26300 and 26304. Act 29-2 comprises the wireless terminal bufferring the signals in between 29000 and 29001 into a memory. Act 29-3 comprises the wireless terminal at least attempting to decode and preferably decoding information in the sets of resources 29100 and 29101 after completion of buffering the signals at time 29001.

Act 29-1 comprises the wireless terminal configuring the terminal receiver circuitry 54 to receive signals. In particular, the wireless terminal may configure the terminal receiver circuitry 54 to receive signals in the subband 26300 and 26304 on the one hand, but not to receive signals in the subband 26302 on the other hand.

Therefore, the wireless terminal may transmit signaling which includes capability information indicating whether to have a capability to configure the terminal receiver circuitry 54 to receive signals in the subband 26300 and 26304 in the region 26202 and to configure the terminal receiver circuitry 54 not to receive signals in the subband 26302 in the region 26202. Such signaling, herein also referred to as the wireless terminal selective receptivity information, may be radio resource control, RRC, signaling. Also, the base station may receive the signaling which includes the capability information.

The wireless terminal processor(s) 60, e.g., receiver circuitry configurator 102, may be configured to configure the receiver circuitry to receive transmissions in a first set of subbands and not to receive transmissions in a second set of subbands. Each set of subbands may be one or more subbands, and the subbands of a set may or may not be contiguous.

Thus, in an example embodiment and mode, the receiver circuitry 54 is configured to receive, from the serving cell, e.g., from access node 26, an indication of the first set of subbands in which the wireless terminal can receive the transmissions. The receiver circuitry 54 is configured to receive the transmissions in the first set of subbands. The receiver circuitry may be configured to receive the indication of the first set of subbands in radio resource control, RRC, signaling. The first set of subbands may comprise primary subband(s) and the second set of subbands may comprise secondary subband(s). The primary subband(s) may comprise a frequency resource for SS/PBCH blocks which defines a serving cell.

While some wireless terminals may have the capability to configure their terminal receiver circuitry 54, other wireless terminals may not have capability to configure the terminal receiver circuitry 54 to receive signals in the subband 26300 and 26304 in the region 26202 nor to configure the terminal receiver circuitry 54 not to receive signals in the subband 26302 in the region 26202. If the wireless terminal does not have the capability, the base station should transmit signals for the wireless terminal which does not have the capability only in one subband among the subband 26300 and 26304. The transmission controller 110 of the access node 26 may govern the selection of the subbands in which the access node 26 transmits to wireless terminal 30(25).

For example, in a case that the base station received the capability information indicating that the wireless terminal does not have the capability, the base station may indicate one primary subband to be monitored by the wireless terminal via RRC signaling or DCI format. For example, the base station may indicate the primary subband as the subband-wise availability, e.g., availability on a subband basis. As used herein, the subband-wise availability may be sent via RRC signaling, such as UE-specific RRC signaling or cell-specific RRC signaling. For example, the UE-specific RRC signaling may be a RRC signaling transmitted via DCCH. More specifically, as a non-limiting example, the UE-specific RRC signaling may be a RRC signaling which includes information for RRC reconfiguration. On the other hand, cell-specific RRC signaling is a RRC signaling transmitted via BCCH or CCCH. Cell-specific RRC signaling may include information which is cell-specific.

As used herein, a primary subband may also be referred to as a first subband; and a secondary subband may also be referred to as a second subband. In a case that one subband is configured as a primary subband, the remaining subbands may be referred to as secondary subbands.

The uplink/downlink/SBFD character of a region of potential receptivity may influence operation of the wireless terminal. For example, assume for FIG. 29 that 26200 is a downlink, DL, region; that region 26202 is a SBFD region; and that region 26204 is an uplink, UL, region; there are gaps between these regions for DL-UL switching. Consider first the region 26202 and a wireless terminal which does not have the capability, e.g., the capability to selective configure its receiver circuitry. Such wireless terminal may receive signals in the primary subband in the region 26202. For example, the wireless terminal which does not have the capability may not receive signals in the secondary subbands in the region 26202. For example, the wireless terminal which does not have the capability may not monitor a control resource set which partially or fully overlaps with secondary subbands in the region 26202. $For example, the wireless terminal which does not have the capability may not receive a PDSCH which partially or fully overlaps with secondary subbands in the region 26202. For example, the wireless terminal which does not have the capability may not receive a CSI-RS which partially or fully overlaps with secondary subbands in the region 26202.

Consider next the region 26200 and a wireless terminal which does not have the capability, e.g., the capability to configure its receiver circuitry. Such wireless terminal which does not have the capability may nevertheless monitor a control resource set which partially or fully overlaps with secondary subbands in the region 26200. For example, even in a case that the wireless terminal which does not have the capability, the wireless terminal which does not have the capability may receive a PDSCH which partially or fully overlaps with secondary subbands in the region 26200. For example, even in a case that the wireless terminal which does not have the capability, the wireless terminal which does not have the capability may receive a CSI-RS which partially or fully overlaps with secondary subbands in the region 26200. Despite not having the capability to configure its receiver circuitry, the wireless terminal in the region 26200 may receive on resources which partially or fully overlap with secondary subbands in region 26200 by virtue of the fact that region 26200 is a downlink region, which is in contrast to region 26202 which is a SBFD region.

In the example embodiments and modes described herein, the wireless terminal may determine the primary subband as a subband which includes synchronization signal, SS/physical broadcast, PBCH, block. For example, the SS/PBCH block may be a cell-defining SS/PBCH block.

In the example embodiments and modes described herein, the wireless terminal may determine the primary subband as a subband which includes control resource set with index 0.

FIG. 30 is a flow chart showing example, representative acts or steps performed by the wireless terminal 30(25) of the example embodiment and mode of FIG. 25. Act 30-1 comprises the wireless terminal generating wireless terminal selective receptivity information, the wireless terminal selective receptivity information indicating whether the wireless terminal has a capability to configure the receiver circuitry for controlling in which of one or more subbands the receiver circuitry receives transmissions. Act 30-1 may be performed by selective receptivity information generator 104. Act 30-2 comprises the wireless terminal transmitting the wireless terminal selective receptivity information to the serving cell, to the access node 26.

FIG. 31 is a flow chart showing example, representative acts or steps performed by the access node 26 of the example embodiment and mode of FIG. 25. Act 31-1 comprises the access node 26 receiving, from the wireless terminal, wireless terminal selective receptivity information. The wireless terminal selective receptivity information may indicate whether the wireless terminal has a capability to configure receiver circuitry of the wireless terminal for controlling in which of the subbands the receiver circuitry receives transmissions over the radio interface. Act 31-2 comprises the access node controlling, in dependence upon the wireless terminal selective receptivity information, in which subband(s) the access node transmits transmissions to the wireless terminal.

In some of its aspects the technology of Section E encompasses a wireless terminal comprising of reception circuitry and RRC layer processing circuitry, wherein the wireless terminal determines a first region and a second region in time domain, the second region is a region that the RRC layer processing circuitry is configured to send capability information that indicates whether the reception circuitry is able to receive the two subbands in the second region or not.. In a case that the RRC layer processing circuitry sent capability information that indicates the RF circuitry is not able to receive the two subbands in the second region, the RF circuitry may be configured to receive one subband among the two subbands in the second region. The one subband may be configured by RRC signaling from the base station. Further, the one subband may be indicated through the subband-wise availability information. The one subband may be a primary subband and the other subband may be a secondary subband. The primary subband may be a subband that includes frequency resource for SS/PBCH blocks which defines a serving cell. The primary subband may be a subband that includes frequency resource for control resource set with index 0.

The above-described embodiments, including the embodiments of FIG. 8A, FIG. 8B, FIG. 8C, FIG. 8D, and FIG. 25 may be combined with one another. For example, the system of Section E and FIG. 25 may be combined with technology such as that of Section A and FIG. 8A in which, e.g., an access node is configured to preclude mapping of a virtual resource block of a downlink channel to a physical resource block that is unavailable for the physical downlink channel. Alternatively or additionally, the system of Section E and FIG. 25 may be combined with technology such as that of Section B and FIG. 8B in which, e.g., a node puncturing unit uses an alternate resource allocation technique to puncture the resources in the case that one or more default mapping schemes would map a virtual resource block of a physical downlink channel to a physical resource block which is unavailable for the physical downlink channel. Alternatively or additionally, the system of Section E and FIG. 25 may be combined with technology such as that of Section C and FIG. 8C which involves, e.g., performance of "puncturing" of a 1:1 VRB-to-PRB mapping such that the allocated PRBs do not include any PRB not available for the physical downlink channel. Alternatively or additionally, the system of Section E and FIG. 25 may be combined with technology such as that of Section D and FIG. 8D which involves, e.g., excluding VRBs corresponding to PRBs not available for a physical downlink channel.

F: General Information

It should be understood that the various foregoing example embodiments and modes may be utilized in conjunction with one or more example embodiments and modes described herein.

OFDM:

In a wireless communication system according to one aspect of the present embodiment, at least OFDM (Orthogonal Frequency Division Multiplex) is used. An OFDM symbol is a unit of time domain of the OFDM. The OFDM symbol includes at least one or more subcarriers. Contents in an OFDM symbol are converted to a time-continuous signal in baseband signal generation. In downlink, at least CP-OFDM (Cyclic Prefix-Orthogonal Frequency Division Multiplex) is used. In uplink, either CP-OFDM or DFT-s-OFDM (Discrete Fourier Transform-spread-Orthogonal Frequency Division Multiplex) is used. DFT-s-OFDM may be given by applying transform precoding to CP-OFDM. CP-OFDM is OFDM using CP (Cyclic Prefix).

The OFDM symbol may be a designation including a CP added to the OFDM symbol. That is, an OFDM symbol may be configured to include the OFDM symbol and a CP added to the OFDM symbol.

Serving Cell and Component Carrier:

A serving cell may be configured to include at least one downlink component carrier (downlink carrier) and/or one uplink component carrier (uplink carrier). A serving cell may be configured to include at least two or more downlink component carriers and/or two or more uplink component carriers. A downlink component carrier and an uplink component carrier are also referred to as component carriers (carriers).

Resource Grid:

For example, one resource grid may be provided for one component carrier. For example, one resource grid may be provided for combination of a component carrier and a subcarrier-spacing configuration u. A subcarrier-spacing configuration u is also referred to as numerology. A resource grid includes $N^{size,\,u}_{grid,\,x} N^{RB}_{sc}$ subcarriers. The resource grid starts from a common resource block with index $N^{start,\,u}_{grid}$. The common resource block with the index $N^{start,\,u}_{grid}$ is also referred to as a reference point of the resource grid. The resource grid includes $N^{subframe,\,u}_{symb}$ OFDM symbols. The subscript x indicates the transmission direction, and indicates either downlink or uplink. One resource grid is provided for an antenna port p, a subcarrier-spacing configuration u, and a transmission direction x.

SCS-Specific Carrier:

$N^{size,\,u}_{grid,x}$ and $N^{start,\,u}_{grid}$ are given based at least on a higher-layer parameter (e.g. referred to as higher-layer parameter CarrierBandwidth). The higher-layer parameter is used to define one or more SCS (SubCarrier-Spacing) specific carriers. One resource grid corresponds to one SCS specific carrier. One component carrier may comprise one or more SCS specific carriers. The SCS specific carrier may be included in a system information block (SIB). For each SCS specific carrier, a subcarrier-spacing configuration u may be provided.

Slot and Subframes:

For each subcarrier-spacing configuration u, the number of slots included in a subframe and indexes are provided. For example, slot index $n^u_s$ is provided in ascending order with an integer value ranging from 0 to $N^{subframe,u}_{slot}-1$ in a subframe. For subcarrier-spacing configuration u, the number of slots included in a radio frame and indexes of slots included in the radio frame is provided. Also, the slot index $n^u_{s,f}$ is provided in ascending order with an integer value ranging from 0 to $N^{frame,u}_{slot}-1$ in the radio frame. Consecutive $N^{slot}_{symb}$ OFDM symbols are included in one slot. For example, $N^{slot}_{symb}=14$.

Figure 16:
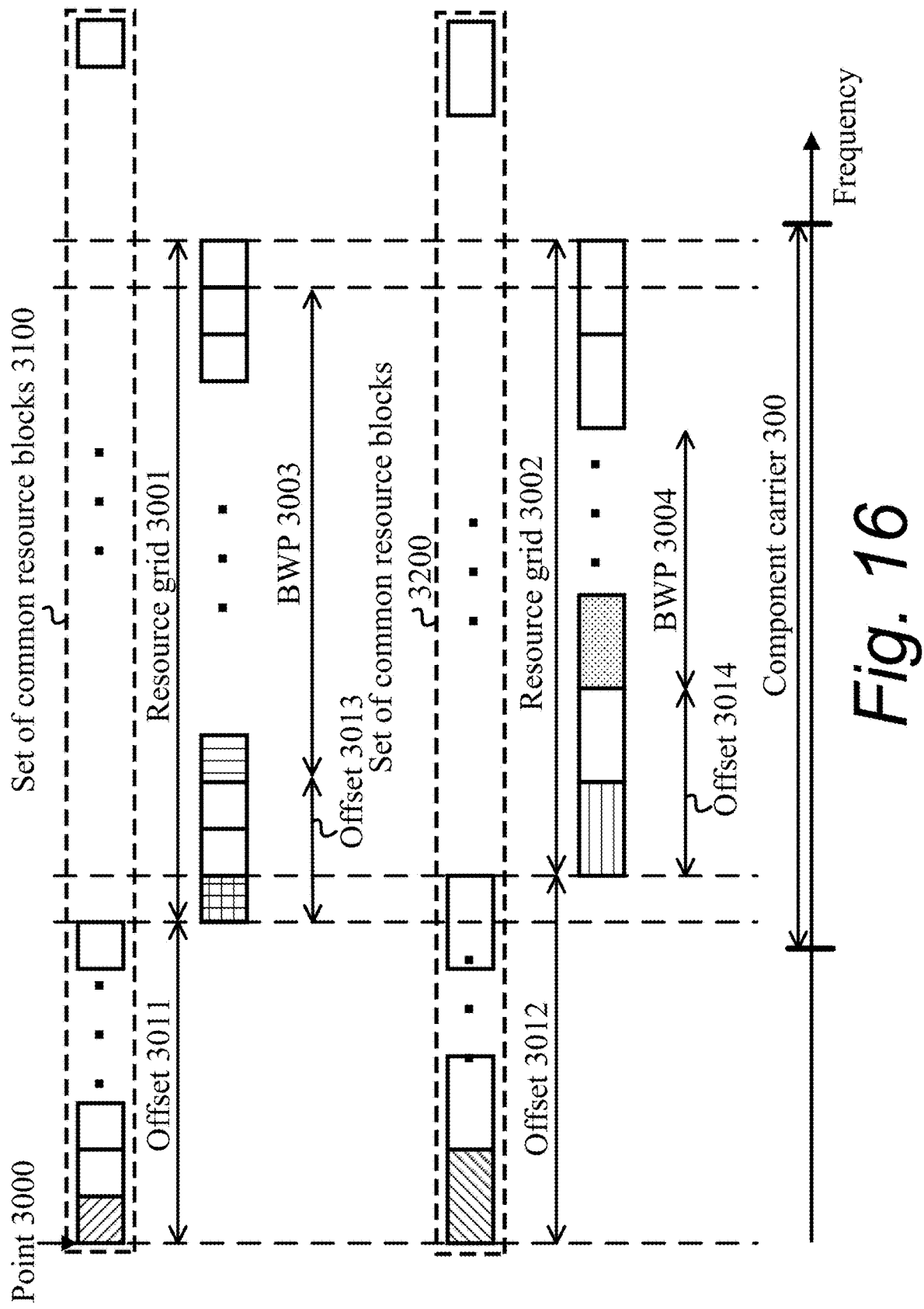
FIG. 16 is a diagram showing an example of a method of configuring a resource grid according to an example embodiment and mode.

Point A:

FIG. 16 is a diagram showing an example of a method of configuring a resource grid according to an aspect of the present embodiment. The horizontal axis in FIG. 16 represents frequency domain. FIG. 16 shows a configuration example of a resource grid of subcarrier-spacing configuration $u=u_1$ in the component carrier 300 and a configuration example of a resource grid of subcarrier-spacing configuration $u=u_2$ in a component carrier. Although it is assumed in FIG. 16 that $u_1=u_2-1$, various aspects of this embodiment are not limited to the condition of $u_1=u_2-1$.

The component carrier 300 is a band having a predetermined width in the frequency domain.

Point (Point) 3000 is an identifier for identifying a subcarrier. Point 3000 is also referred to as point A. The common resource block (CRB: Common resource block) set 3100 is a set of common resource blocks for the subcarrier-spacing configuration $u_1$.

Among the common resource block-set 3100, the common resource block including the point 3000 (the block indicated by the upper right diagonal line in Figure A3) is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by the number of common resource blocks which is relative to the subcarrier-spacing configuration $u_1$. The resource grid 3001 includes $N^{size,u}_{grid1,x}$ common resource blocks starting from the reference point of the resource grid 3001.

The offset 3013 is an offset from the reference point of the resource grid 3001 to the reference point ($N^{start,u}_{BWP,i1}$) of the BWP (BandWidth Part) 3003 of the index i1.

Common resource block-set 3200 is a set of common resource blocks with respect to subcarrier-spacing configuration $u_2$.

A common resource block including the point 3000 (a block indicated by a left-upward hatching in Figure A3) in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point of the resource grid 3002. The offset 3012 is indicated by the number of common resource blocks for subcarrier-spacing configuration $u=u_2$. The resource grid 3002 includes $N^{size,u}_{grid2,x}$ common resource blocks starting from the reference point of the resource grid 3002.

The offset 3014 is an offset from the reference point of the resource grid 3002 to the reference point ($N^{start,u}_{BWP,i2}$) of the BWP 3004 with index $i_2$.

Figure 17:
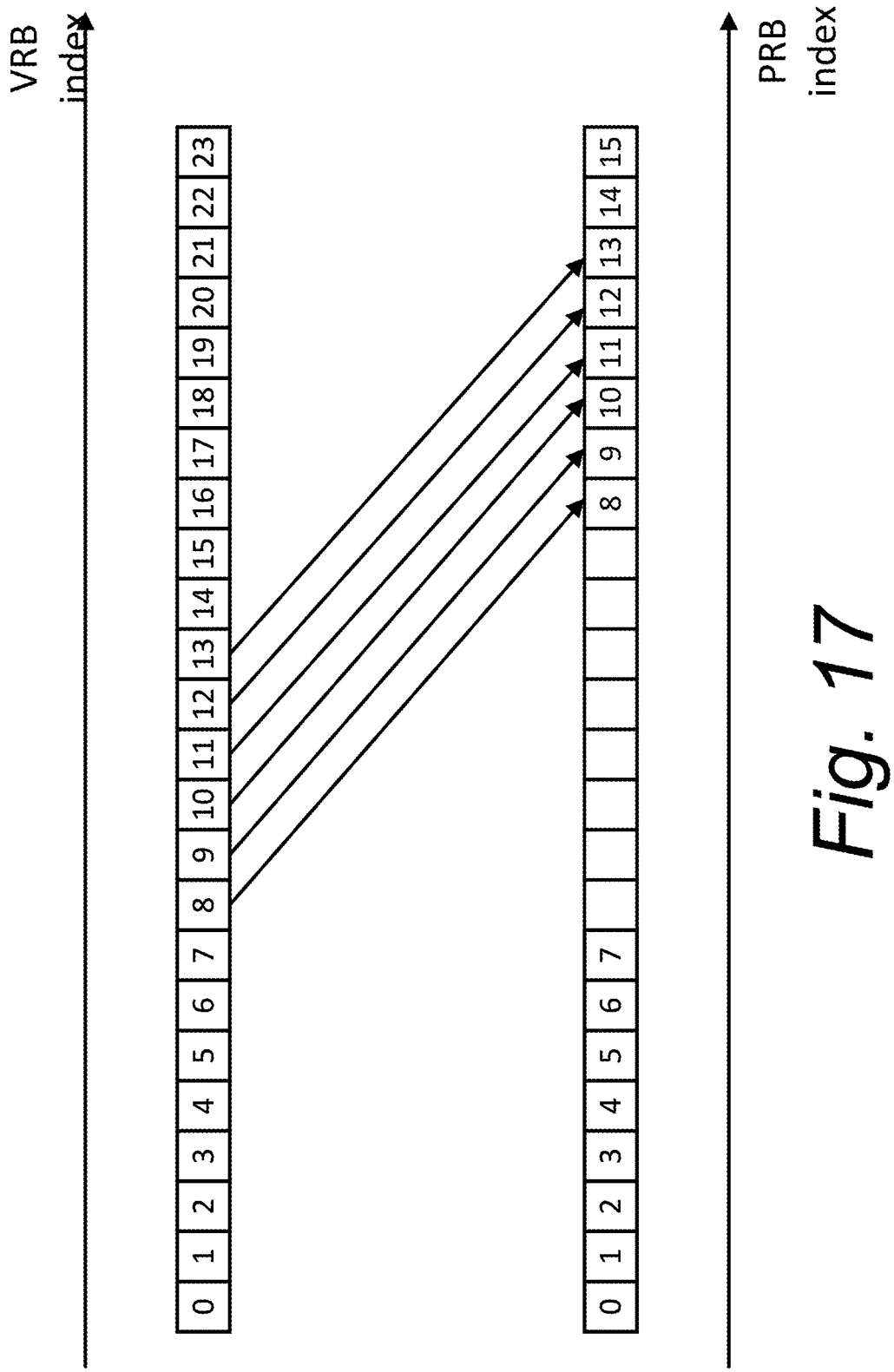
FIG. 17 is a diagram showing a configuration example of a resource grid 3001 according to an example embodiment and mode.

Resource Element:

FIG. 17 is a diagram showing a configuration example of a resource grid 3001 according to an aspect of the present embodiment. In the resource grid of FIG. 17, the horizontal axis represents OFDM symbol index $l_{sym}$, and the vertical axis represents the subcarrier index $k_{sc}$. The resource grid 3001 includes $N^{size,u}_{grid1,x} \times N^{RB}_{sc}$ subcarriers, and includes $N^{subframes,u}_{symb}$ OFDM symbols. A resource specified by the subcarrier index $k_{sc}$ and the OFDM symbol index $l_{sym}$ in a resource grid is also referred to as a resource element (RE: Resource Element).

Resource Blocks (General):

A resource block (RB: Resource Block) includes $N^{RB}_{sc}$ consecutive subcarriers. A resource block is a generic name of a common resource block, a physical resource block (PRB: Physical Resource Block), and a virtual resource block (VRB: Virtual Resource Block). For example, $N^{RB}_{sc}=12$.

Common Resource Block:

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000. The index $n^u_{CRB}$ of the common resource block with respect to the subcarrier-spacing configuration u satisfies the relationship of $n^u_{CRB}=\text{ceil}(k_{sc}/N^{RB}_{sc})$ where the subcarrier with $k_{sc}=0$ is a subcarrier with the same center frequency as the center frequency of the subcarrier which corresponds to the point 3000.

Physical Resource Block:

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}_{BWP,i}$. The $N^{start,u}_{BWP,i}$ indicates the reference point of BWP with index i.

BWP:

A BWP is defined as a subset of common resource blocks included in the resource grid. The BWP includes $N^{size,u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The wireless terminal may receive the PDSCH, the PDCCH, and the CSI-RS in the active downlink BWP. A PUCCH and a PUSCH may be sent on the active uplink BWP. The wireless terminal may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The wireless terminal may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The wireless terminal may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs. The downlink BWP switching may be controlled by a BWP field included in downlink control information. The downlink BWP switching may be controlled based on higher-layer parameters.

Uplink BWP switching is used to deactivate an active uplink BWP and activate any inactive uplink BWP. Uplink BWP switching may be controlled by a BWP field included in downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Carrier Aggregation:

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Downlink Physical Channel (General):

A downlink physical channel may correspond to a set of resource elements that carry information originating from the higher-layer and/or downlink control information. The downlink physical channel may be a physical channel used in the downlink component carrier. The base station transmits the downlink physical channel. The wireless terminal receives the downlink physical channel. In the wireless communication system according to one aspect of the present embodiment, at least a part or all of PBCH (Physical Broadcast Channel), PDCCH (Physical Downlink Control Channel), and PDSCH (Physical Downlink Shared Channel) may be used.

PDCCH:

A PDCCH is used to transmit downlink control information (DCI). A PDCCH is transmitted to deliver downlink control information. Downlink control information is mapped to a PDCCH. The terminal device 1 receives a PDCCH in which downlink control information is mapped. The base station transmits the PDCCH in which the downlink control information is mapped.

DCI Format (General):

DCI format (Downlink control information format) is collection of information fields. "DCI format" may be used interchangeably with the phrase "DCI". DCI format is a generic name for DCI format 0_0, DCI format 0_1, DCI format 1_0, and DCI format 1_1. Uplink DCI format is a generic name at least including the DCI format 0_0 and the DCI format 0_1. Downlink DCI format is a generic name at least including the DCI format 1_0 and the DCI format 1_1.

DCI Format 1_0:

The DCI format 1_0 is at least used for scheduling of a PDSCH for a cell (arranged on a cell). The DCI format 1_0 includes at least a part or all of fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 1_0 may indicate 1 (or may indicate that the DCI format 1_0 is a downlink DCI format).

The frequency domain resource assignment field included in the DCI format 1_0 may be at least used to indicate the assignment of frequency resources for a PDSCH. The frequency domain resource assignment field included in the DCI format 10 may be at least used to indicate the assignment of frequency resources for a PDSCH scheduled by the DCI format 1_0.

The time domain resource assignment field included in the DCI format 1_0 may be at least used to indicate the assignment of time resources for a PDSCH. The time domain resource assignment field included in the DCI format 1_0 may be at least used to indicate the assignment of time resources for a PDSCH scheduled by the DCI format 1_0.

The MCS field included in the DCI format 1_0 may be at least used to indicate a part or all of a modulation scheme for a PDSCH and a target coding rate for the PDSCH. The target coding rate and the modulation scheme are used to determine a size of a transport block (TBS: Transport Block Size) of a PDSCH.

The PDSCH-to-HARQ-feedback timing indicator field is used to indicate the offset (K1) from a slot in which the last OFDM symbol of a PDSCH scheduled by the DCI format 1_0 is allocated to another slot in which the first OFDM symbol of a PUCCH triggered by the DCI format 1_0 is allocated.

The PUCCH resource indicator field is a field indicating an index of any one or more PUCCH resources included in the PUCCH resource set for a PUCCH transmission. The PUCCH resource set may include one or more PUCCH resources.

The DCI format 1_0 may not include a carrier indicator field. A downlink component carrier on which a PDSCH scheduled by the DCI format 1_0 is allocated may be the same as a downlink component carrier on which a PDCCH including the DCI format 1_0 is allocated.

The DCI format 1_0 may not include the BWP field. A downlink BWP on which a PDSCH scheduled by a DCI format 1_0 is allocated may be the same as a downlink BWP on which a PDCCH including the DCI format 1_0 is allocated.

DCI Format 1_1:

The DCI format 1_1 is at least used for scheduling of a PDSCH for a cell (or arranged on a cell). The DCI format 1_1 includes at least a part or all of fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 1_1 may indicate 1 (or may indicate that the DCI format 1_1 is a downlink DCI format).

The frequency domain resource assignment field included in the DCI format 1_1 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_1.

The time domain resource assignment field included in the DCI format 1_1 may be at least used to indicate the assignment of time resources for a PDSCH. The time domain resource assignment field included in the DCI format 1_may be at least used to indicate the assignment of time resources for a PDSCH scheduled by the DCI format 1_1.

The MCS field included in the DCI format 1_1 may be at least used to indicate a part or all of a modulation scheme for a PDSCH and a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1_1. When the DCI format 1_1 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is allocated. When the DCI format 1_1 does not include the BWP field, a downlink BWP on which a PDSCH is allocated may be the active downlink BWP. When the number of downlink BWPs configured in the terminal device 1 in a downlink component carrier is two or more, the number of bits for the BWP field included in the DCI format 1_1 used for scheduling a PDSCH allocated on the downlink component carrier may be one or more. When the number of downlink BWPs configured in the terminal device 1 in a downlink component carrier is one, the number of bits for the BWP field included in the DCI format 1_1 used for scheduling a PDSCH allocated on the downlink component carrier may be zero.

If the DCI format 1_1 includes the carrier indicator field, the carrier indicator field may be used to indicate a downlink component carrier (or a serving cell) on which a PDSCH is allocated. When the DCI format 1_1 does not include the carrier indicator field, a downlink component carrier (or a serving cell) on which a PDSCH is allocated may be the same as a downlink component carrier (or a serving cell) on which a PDCCH including the DCI format 1_1 used for scheduling of the PDSCH is allocated. When the number of downlink component carriers (or the number of serving cells) configured in the terminal device 1 in a serving cell group is two or more (when downlink carrier aggregation is operated in a serving cell group), or when cross-carrier scheduling is configured for the serving cell group, the number of bits for the carrier indicator field included in the DCI format 1_1 used for scheduling a PDSCH allocated on the serving cell group may be one or more (e.g., 3). When the number of downlink component carriers (or the number of serving cells) configured in the terminal device 1 in a serving cell group is one (or when downlink carrier aggregation is not operated in a serving cell group), or when the cross-carrier scheduling is not configured for the serving cell group, the number of bits for the carrier indicator field included in the DCI format 1_1 used for scheduling of a PDSCH allocated on the serving cell group may be zero.

PDSCH:

A PDSCH is used to transmit one or more transport blocks. A PDSCH may be used to transmit one or more transport blocks which corresponds to a DL-SCH. A PDSCH may be used to convey one or more transport blocks. A PDSCH may be used to convey one or more transport blocks which corresponds to a DL-SCH. One or more transport blocks may be mapped in a PDSCH. One or more transport blocks which corresponds to a DL-SCH may be mapped in a PDSCH. The base station transmits a PDSCH. The wireless terminal receives the PDSCH.

Downlink Communication Procedure:

In downlink communication, the wireless terminal attempts to detect a PDCCH (attempts to monitor a PDCCH, monitors a PDCCH) in resources identified at least based on one or both of a search-space-set and an associated control resource set. The resources may be also referred to as "PDCCH candidates".

Next, the wireless terminal detects a downlink DCI format in the PDCCH. The detected downlink DCI format is used for resource assignment for a PDSCH. The detected downlink DCI format is also referred to as downlink assignment. The wireless terminal attempts to receive the PDSCH. Based on a PUCCH resource indicated based on the detected downlink DCI format, HARQ-ACK information corresponding to the PDSCH is reported to the base station.

Control Resource Set:

A control resource set comprises of a set of resources defined by the number of resource blocks and the number of OFDM symbols. The number of resource blocks may be provided by RRC signaling. The number of resource blocks may be provided by RRC signaling.

Search Space Set:

A Search Space Set is Defined as a Set of PDCCH Candidates. a Search Space Set May be a Common Search Space (CSS) Set or a UE-Specific Search Space (USS) Set.

The CSS set is a generic name of a type-0 PDCCH common search space set, a type-0a PDCCH common search space set, a type-1 PDCCH common search space set, a type-2 PDCCH common search space set, and a type-3 PDCCH common search space set. The USS set may be also called as UE-specific PDCCH search space set.

TDD Frame Structure

Figure 18:
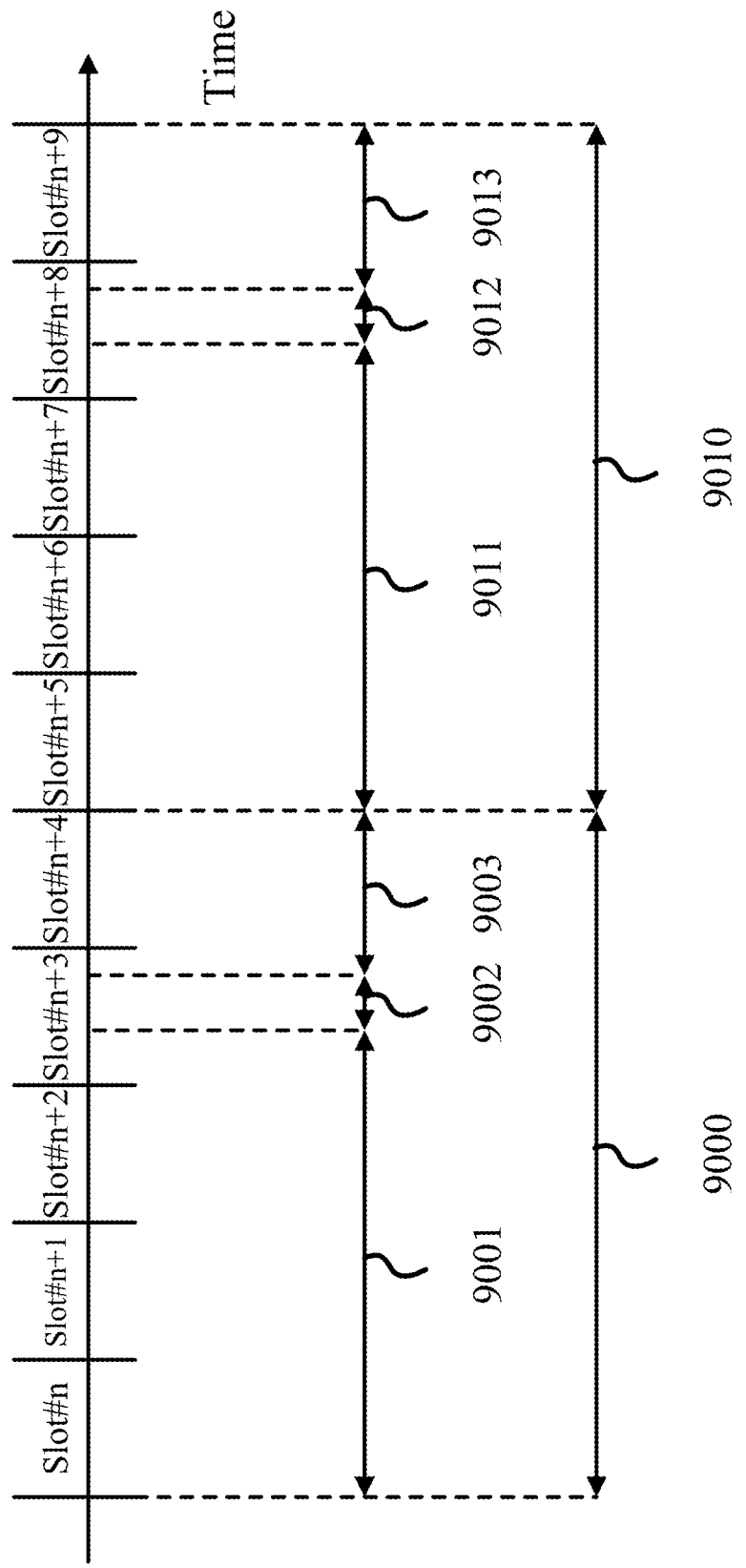
FIG. 18 is a diagram of a TDD pattern according to an example embodiment and mode.

FIG. 18 is an example configuration of a frame structure for a serving cell according to an aspect of the present embodiment. In FIG. 18, a horizontal axis indicates time domain. In the time domain, slots are numbered from slot #n (slot with index n) in ascending order. Each line in the time domain indicates a slot boundary. 9001 indicates a downlink region. 9002 indicates a flexible region. 9003 indicates an uplink region.

Region indicated by 9000 includes a set of region 9001, 9002 and 9003. Region 9000 may be configured based on a TDD pattern. For example, a TDD pattern may include at least a part or all of downlink region, a flexible region and an uplink region. For example, a TDD pattern may be configured such that the TDD pattern starts at one UL-to-DL switching point. Further, the TDD pattern may be configured such that the TDD pattern ends at another UL-to-DL switching point. Here, a UL-to-DL switching point is a point where an uplink region ends and a downlink region starts.

For example, a TDD pattern may be repeated in the time domain. In FIG. 18, a TDD pattern comprising of 3 downlink slots, 1 special slot and 1 uplink slot is repeated. Region 9000 is an instance of the TDD pattern starting at slot #n and Region 9010 is an instance of the TDD pattern starting at slot #n+5. In FIG. 18, repetition cycle of the TDD pattern is 5 slots. On the other hand, the repetition cycle may be configured via RRC signaling.

9011 indicates a downlink region. Further, 9012 indicates a flexible region. Further, 9013 indicates an uplink region.

For example, a TDD pattern may be represented by a combination of 'D', 'U', 'F' and 'S'. 'D' indicates that a slot is a downlink slot. A downlink slot is a slot with downlink region. In FIG. 9, slot #n, slot #n+1, slot #n+2, slot #n+5, slot #n+6 and slot #n+7 are downlink slots.

'U' indicates that a slot is an uplink slot. An uplink slot is a slot with uplink region. In FIG. 9, slot #n+4 and slot #n+9 are uplink slots.

'F' indicates that a slot is a flexible slot. A flexible slot is a slot with flexible region.

'S' indicates that a slot is a special slot. A special slot is a slot with at least two or more of a downlink region, a flexible region and an uplink region. In FIG. 18, slot #n+3 and slot #n+8 are special slots.

In FIG. 18, the TDD pattern may be also referred to as "DDDSU". "DDDSU" means that the TDD pattern comprises 3 downlink slots, 1 special slot and 1 uplink slot.

A configuration of special slot may be represented by "XDYFZU". Here, X is the number of downlink symbols, Y is the number of flexible symbols and Z is the number of uplink symbols. For example, "10D2F2U" indicates that a special slot comprises 10 downlink symbols, 2 flexible symbols and 2 uplink symbols.

A downlink symbol is an OFDM symbol in a downlink region. A flexible symbol is an OFDM symbol in a flexible region. An uplink symbol is an OFDM symbol in an uplink region.

A TDD pattern may be provided by RRC parameters. For example, a TDD pattern may be configured by a common RRC signaling included in system information such as SIB1. The common RRC signaling may be also referred to as tdd-UL-DL-ConfigurationCommon.

For example, wireless terminal may determine a reference subcarrier-spacing configuration $u_{ref}$ and a first TDD pattern from the common RRC signaling. The first TDD pattern includes one or more of T1 to T5. T1 is a configuration period P in milliseconds provided by referenceSubcarrierSpacing. T2 is the number $d_{slots}$ of slots indicating consecutive downlink slots provided by nrofDownlinkSlots. T3 is the number $d_{sym}$ of consecutive downlink symbols provided by nrofDownlinkSymbols. T4 is the number $u_{slots}$ of consecutive uplink slots provided by nrofUplinkSlots. T5 is the number $u_{sym}$ of consecutive uplink symbols provided by nrofUplinkSymbols.

Figure 19:
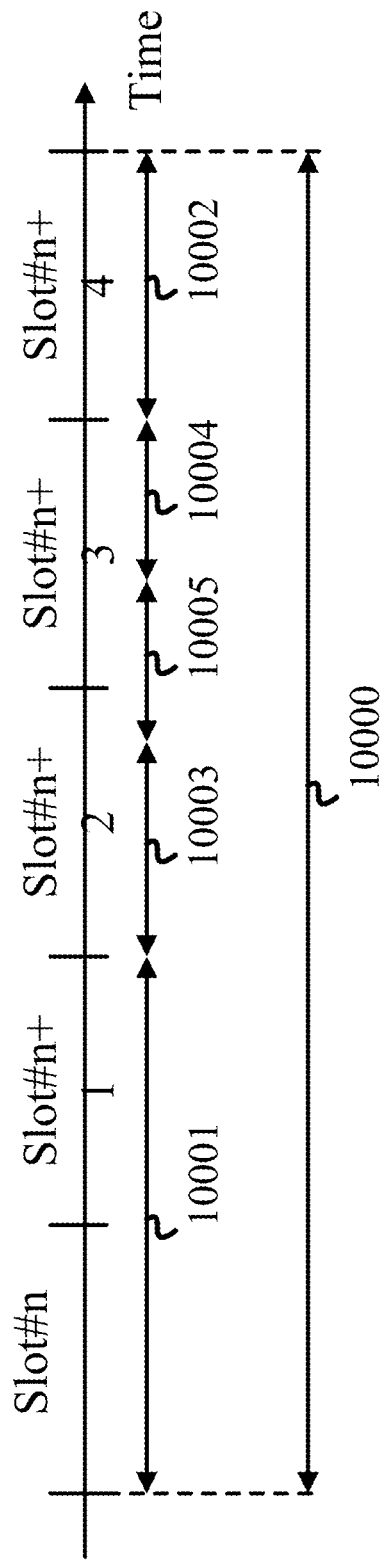
FIG. 19 is an example configuration of a TDD pattern according to an example embodiment and mode.

FIG. 19 is an example configuration of a TDD pattern according to an aspect of the present embodiment. In FIG. 10, a horizontal axis indicates time domain. In the time domain, slots are numbered from slot #n (slot with index n) in ascending order. Each line in the time domain indicates a slot boundary. 10000 indicates a TDD pattern. In the TDD pattern, first $d_{slots}$=2 slots as indicated by Region 10001 are configured as downlink slots. In the TDD pattern, last $u_{slots}$=1 slot as indicated by Region 10002 is configured as an uplink slot. In the TDD pattern, first $d_{sym}$ OFDM symbols starting at first OFDM symbol in a slot with index n+$d_{slots}$ as indicated by Region 10003 is configured as downlink symbols. In the TDD pattern, last $u_{sym}$ OFDM symbols before first OFDM symbol in a slot with index n+S−$u_{slots}$ as indicated by Region 10004 is configured as uplink symbols. In the TDD pattern, the remaining OFDM symbols not indicated as either downlink region or uplink region as indicated by Region 1005 are flexible symbols.

A TDD pattern may be modified by a UE-specific RRC signaling. The UE-specific RRC signaling is also referred to as tdd-UL-DL-ConfigurationDedicated.

If the UE-specific RRC signaling is provided to wireless terminal, the UE-specific RRC signaling may modify (or reconfigure) the TDD pattern provided by the common RRC signaling. For example, the UE-specific RRC signaling may modify (or reconfigure) flexible region in the TDD pattern.

For example, wireless terminal may determine a list including a set of slot reconfigurations by the UE-specific RRC signaling. In each slot reconfiguration in the set, at least one or both of an index of a slot and an indication of TDD pattern of the slot may be provided. The indication may indicate one out of 'all DL', 'all UL' and 'explicit'. In a case that 'all DL' is indicated for the slot, the TDD pattern in the slot is reconfigured as downlink region. In a case that 'all UL' is indicated for the slot, the TDD pattern in the slot is reconfigured as uplink region. In a case that 'explicit' is indicated for the slot, the TDD pattern in the slot is reconfigured by explicit indication corresponding to 'explicit'. Indication 'explicit' corresponds to information indicating a TDD pattern in a slot. The information includes information indicating the number of downlink symbols starting at the beginning of the slot and information indicating the number of uplink symbols ending at the end of the slot. The remaining OFDM symbols between downlink symbols and uplink symbols are flexible symbols.

Wireless terminal may receive a physical signal if wireless terminal is configured by a higher layer or indicated by a DCI format to receive the physical signal in the downlink region.

Wireless terminal may transmit a physical signal if wireless terminal is configured by a higher layer or indicated by a DCI format to transmit the physical signal in the uplink region.

In a case that monitoring of DCI format 2_0 is not configured by a higher layer, wireless terminal may receive a physical signal if wireless terminal is indicated by a DCI format scheduling the physical channel to receive in the downlink region or the flexible region.

In a case that monitoring of DCI format 2_0 is not configured by a higher layer, wireless terminal may transmit a physical signal if wireless terminal is indicated by a DCI format scheduling the physical signal to transmit in the uplink region or the flexible region.

In a case that monitoring of DCI format 2_0 is configured by a higher layer, wireless terminal may determine whether to receive a physical signal or not at least based on indication in the DCI format 2_0.

In a case that monitoring of DCI format 2_0 is configured by a higher layer, wireless terminal may determine whether to transmit a physical signal or not at least based on indication in the DCI format 2_0.

Configuration regarding monitoring of DCI format 2_0 may include at least one or more of S1 to S3. S1 is an identifier of a serving cell. S2 is information indicating bit location of field for index of a slot format indicator. S3 is a set of slot format combinations. Here, each slot format combination may include one or more slot formats. Each of slot format combination may include an index of a slot format indicator. Each slot format may indicate a TDD pattern within a slot. For example, slot format #0 indicates that all OFDM symbols in a slot are downlink symbol. For example, slot format #1 indicates that all OFDM symbols in a slot are uplink symbol. For example, one slot format indicates that first 9 OFDM symbols in a slot are downlink symbol, next 3 OFDM symbols in the slot are flexible symbol and remaining 2 OFDM symbols are uplink symbol. For example, one slot format indicates that terminal device 1 interpret as if monitoring of DCI format 2_0 is not configured. Other TDD patterns in a slot are not precluded.

In a case that terminal device 1 detects a DCI format 2_0 in a first slot, terminal device 1 applies a slot format combination indicated through an index of slot format indicator in the DCI format 2_0. For example, the slot format combination may be applied to slots starting at the first slot.

At least based on an indication in DCI format 2_0, behavior of PUSCH transmission may be controlled. For example, a PUSCH transmission may be repetition of a PUSCH instance where the PUSCH instance is defined within a slot.

Default Mapping Schemes

An example of the frequency domain resource assignment procedure for the wireless terminal includes following steps:
1) Detects a DCI format which schedules a PDSCH
2) Determines allocated virtual resource blocks by interpreting a frequency domain resource assignment field in the DCI format
3) Determines allocated physical resource blocks for transmission of the PDSCH based on VRB-to-PRB mapping In the 1st step, the wireless terminal detects a DCI format which schedules a PDSCH. Next, the wireless terminal extracts bits in the frequency domain resource assignment field in the DCI format.

In the 2nd step, the wireless terminal interprets the frequency domain resource assignment field.

The wireless terminal may support multiple interpretation ways. For example, the wireless terminal may support one or both of RIV-based interpretation and RBG-based interpretation. As used herein, RIV-based interpretation is assumed to explain the technology. However, the technology disclosed herein is not restricted in terms of the way of interpretation of the frequency domain resource assignment field.

For example, the wireless terminal determines allocated virtual resource blocks by using RIV-based interpretation. The virtual resource blocks are a kind of resource blocks in virtual domain. The allocated virtual resource blocks are mapped to physical resource blocks by VRB-to-PRB mapping. The details of VRB-to-PRB mapping are described later.

In the RIV-based interpretation, the wireless terminal extracts a value RIV (Resource Indication Value) from the bits in the frequency domain resource assignment field. Then, the wireless terminal determines starting virtual resource block index $RB_{start}$ for the PDSCH and a length $L_{RBs}$ in terms of resource blocks for the PDSCH where the starting virtual resource block index $RB_{start}$ and the length $L_{RBs}$ is jointly encoded into the RIV.

As mentioned above, a "default" mapping scheme as used herein comprises any mapping scheme that would map a virtual resource block of a physical downlink channel to a physical resource block which is unavailable for the physical downlink channel. The following are non-exhaustive, illustrative examples of default mapping schemes:

RIV-based interpretation for DCI format 1_1: If the DCI format belongs to DCI format 1_1, the number of bits $N_{FDRA}$ in the DCI format is determined by the formula $N_{FDRA}=\lceil \log_2(N_{RB}^{DL,BWP}(N_{RB}^{DL,BWP}+1)/2) \rceil$ where $N_{RB}^{DL,BWP}$ represents the number of resource blocks in the active DL BWP. The $N_{FDRA}$ bits are used to provide resource assignment. Next, the value of RIV is determined by decimal conversion of the $N_{FDRA}$ bits. Next, the values of the starting virtual resource block index $RB_{start}$ and the length $L_{RBs}$ is determined by decoding the RIV. An example of RIV encoding is shown in Figure A4 where $N_{BWP}^{size}$ represents the number of resource blocks in the active DL BWP.

RIV-based interpretation for DCI format 1_0 detected in a CSS set: If the DCI format belongs to DCI format 1_0 and the DCI format was detected in a CSS set, the number of bits $N_{FDRA}$ in the DCI format is determined by the formula $N_{FDRA}=\lceil \log_2(N_{RB}^{DL,BWP}(N_{RB}^{DL,BWP}+1)/2) \rceil$ where $N_{RB}^{DL,BWP}$ represents the number of resource blocks in the control resource set with index 0. If the control resource set with index 0 is not configured in the serving cell, $N_{RB}^{DL,BWP}$ represents the number of resource blocks in the initial DL BWP. The $N_{FDRA}$ bits are used to provide resource assignment. Next, the value of RIV is determined by decimal conversion of the $N_{FDRA}$ bits. Next, the values of the starting virtual resource block index $RB_{start}$ and the length $L_{RBs}$ is determined by decoding the RIV. An example of RIV encoding is shown in Figure A4 where $N_{BWP}^{size}$ represents the number of resource blocks in the control resource set with index 0. If the control resource set with index 0 is not configured in the service cell, $N_{BWP}^{size}$ represents the number of resource blocks in the initial DL BWP.

RIV-based interpretation for DCI format 1_0 detected in a USS set Two sizes are possible for a FDRA field in the DCI format 1_0 detected in a USS set. For example, if the number of DCI sizes to be monitored is not more than 3, the size of the FDRA field is determined by the formula $N_{FDRA}=\lceil \log_2(N_{RB}^{DL,BWP}(N_{RB}^{DL,BWP}+1)/2) \rceil$ where $N_{RB}^{DL,BWP}$ represents the number of resource blocks in the active DL BWP. For example, if the number of DCI sizes to be monitored is not more than 3, the size of the FDRA field is determined in the same way as the DCI format 1_0 detected in a CSS set.

RIV-based interpretation for DCI format 1_0 detected in a USS set in a case where the size of the FDRA field is not determined in the same way as the DCI format 1_0 detected in a CSS set: In a case that the size of the FDRA field is not determined in the same way as the DCI format 1_0 detected in a CSS set, $N_{FDRA}=\lceil \log_2(N_{RB}^{DL,BWP}(N_{RB}^{DL,BWP}+1)/2) \rceil$ where $N_{RB}^{DL,BWP}$ represents the number of resource blocks in the active DL BWP. The $N_{FDRA}$ bits are used to provide resource assignment. Next, the value of RIV is determined by decimal conversion of the $N_{FDRA}$ bits. Next, the values of the starting virtual resource block index $RB_{start}$ and the length $L_{RBs}$ is determined by decoding the RIV. An example of RIV encoding is shown in Figure A4 where $N_{BWP}^{size}$ represents the number of resource blocks in the active DL BWP.

RIV-based interpretation for DCI format 1_0 detected in a USS set in a case where the size of the FDRA field is determined from the size of DCI format 1_0 in CSS set: In a case that the size of the FDRA field is determined in the same way as the DCI format 1_0 detected in a CSS set, $N_{FDRA}=\lceil \log_2(N_{RB}^{DL,BWP}(N_{RB}^{DL,BWP}+1)/2) \rceil$ where $N_{RB}^{DL,BWP}$ represents the number of resource blocks in the control resource set with index 0. If the control resource set with index 0 is not configured in the serving cell, $N_{RB}^{DL,BWP}$ represents the number of resource blocks in the initial DL BWP. The $N_{FDRA}$ bits are used to provide resource assignment. Next, the value of RIV is determined by decimal conversion of the $N_{FDRA}$ bits. Next, the values of the starting virtual resource block index $RB_{start}$ and the length $L_{RBs}$ is determined by decoding the RIV. An example of RIV encoding is shown below where $N_{BWP}^{size}$ represents the number of resource blocks in the active DL BWP. As shown below, $N_{BWP}^{initial}$ is the same as $N_{RB}^{DL,BWP}$, and $N_{BWP}^{active}$ is the number of resource blocks in the active BWP.

The resource indication value is defined by:
if $(L'_{RBs}-1) \leq \lfloor N_{BWP}^{initial}/2 \rfloor$ then $$RIV = N_{BWP}^{initial}(L'_{RBs}-1) + RB'_{start}$$

else $$RIV = N_{BWP}^{initial}(N_{BWP}^{initial} - L'_{RBs} + 1) + (N_{BWP}^{initial} - 1 - RB'_{start})$$

where $L'_{RBs} = L_{RBs}/K$, $RB'_{start} = RB_{start}/K$ and where $L'_{RBs}$ shall not exceed $N_{BWP}^{initial} - RB'_{start}$ If $N_{BWP}^{active} > N_{BWP}^{initial}$, K is the maximum value from set $\{1,2,4,8\}$ which satisfies $K \leq \lfloor N_{BWP}^{active}/N_{BWP}^{initial} \rfloor$; otherwise K=1.

After determination of the values of the starting virtual resource block index $RB_{start}$, and the length $L_{RBs}$, the wireless terminal determines virtual resource blocks starting at index $RB_{start}$ and ending at $RB_{start} - L_{RBs} - 1$ as the allocated virtual resource blocks. In the 3$^{rd}$ step, the wireless terminal determines and applies a VRB-to-PRB mapping scheme for the PDSCH. Multiple VRB-to-PRB mapping schemes may be supported by the wireless terminal.

Figure 20:
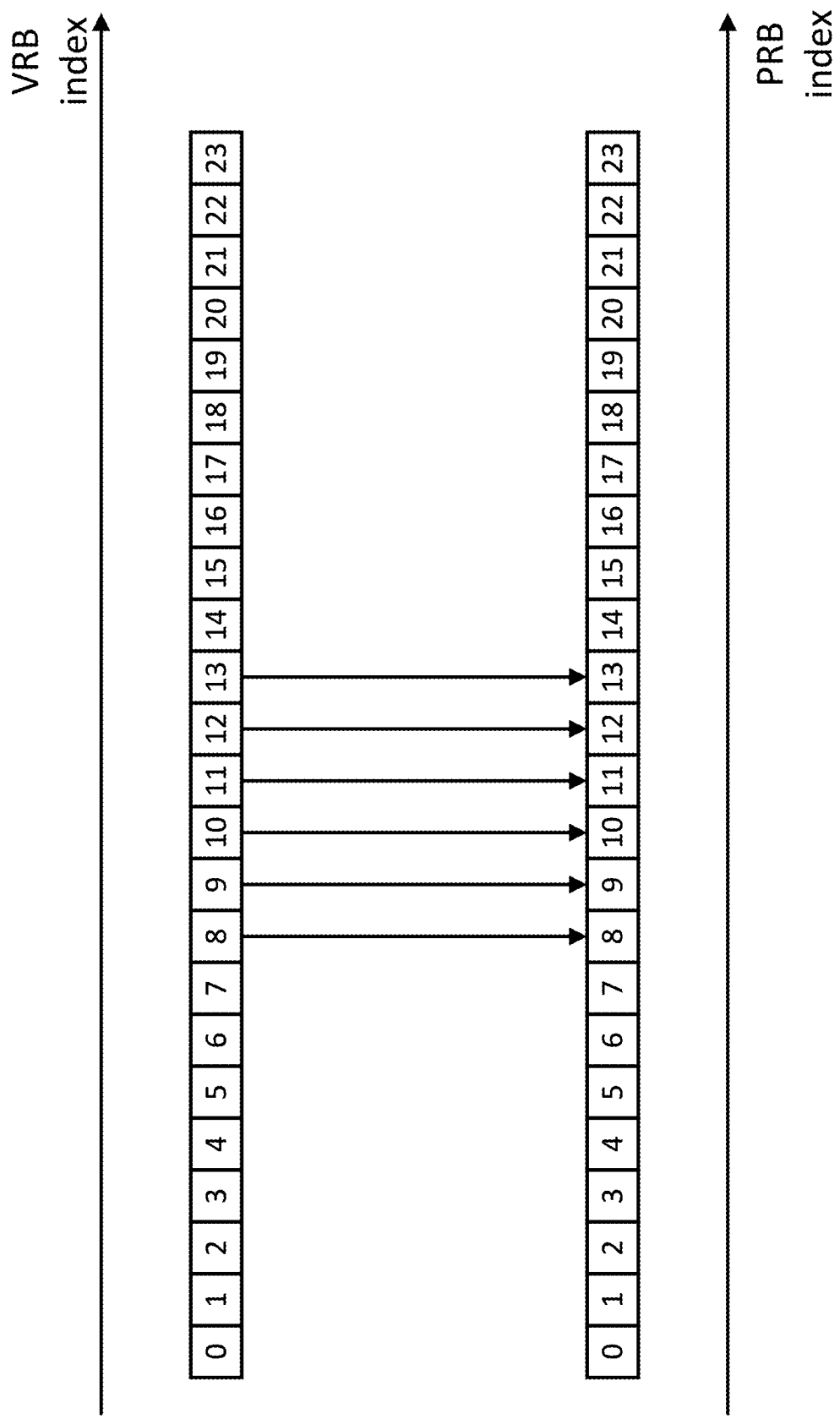
FIG. 20 is a diagrammatic view of an example of non-interleaved VRB-to-PRB mapping scheme for a PDSCH scheduled by a DCI format 1_1.

Non-interleaved VRB-to-PRB mapping scheme for a PDSCH scheduled by a DCI format 1_1. FIG. 20 shows an example of non-interleaved VRB-to-PRB mapping scheme for a PDSCH scheduled by a DCI format 1_1. The upper side represents VRB domain, and the lower side represents PRB domain. Here, resource block indexes are mapped sequentially from left to right. It is assumed that the active DL BWP comprises of resource blocks with index 0 to index 23. In a non-interleaved VRB-to-PRB mapping scheme for a PDSCH scheduled by a DCI format 1_1, VRB with index n is mapped to PRB with index n. If VRB with index 8 to index 13 are allocated for the PDSCH, the wireless terminal determines that PRB with index 8 to index 13 as allocated PRBs.

Figure 21:
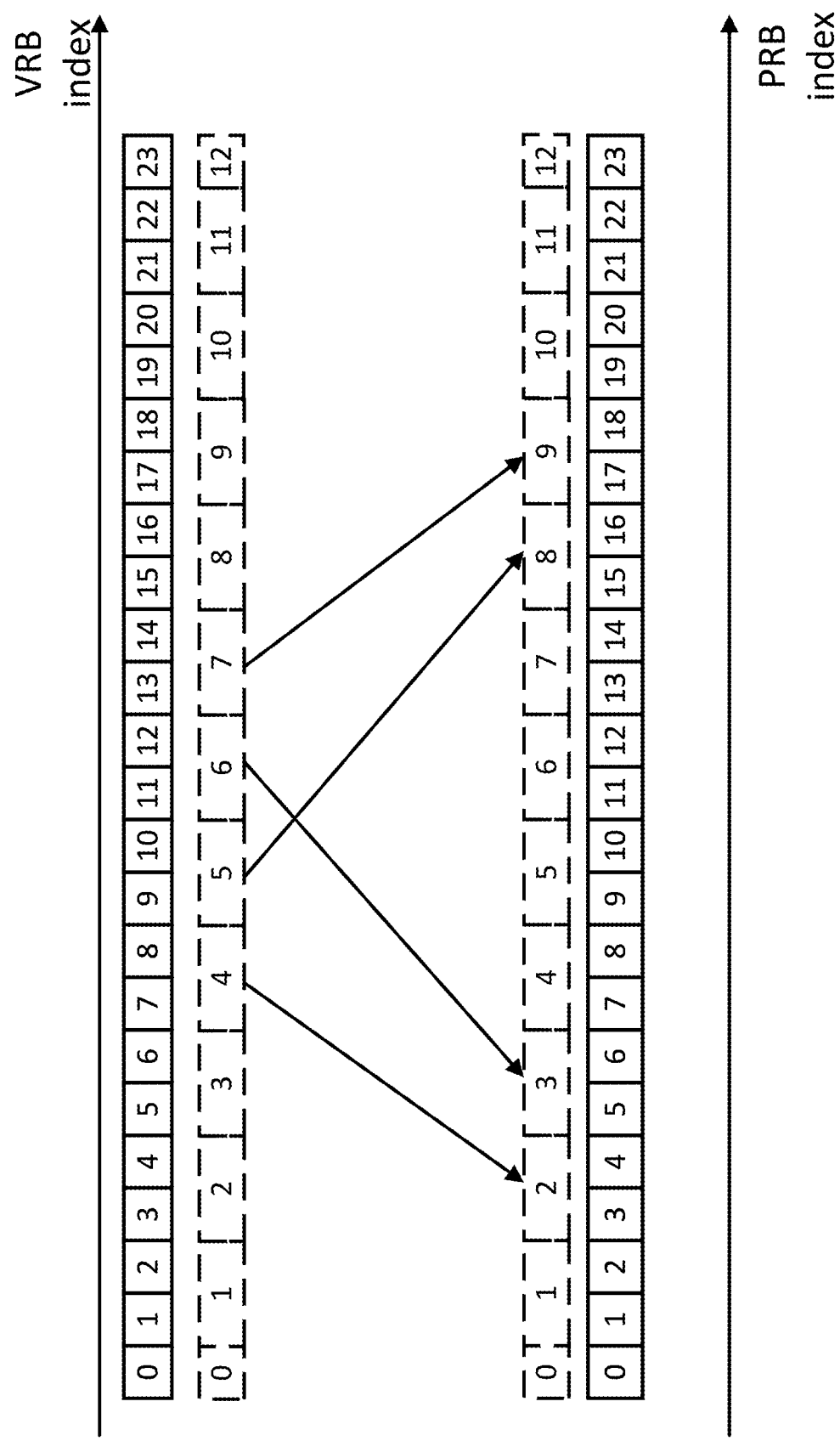
FIG. 21 is a diagrammatic view of an example of interleaved VRB-to-PRB mapping scheme.

Interleaved VRB-to-PRB mapping scheme for a PDSCH scheduled by a DCI format 1_1. For interleaved VRB-to-PRB mapping, resource block bundles are defined before performing interleaved mapping. The set of $N_{BWP}^{size}$ resource blocks in the active BWP with starting position $N_{BWP}^{start}$ are divided into $N_{bundle} = \lceil N_{BWP}^{size} + \text{mod}(N_{BWP}^{start}, L))/L \rceil$ resource-block bundles in increasing order of the resource-block number where L is the bundle size for the active BWP. In details, resource block bundle with index 0 comprises of $L - \text{mod}(N_{BWP}^{start}, L)$ continuous resource blocks, resource block bundle with index $N_{bundle}-1$ comprises of $\text{mod}(N_{BWP}^{start} + N_{BWP}^{size}, L)$ resource blocks if $\text{mod}(N_{BWP}^{start} + N_{BWP}^{start}, L)$ is larger than 0, and resource block bundle with index $N_{bundle}-1$ comprises of L resource blocks if $\text{mod}(N_{BWP}^{start} + N_{BWP}^{size}, L)$ is equal to 0. Other resource block bundles than resource block bundle with index 0 and resource block bundle with index $N_{bundle}-1$ comprises of L resource blocks. FIG. 21 shows an example of interleaved VRB-to-PRB mapping scheme. In FIG. 21, boxes with doted lines represents resource block bundles whereas boxes with solid lines represents resource blocks. Also, it is assumed that the value of $N_{BWP}^{start}$ is odd, and L is 2 in the example of FIG. 3. Therefore, the resource block bundle with index 0 is comprised of $L - \text{mod}(N_{BWP}^{start}, L) = 1$ resource block. Also, the resource block bundle with index $N_{bundle}-1 = \lceil (N_{BWP}^{size} + \text{mod}(N_{BWP}^{start}, L))/L \rceil - 1 = 12$ comprises of $\text{mod}(N_{BWP}^{start} + N_{BWP}^{size}, L) = 1$ resource block where $N_{BWP}^{size}$ is 24. For interleaved VRB-to-PRB mapping, the unit of VRB-to-PRB mapping is resource block bundles. For example, resource block bundle j in virtual resource blocks is mapped to resource block bundle $f(j) = rC + c$ where $j = cR + r$, $r = 0,1, \ldots, R-1$, $c = 0,1, \ldots, C-1$, R=2, and $C = \lfloor N_{bundle}/R \rfloor$. Also, resource block bundle with index $N_{bundle}-1$ in VRB domain is mapped to resource block bundle with index $N_{bundle}-1$ in PRB domain. For example, in the case of FIG. 3, if VRB with index 8 to index 13 are allocated for the PDSCH, the wireless terminal determines VRB-to-PRB mapping for resource block bundles. In the example, resource block bundle with index 4 in VRB domain is mapped to resource block bundle with index 2 in PRB domain, resource block bundle with index 5 in VRB domain is mapped to resource block bundle with index 8 in PRB domain, resource block bundle with index 6 in VRB domain is mapped to resource block bundle with index 3 in PRB domain, and resource block bundle with index 7 in VRB domain is mapped to resource block bundle with index 9 in PRB domain. The VRB-to-PRB mapping results in resource blocks with index 4, 15, 16, 5, 6, and 17 as allocated PRBs.

Figure 22:
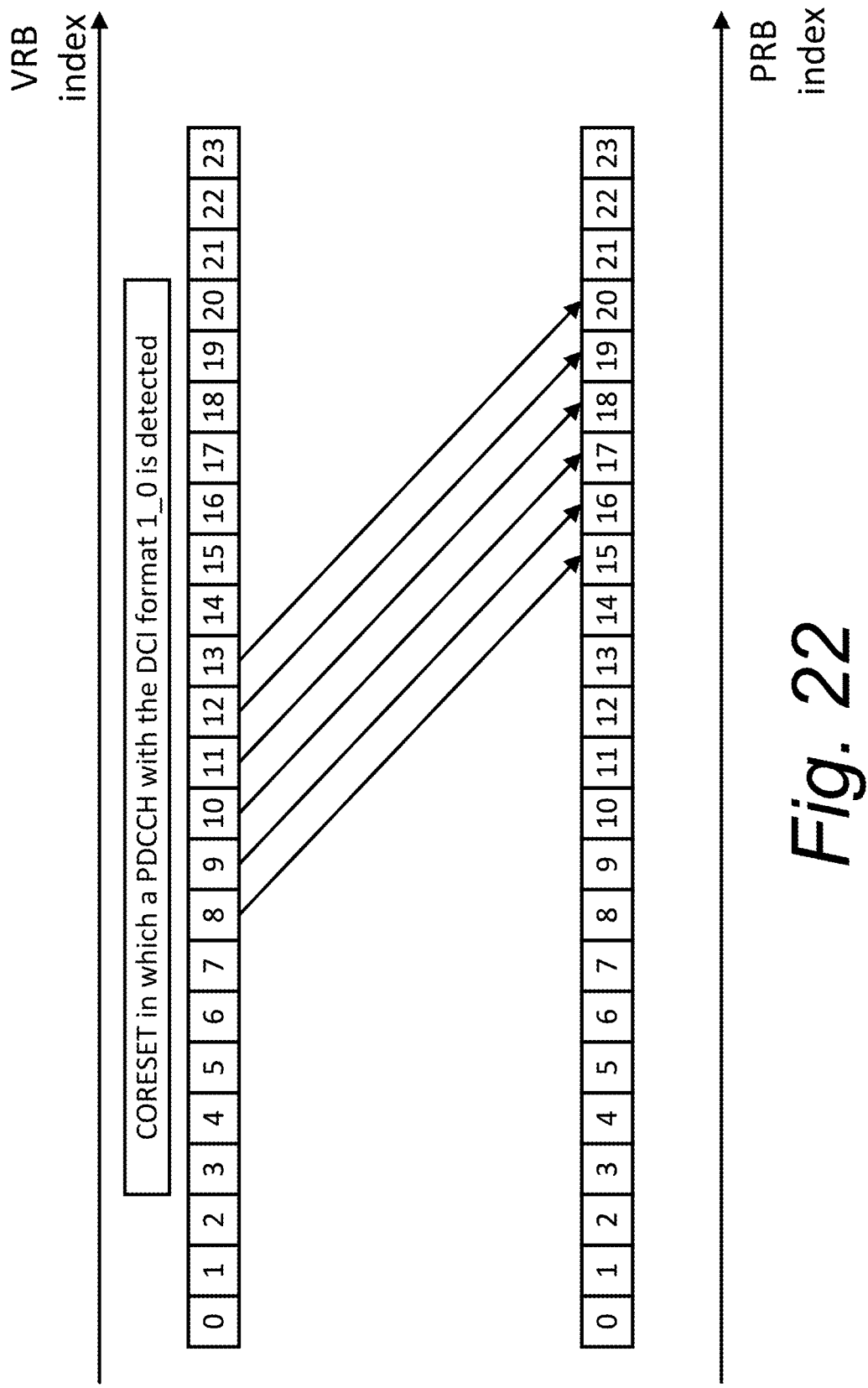
FIG. 22 is a diagrammatic view of an example of non-interleaved VRB-to-PRB mapping scheme for a PDSCH scheduled by a DCI format 1_0 detected in a CSS set.

Non-interleaved VRB-to-PRB mapping scheme for a PDSCH scheduled by a DCI format 1_0 detected in a CSS set. FIG. 22 shows an example of non-interleaved VRB-to-PRB mapping scheme for a PDSCH scheduled by a DCI format 1_0 detected in a CSS set. The upper side represents VRB domain, and the lower side represents PRB domain. Here, resource block indexes are mapped sequentially from left to right. It is assumed that the active DL BWP comprises of resource blocks with index 0 to index 23. In addition, $N_{start}^{CORESET} = 7$ is assumed where $N_{start}^{CORESET}$ is the starting PRB index for a control resource set in which a PDCCH with the DCI format 1_0 is detected. In a non-interleaved VRB-to-PRB mapping scheme for a PDSCH scheduled by a DCI format 1_0 detected in a CSS set, VRB with index n is mapped to PRB with index $n + N_{start}^{CORESET}$. If VRB with index 8 to index 13 are allocated for the PDSCH, the wireless terminal determines that PRB with index 15 to index 20 as allocated PRBs.

Figure 23:
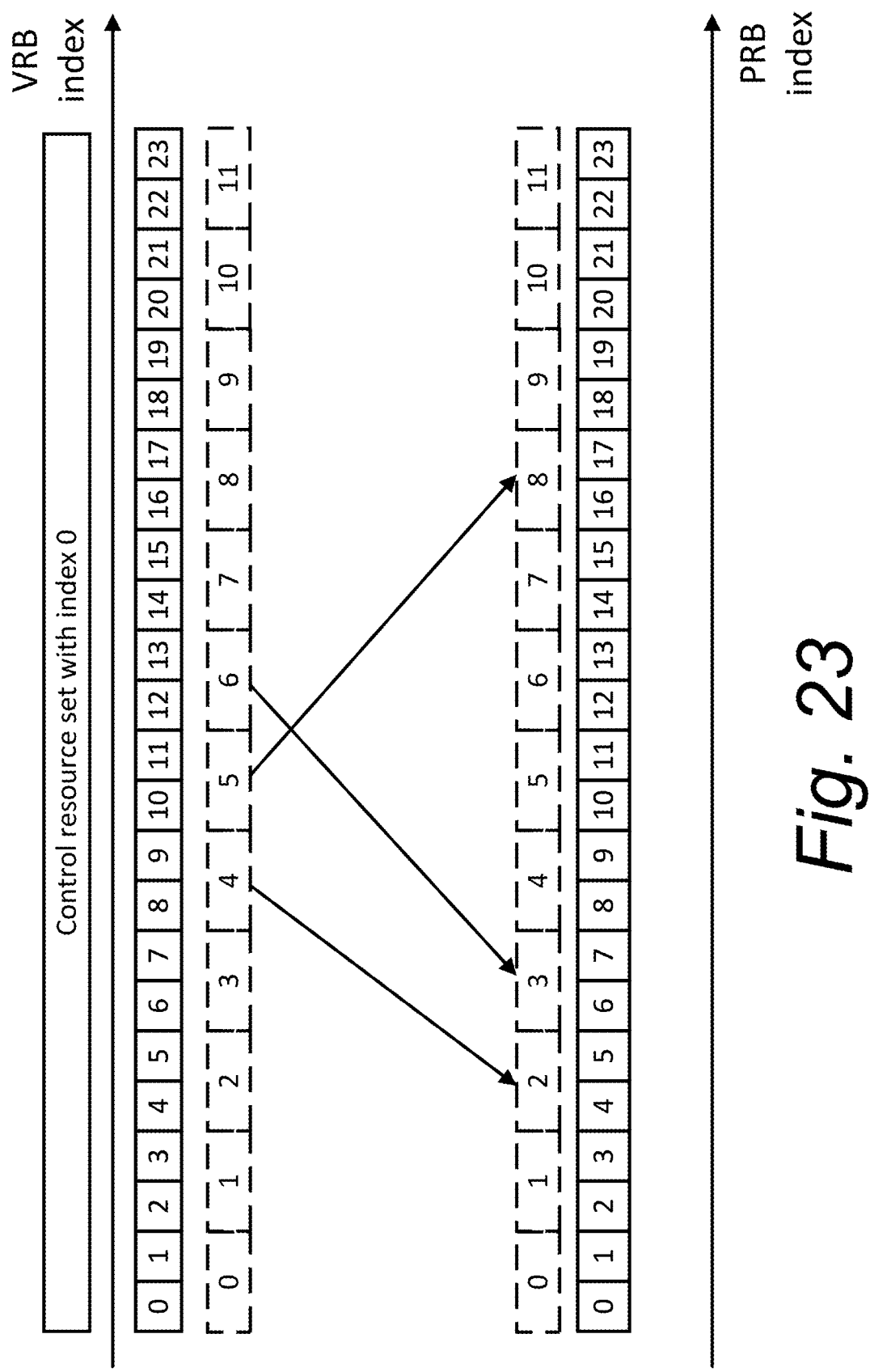
FIG. 23 is a diagrammatic view of an example of interleaved VRB-to-PRB mapping scheme

Interleaved VRB-to-PRB mapping scheme for a PDSCH scheduled by a DCI format 1_0 detected in a type-0 PDCCH common search space set associated with control resource set with index 0. For interleaved VRB-to-PRB mapping scheme for a PDSCH scheduled by a DCI format 1_0 detected in a type-0 PDCCH common search space set associated with control resource set with index 0, resource block bundles are defined before performing interleaved mapping. The set of $N_{CORESET0}^{size}$ resource blocks in the control resource set with index 0 are divided into $N_{bundle} = \lceil N_{CORESET0}^{size}/L \rceil$ resource-block bundles in increasing order of the resource-block number where L is the bundle size. Here, $N_{CORESET0}^{size}$ represents the number of resource blocks in the control resource set with index 0. In details, resource block bundle with index $N_{bundle}-1$ comprises of $\text{mod}(N_{CORESET0}^{size}, L)$ resource blocks if $\text{mod}(N_{CORESET0}^{size}, L)$ is larger than 0, and resource block bundle with index $N_{bundle}-1$ comprises of L resource blocks if $\text{mod}(N_{CORESET0}^{size}, L)$ is equal to 0. Other resource block bundles than resource block bundle with index $N_{bundle}-1$ comprises of L resource blocks. FIG. 23 shows an example of interleaved VRB-to-PRB mapping scheme. In FIG. 23, boxes with doted lines represents resource block bundles whereas boxes with solid lines represents resource blocks. Also, it is assumed that the value of $N_{CORESET0}^{size}$ is 24, and L is 2 in the example of FIG. 5. Therefore, the resource block bundle with index $N_{bundle}-1 = \lceil N_{CORESET0}^{size}/L \rceil - 1 = 11$ comprises of $\text{mod}(N_{CORESET0}^{size}, L) = 2$ resource block. For the interleaved VRB-to-PRB mapping scheme for a PDSCH scheduled by a DCI format 1_0 detected in a type-0 PDCCH common search space set associated with control resource set with index 0, the unit of VRB-to-PRB mapping is resource block bundles. For example, resource block bundle j in virtual resource blocks is mapped to resource block bundle $f(j)=rC+c$ where $j=cR+r$, $r=0,1, \ldots, R-1$, $c=0,1, \ldots, C-1$, $R=2$, and $C=\lceil N_{bundle}/R \rceil$. Also, resource block bundle with index $N_{bundle}-1$ in VRB domain is mapped to resource block bundle with index $N_{bundle}-1$ in PRB domain. For example, in the case of FIG. 23, if VRB with index 8 to index 13 are allocated for the PDSCH, the wireless terminal determines VRB-to-PRB mapping for resource block bundles. In the example, resource block bundle with index 4 in VRB domain is mapped to resource block bundle with index 2 in PRB domain, resource block bundle with index 5 in VRB domain is mapped to resource block bundle with index 8 in PRB domain, and resource block bundle with index 6 in VRB domain is mapped to resource block bundle with index 3 in PRB domain. The VRB-to-PRB mapping results in resource blocks with index 4, 5, 16, 17, 6, and 7 as allocated PRBs.

Figure 24:
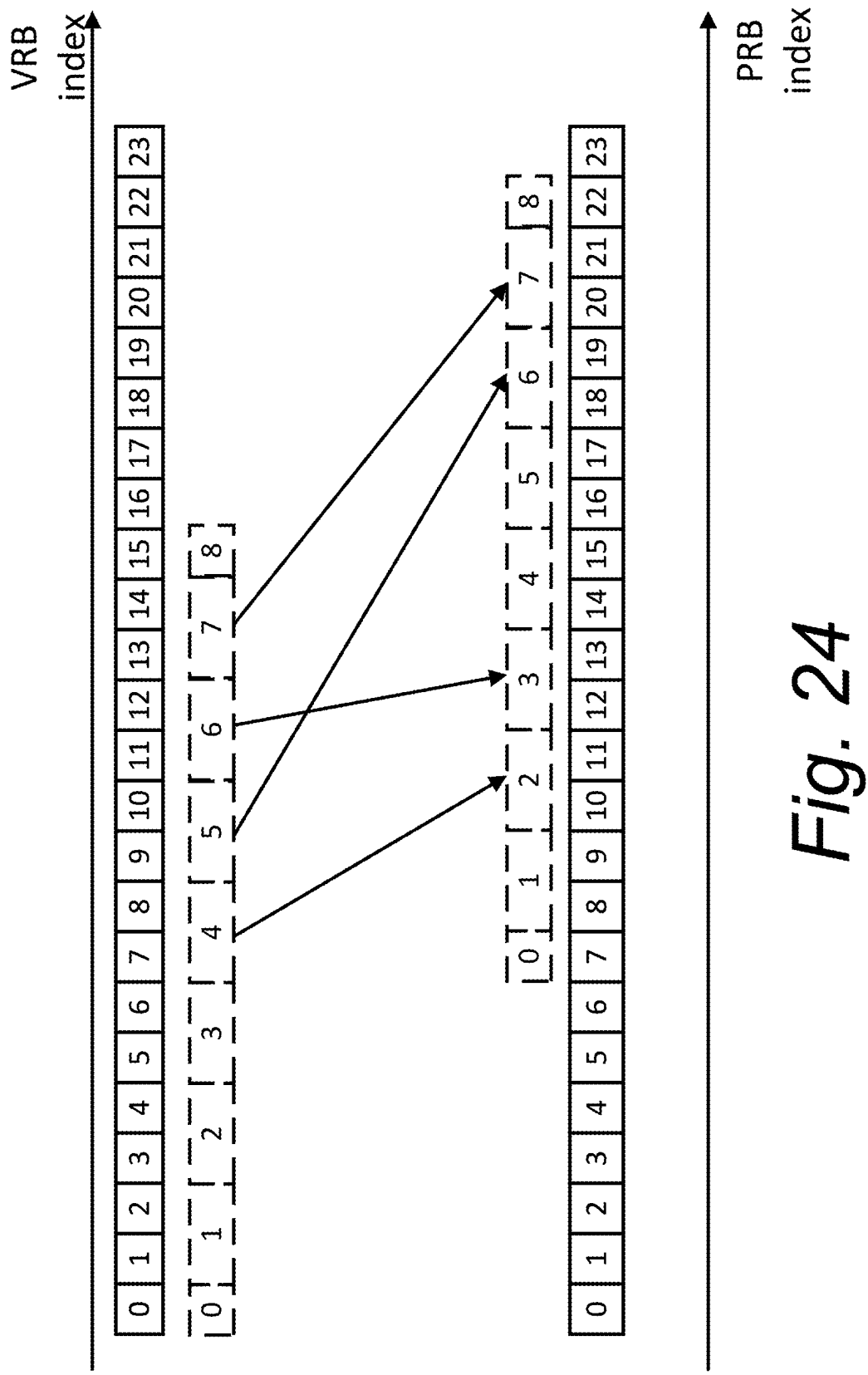
FIG. 24 is a diagrammatic view of an example of an interleaved VRB-to-PRB mapping scheme for a PDSCH scheduled by a DCI format 1_0 detected in a CSS set other than a type-0 PDCCH common search space set associated with control resource set with index 0

Interleaved VRB-to-PRB mapping scheme for a PDSCH scheduled by a DCI format 1_0 detected in a CSS set other than a type-0 PDCCH common search space set associated with control resource set with index 0. For interleaved VRB-to-PRB mapping scheme for a PDSCH scheduled by a DCI format 1_0 detected in a CSS set other than a type-0 PDCCH common search space set associated with control resource set with index 0, resource block bundles are defined before performing interleaved mapping. The set of $N_{BWP,init}^{size}$ resource blocks in VRB domain are divided into $N_{bundle}=\lceil(N_{BWP,init}^{size}+(mod(N_{BWP}^{start}+N_{start}^{CORESET}, L)))/L\rceil$ resource-block bundles in increasing order of the resource-block number where L is the bundle size, $N_{BWP}^{start}$ is the starting resource block index of the active DL BWP, $N_{start}^{CORESET}$ is the starting resource block index of the control resource set in which the PDCCH with the DCI format 1_0 is detected, and $N_{BWP,init}^{size}$ is the number of resource blocks for control resource set with index 0. If the control resource set with index 0 is not configured in the service cell, $N_{BWP,init}^{size}$ represents the number of resource blocks in the initial DL BWP. Also, the set of $N_{BWP,init}^{size}$ resource blocks with starting position $N_{start}^{CORESET}$ in PRB domain are divided into $N_{bundle}=\lceil N_{BWP,init}^{size}+(mod(N_{BWP}^{start}+N_{start}^{CORESET}, L)))/L\rceil$ resource-block bundles in increasing order of the resource-block number. In details, resource block bundle with index 0 comprises of $L-mod(N_{BWP}^{start}+N_{start}^{CORESET}, L)$ continuous resource blocks, resource block bundle with index $N_{bundle}-1$ comprises of $mod(N_{BWP}^{start}+N_{start}^{CORESET}+N_{BWP,init}^{size}, L)$ resource blocks if $mod(N_{BWP}^{start}+N_{start}^{CORESET}+N_{BWP,initial}^{size}, L)$ is larger than 0, and resource block bundle with index $N_{bundle}-1$ comprises of L resource blocks if $mod(N_{BWP}^{start}+N_{start}^{CORESET}+N_{BWP,init}^{size}, L)$ is equal to 0. Other resource block bundles than resource block bundle with index 0 and resource block bundle with index $N_{bundle}-1$ comprises of L resource blocks. FIG. 24 shows an example of interleaved VRB-to-PRB mapping scheme for a PDSCH scheduled by a DCI format 1_0 detected in a CSS set other than a type-0 PDCCH common search space set associated with control resource set with index 0. In FIG. 24, boxes with doted lines represents resource block bundles whereas boxes with solid lines represents resource blocks. Also, it is assumed that the value of $N_{BWP}^{start}+N_{start}^{CORESET}$ is odd, and L is 2 in the example of FIG. 24. Therefore, the resource block bundle with index 0 is comprised of $L-mod(N_{BWP}^{start}+N_{start}^{CORESET}, L)=1$ resource block. Also, the resource block bundle with index $N_{bundle}-1=\lceil(N_{BWP,init}^{start}+mod(N_{BWP}^{start}+N_{start}^{CORESET}, L))/L\rceil-1=8$ comprises of $mod(N_{BWP}^{start}+N_{start}^{CORESET}+N_{BWP,init}^{size}, L)=1$ resource block where $N_{BWPinit}^{size}$ is 16. For interleaved VRB-to-PRB mapping, the unit of VRB-to-PRB mapping is resource block bundles. For example, resource block bundle j in virtual resource blocks is mapped to resource block bundle $f(j)=rC+c$ where $j=cR+r$, $r=0,1, \ldots, R-1$, $c=0,1, \ldots, C-1$, $R=2$, and $C=\lceil N_{bundle}/R \rceil$. Also, resource block bundle with index $N_{bundle}-1$ in VRB domain is mapped to resource block bundle with index $N_{bundle}-1$ in PRB domain. For example, in the case of FIG. 24, if VRB with index 8 to index 13 are allocated for the PDSCH, the wireless terminal determines VRB-to-PRB mapping for resource block bundles. In the example, resource block bundle with index 4 in VRB domain is mapped to resource block bundle with index 2 in PRB domain, resource block bundle with index 5 in VRB domain is mapped to resource block bundle with index 6 in PRB domain, resource block bundle with index 6 in VRB domain is mapped to resource block bundle with index 3 in PRB domain, and resource block bundle with index 7 in VRB domain is mapped to resource block bundle with index 7 in PRB domain. The VRB-to-PRB mapping results in resource blocks with index 11, 18, 19, 12, 13, 20 as allocated PRBs. Non-interleaved VRB-to-PRB mapping scheme for a PDSCH scheduled by a DCI format 1_0 in a USS set may be the same as the non-interleaved VRB-to-PRB mapping scheme for a PDSCH scheduled by a DCI format 1_1. Interleaved VRB-to-PRB mapping scheme for a PDSCH scheduled by a DCI format 1_0 in a USS set may be the same as the interleaved VRB-to-PRB mapping scheme for a PDSCH scheduled by a DCI format 1_1.

Figure 32:
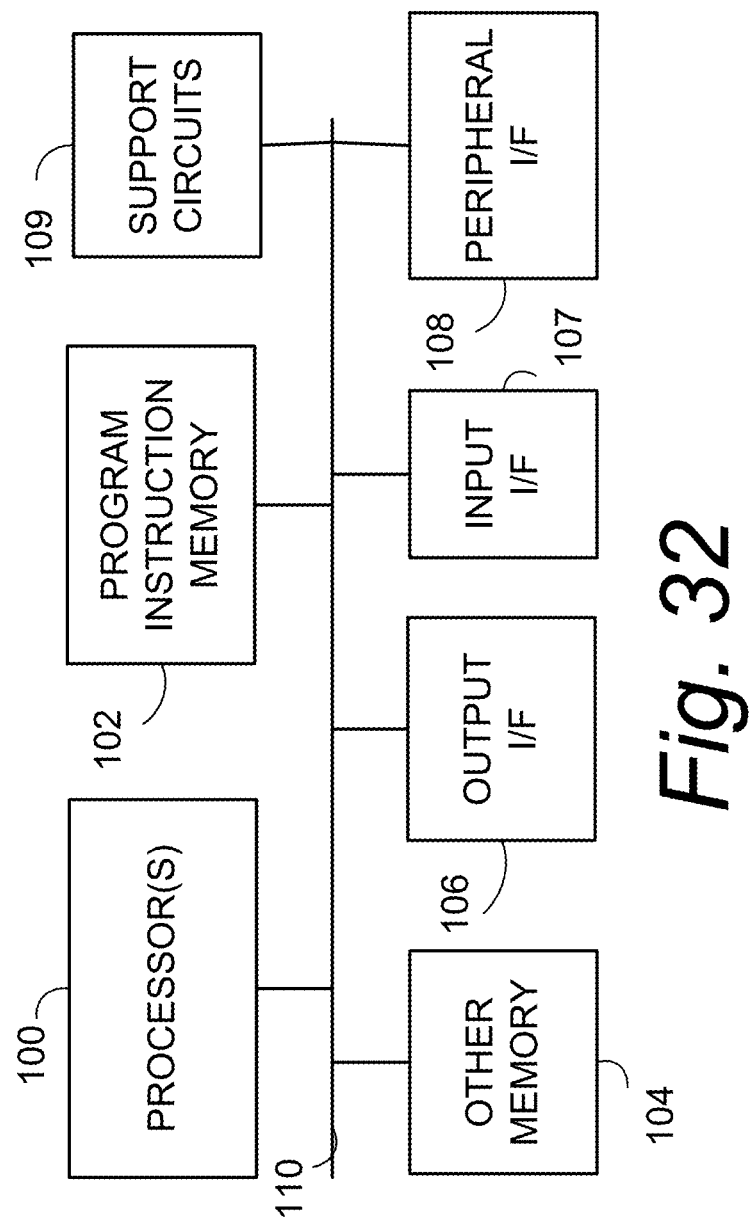
FIG. 32 is a diagrammatic view showing example elements comprising electronic machinery which may comprise a wireless terminal, a radio access node, and a core network node according to an example embodiment and mode.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C Certain units and functionalities of the systems 20 may be implemented by electronic machinery. For example, electronic machinery may refer to the processor circuitry described herein, such as terminal processor circuitry 60 and base station processor 34 and suffixed versions thereof. Moreover, the term "processor circuitry" is not limited to mean one processor, but may include plural processors, with the plural processors operating at one or more sites. Moreover, as used herein the term "server" is not confined to one server unit but may encompasses plural servers and/or other electronic equipment and may be co-located at one site or distributed to different sites. With these understandings, FIG. 32 shows an example of electronic machinery, e.g., processor circuitry, as comprising one or more processors 100, program instruction memory 102; other memory 104 (e.g., RAM, cache, etc.); input/output interfaces 106 and 107, peripheral interfaces 108; support circuits 109; and busses 110 for communication between the aforementioned units. The processor(s) 100 may comprise the processor circuitries described herein, for example, terminal processor circuitry 60 and node processor circuitry 34, or any processor(s) of a network entity of the core network and suffixed versions thereof.

A memory or register described herein may be depicted by memory 104, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 109 are coupled to the processors 100 for supporting the processor in a conventional manner. These circuits include cache, power supplies, clock circuits, input/output circuitry and subsystems, and the like.

The term "configured" may relate to the capacity of a device whether the device is in an operational or non-operational state. Configured may also refer to specific settings in a device that effect the operational characteristics of the device whether the device is in an operational or nonoperational state. In other words, the hardware, software, firmware, registers, memory values, and/or the like may be "configured" within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves reception and transmission in a telecommunications system, such as by mitigating cross link interference, for example.

One or more of the following documents may be pertinent to the technology disclosed herein (all of which are incorporated herein by reference in their entirety):

RP-213591, New SI: Study on evolution of NR duplex operation

3GPP TS38.214, v16.8.0, NR; Physical layer procedures for data

3GPP TS38.331, v16.7.0, NR; Radio Resource Control (RRC); Protocol specification 3GPP TS38.304, v16.7.0, NR; User Equipment (UE) procedures in Idle mode and RRC Inactive state Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal comprising:
   receiver circuitry configured to receive radio transmissions over a radio interface from a serving cell;
   processor circuitry configured to generate wireless terminal selective receptivity information, the wireless terminal selective receptivity information indicating whether the wireless terminal has a capability to receive from the serving cell a physical downlink shared channel, PDSCH, mapped across more than one subband with one subcarrier spacing configuration;
   transmitter circuitry configured to transmit the wireless terminal selective receptivity information to the serving cell.

2. The wireless terminal of claim 1, wherein the processor circuitry is configured to configure the receiver circuitry to receive transmissions in a first set of subbands and not to receive transmissions in a second set of subbands.

3. The wireless terminal of claim 2, wherein receiver circuitry is configured to receive, from the serving cell, an indication of the first set of subbands in which the wireless terminal can receive the transmissions; and wherein the receiver circuitry is configured to receive the transmissions in first set of subbands.

4. The wireless terminal of claim 3, wherein receiver circuitry is configured to receive the indication of the first set of subbands in radio resource control, RRC, signaling.

5. The wireless terminal of claim 2, wherein the first set of subbands comprises primary subband(s) and the second set of subbands comprises secondary subband(s).

6. The wireless terminal of claim 5, wherein the primary subband(s) comprise a frequency resource for SS/PBCH blocks which defines a serving cell.

7. The wireless terminal of claim 5, wherein the primary subband(s) comprise a frequency resource for a control resource set with index 0.

8. A method in a wireless terminal comprising:
   generating wireless terminal selective receptivity information, the wireless terminal selective receptivity information indicating whether the wireless terminal has a capability to receive from the serving cell a physical downlink shared channel, PDSCH, mapped across more than one subband with one subcarrier spacing configuration; and
   transmitting the wireless terminal selective receptivity information to the serving cell.

9. An access node of a communications system which communicates over a radio interface with a wireless terminal, the access node comprising:
   receiver circuitry configured to receive, from the wireless terminal, wireless terminal selective receptivity information, the wireless terminal selective receptivity information indicating whether the wireless terminal has a capability to receive from the serving cell a physical downlink shared channel, PDSCH, mapped across more than one subband with one subcarrier spacing configuration;
   processor circuitry configured to control, in dependence upon the wireless terminal selective receptivity information, in which subband(s) the access node transmits the physical downlink shared channel, PDSCH, to the wireless terminal.

10. The access node of claim 9, further comprising transmitter circuitry, and wherein the processor circuitry is further configured, when the wireless terminal selective receptivity information indicates that the wireless terminal does not have the capability, to control the transmitter circuitry so that transmissions from the access node which are intended for reception by the wireless terminal occur in subbands that are wanted by the wireless terminal.

11. The wireless terminal of claim 1, wherein the more than one subbands are defined by plural physical resource blocks, PRBs, and wherein the plural PRBs have a same subcarrier spacing.

12. The method of claim 8, wherein the more than one subbands are defined by plural physical resource blocks, PRBs, and wherein the plural PRBs have a same subcarrier spacing.

13. The access node of claim 9, wherein the more than one subbands are defined by plural physical resource blocks, PRBs, and wherein the plural PRBs have a same subcarrier spacing.

* * * * *